(12) United States Patent
Yano et al.

(10) Patent No.: US 7,314,079 B2
(45) Date of Patent: Jan. 1, 2008

(54) SUNSHADE SYSTEM HAVING BLIND SHEET

(75) Inventors: Motoyasu Yano, Toyohashi (JP);
Masahiko Komoda, Toyokawa (JP);
Shigeaki Kageme, Toyohashi (JP);
Katsunori Mochizuki, Kosai (JP);
Yukihiro Matsushita, Hamakita (JP);
Yasuhiro Osawa, Gamagori (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 504 days.

(21) Appl. No.: 10/929,649

(22) Filed: Aug. 31, 2004

(65) Prior Publication Data

US 2005/0051285 A1    Mar. 10, 2005

(30) Foreign Application Priority Data

Sep. 9, 2003 (JP) .............................. 2003-316843
May 13, 2004 (JP) .............................. 2004-144119

(51) Int. Cl.
*B60J 1/20* (2006.01)

(52) U.S. Cl. ............ 160/370.22; 160/265; 160/370.21; 296/141

(58) Field of Classification Search ........... 160/370.22, 160/370.21, 265, 370.23, 262, 280; 296/141, 296/143, 214
See application file for complete search history.

(56) References Cited

U.S. PATENT DOCUMENTS

| | | | | |
|---|---|---|---|---|
| 5,201,810 A * | 4/1993 | Ojima et al. ................. 160/265 |
| 5,344,206 A * | 9/1994 | Middleton .................. 296/97.8 |
| 6,086,133 A * | 7/2000 | Alonso ....................... 296/97.8 |
| 6,249,377 B1 * | 6/2001 | Takamoto et al. .......... 359/461 |
| 6,598,929 B2 * | 7/2003 | Schlecht et al. ........... 296/97.4 |
| 6,739,375 B2 * | 5/2004 | Schlecht et al. ....... 160/370.22 |
| 6,848,493 B1 * | 2/2005 | Hansen et al. ......... 160/370.22 |
| 6,968,887 B2 * | 11/2005 | Hansen et al. ........ 160/370.22 |
| 7,059,651 B2 * | 6/2006 | Bohm et al. ............ 296/97.11 |
| 2002/0033244 A1 | 3/2002 | Schlecht et al. |
| 2003/0094249 A1 | 5/2003 | Zimmermann et al. |

FOREIGN PATENT DOCUMENTS

| | | |
|---|---|---|
| EP | 0834414 A2 | 4/1998 |
| JP | A-5-69743 | 3/1993 |
| JP | A-10-331556 | 12/1998 |
| JP | A-2000-52763 | 2/2000 |
| JP | A-2003-341360 | 12/2003 |

* cited by examiner

*Primary Examiner*—David M. Purol
*Assistant Examiner*—Candace L. Bradford
(74) *Attorney, Agent, or Firm*—Posz Law Group, PLC

(57) ABSTRACT

A rotatable rod includes a plurality of cylindrical center rods and a plurality of joints. Each joint connects between corresponding two of the plurality of center rods. Each of opposed ends of each center rod has at least one engaging projection, which projects from the end of the center rod in a direction parallel to an axial direction of the center rod. Each of opposed ends of each joint has at least one engaging recess, each of which is engaged with a corresponding one of the at least one engaging projection that is provided in an adjacent one of the ends of a corresponding one of the plurality of center rods.

10 Claims, 40 Drawing Sheets

SUNSHADE SYSTEM HAVING BLIND SHEET

CROSS REFERENCE TO RELATED APPLICATION

This application is based on and incorporates herein by reference Japanese Patent Application No. 2003-316843 filed on Sep. 9, 2003, Japanese Patent Application No. 2004-121869 filed on Apr. 16, 2004, Japanese Patent Application No. 2004-144119 filed on May 13, 2004, Japanese Patent Application No. 2004-146348 filed on May 17, 2004, Japanese Patent Application No. 2004-152159 filed on May 21, 2004, Japanese Patent Application No. 2004-190309 filed on Jun. 28, 2004 and Japanese Patent Application No. 2004-205160 filed on Jul. 12, 2004.

BACKGROUND OF THE INVENTION

1. Field of the Invention

The present invention relates to a sunshade system, and specifically to a sunshade system that has a blind sheet for covering a window of a vehicle to shade sunlight.

2. Description of Related Art

When a vehicle is parked under the burning sun, and sunlight enters an occupant compartment of the vehicle, the temperature of the occupant compartment rises. When an occupant returns and enters the occupant compartment of the vehicle, the occupant experiences hot sensation and feels uncomfortable. In such a state, when an air conditioning system is actuated, hot air is blow from the air conditioning system toward the occupant at the beginning of the operation of the air conditioning system, so that the occupant feels uncomfortable. Also, in such a case, the time required to lower the temperature of the occupant compartment to a desired comfortable level is relatively long. Furthermore, when the temperature needs to be rapidly decreased, the conditioning air, which is blown from the air conditioning system, needs to be increased. This results in an increase in the energy consumption.

Previously, a separate sunshade is commonly used. The sunshade is placed to an occupant compartment side of a front window to shade the sunlight, which enters the occupant compartment. The sunshade is simply left along the window without connecting it to the window or is connected to the window by, for example, sucking disks. However, the separate sunshade needs a space to store it when the sunshade is not in use. Also, the separate sunshade diminishes the appearance of the interior of the occupant compartment.

To address the above disadvantage, Japanese Unexamined Patent Publication No. 2003-182358 discloses a sunshade system. In this sunshade system, a blind sheet is wound at a lower end of a side window (door window) of a vehicle and is extended from the lower end of the side window toward an upper end of the side window. In such a case, it cannot serve as a sun visor. In order to shade the sunlight, which enters an occupant compartment of the vehicle, the blind sheet needs to be extended generally to the upper end of the side window. At this time, a lower part of the side window is covered by the blind sheet, and thus an occupant cannot see the outside of the vehicle through the side window.

Furthermore, Japanese Unexamined Patent Publication No. 2000-52763 proposes a sunshade system, which is installed in a vehicle. In this sunshade system, a blind sheet, which shades the sunlight by covering a front window of a vehicle, is extended or retracted by rotating a winding apparatus. The winding apparatus linearly extends near a top edge of an occupant compartment side of the window. Even in a case where an air bag is place in a dashboard in front of a front passenger seat, the winding apparatus does not interfere with the air bag since the winding apparatus is arranged at the upper edge of the window. Therefore, it is possible to provide the sunshade system to the front window.

In Japanese Unexamined Patent Publication No. 2000-52763, a base end of the rectangular blind sheet is secured to the winding apparatus, and a tubular stay is connected along a free end of the blind sheet. Left and right slide shafts are inserted in left and right ends of the stay, so that the slide shafts are slidable in the axial direction of the stay. A runner is connected to an outer end of each slide shaft.

Left and right guide rails are arranged along front pillars, respectively, of the vehicle. The runners are slidable along the guide rails, respectively. A flexible wire member, which has a lower end connected to the runner, is received in each guide rail. The flexible wire member is driven by a drive apparatus to move along the guide rail.

In the sunshade system disclosed in Japanese Unexamined Patent Publication No. 2000-52763, when the drive apparatus is driven to move each flexible wire member along the corresponding guide rail, the runners, the slide shafts and the stay are moved along the guide rails to extend or retract the blind sheet.

In general, the front window of the vehicle is shaped into a trapezoidal shape, which has a width that increases toward its lower end. Thus, in the above sunshade system, a space between the guide rails increases toward lower ends of the guide rails. Therefore, in the sunshade system, the slide shafts are slid in conformity with the space between the guide rails, so that the entire length of the stay and the slide shafts is adjusted.

In the prior art sunshade system disclosed in Japanese Unexamined Patent Publication No. 2000-52763, whenever the sunshade system is needed, the sunshade system is operated, so that the blind sheet is extended to cover the window and thereby to shade the sunlight. Furthermore, unlike the sunshade, which is left along the window without connecting it to the window or is connected to the window by, for example, the sucking disks, the above prior art sunshade system does not require a large storage space. In addition, the above prior art sunshade system is integrated into the vehicle body, so that it does not diminish the appearance of the interior of the occupant compartment.

However, the front window is shaped into the trapezoidal shape, which has the width that increases toward its lower end. Thus, when the above sunshade system is fully extended, generally triangular spaces, which are uncovered by the blind sheet, are left on the left and right sides of the window, and the sunlight enters the occupant compartment through the uncovered spaces to cause an increase in the temperature in the occupant compartment.

Furthermore, the front window of the vehicle is curved such that a widthwise center of the front window is convexed toward a front end of the vehicle in comparison to the left and right lateral sides of the front window. Also, a rear window of the vehicle is curved such that a widthwise center of the rear window is convexed toward a rear end of the vehicle in comparison to the left and right lateral sides of the rear window. Thus, when a linear roll of the winding apparatus, around which the blind sheet is wound, is installed to the roof side of the vehicle, the roll needs to be spaced away from the front window toward the rear end of the vehicle in the case of installing it to the front window or needs to be spaced away from the rear window toward the front end of the vehicle in the case of installing it to the rear window. However, in order to avoid interference with, for example, a sunroof and to provide a wide space in the occupant compartment, it is desirable to place the roll near the corresponding window as close as possible.

Furthermore, in the above prior art sunshade system disclosed in Japanese Unexamined Patent Publication No. 2000-52763, the blind sheet is extended or retracted by the drive apparatus. Thus, when the drive apparatus fails or malfunctions in the fully extended state of the blind sheet, the blind sheet cannot be retracted.

SUMMARY OF THE INVENTION

Thus, it is an objective of the present invention to provide an improved sunshade system, which addresses at least one of the above disadvantages.

To achieve the objective of the present invention, there is provided a sunshade system for a vehicle. The sunshade system includes a blind sheet and a roll shade arrangement. The blind sheet is for covering a window of the vehicle. The roll shade arrangement is rotatable in both of a normal direction and a reverse direction to unwind and wind the blind sheet. The roll shade arrangement is arranged along an edge of the window. The roll shade arrangement includes a center shaft, which is curved in conformity with a shape of the edge of the window, and a rotatable rod, which receives the center shaft therethrough and is connected to a base end of the blind sheet. The rotatable rod is curved in conformity with the curved shape of the center shaft and is rotatable around the center shaft. The rotatable rod includes a plurality of cylindrical center rods and a plurality of joints. Each joint connects between corresponding two of the plurality of center rods. Each of opposed ends of each center rod has at least one engaging projection, which projects from the end of the center rod in a direction parallel to an axial direction of the center rod. Each of opposed ends of each joint has at least one engaging recess, each of which is engaged with a corresponding one of the at least one engaging projection that is provided in an adjacent one of the ends of a corresponding one of the plurality of center rods.

Each of the at least one engaging projection of each center rod may have a curved engaging surface. Also, each of the at least one engaging recess of each joint may a curved engaging surface, which is engaged with the curved engaging surface of the corresponding engaging projection.

The plurality of center rods may include at least one center rod of a first type, each of which has a first length, and at least one center rod of a second type, each of which has a second length that is longer than the first length.

At least one of the at least one center rod of the first type is arranged in a first longitudinal region of the roll shade arrangement, which has a first curvature. Also, at least one of the at least one center rod of the second type is arranged in a second longitudinal region of the roll shade arrangement, which has a second curvature that is smaller than the first curvature.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
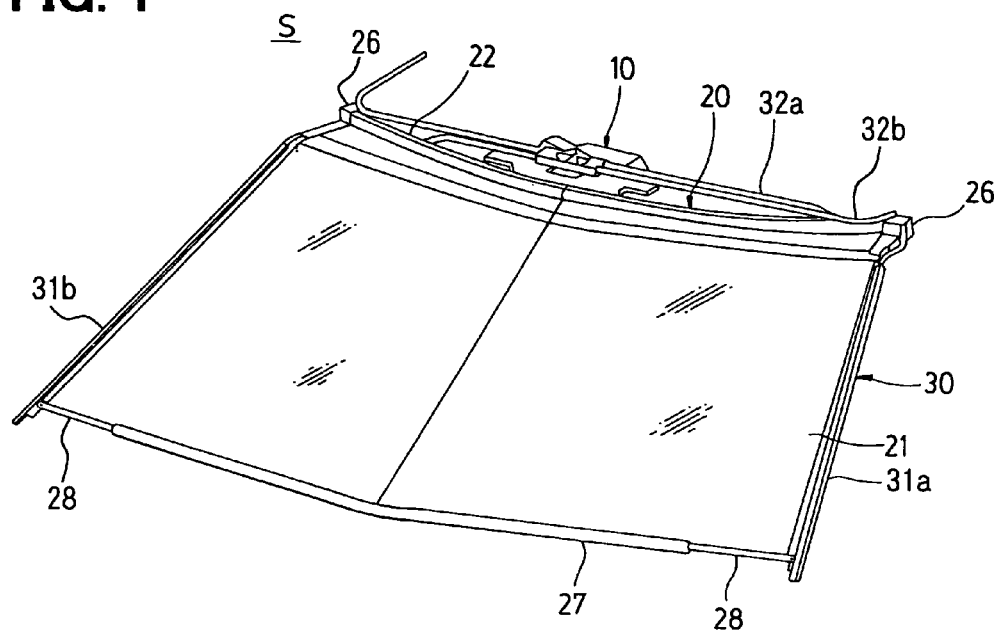
FIG. 1 is a perspective view of a sunshade system according to a first embodiment of the present invention seen from a top side of the sunshade system.
Figure 2:
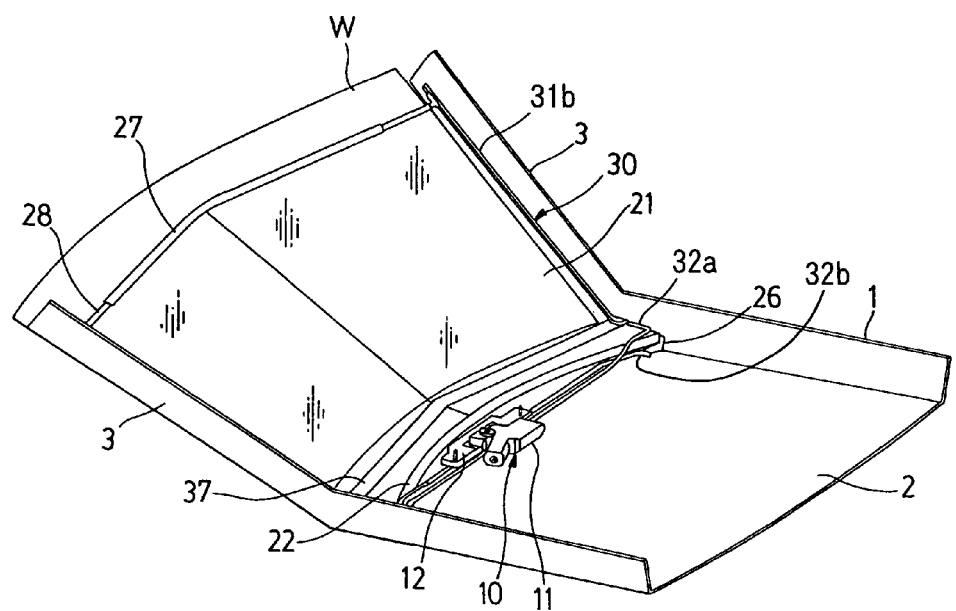
FIG. 2 is another perspective view of the sunshade system of the first embodiment seen from a bottom side of the sunshade system.

A sunshade system S (hereinafter simply referred to as a system S) of a first embodiment, which is applied to a front window W of a vehicle 1, will be described with reference to the accompanying drawings. FIG. 1 shows a perspective view of the system S seen from a top side of the system S, and FIG. 2 shows a perspective view of the system S seen from a bottom side of the system S. The system S includes a drive arrangement 10, a roll shade mechanism 20 and a guide arrangement 30. The drive arrangement 10 is arranged below a roof 2. The roll shade mechanism 20 is arranged along an occupant compartment side upper edge of the window W. The roll shade mechanism 20 winds a blind sheet 21, which covers the window W. The guide arrangement 30 includes two guide rails 31a, 31b and two cable pipes 32a, 32b. Each cable pipe 32a, 32b is connected to an upper end of a corresponding one of the guide rails 31a, 31b. FIGS. 1 and 2 show a fully extended state of the blind sheet 21.

Figure 3:
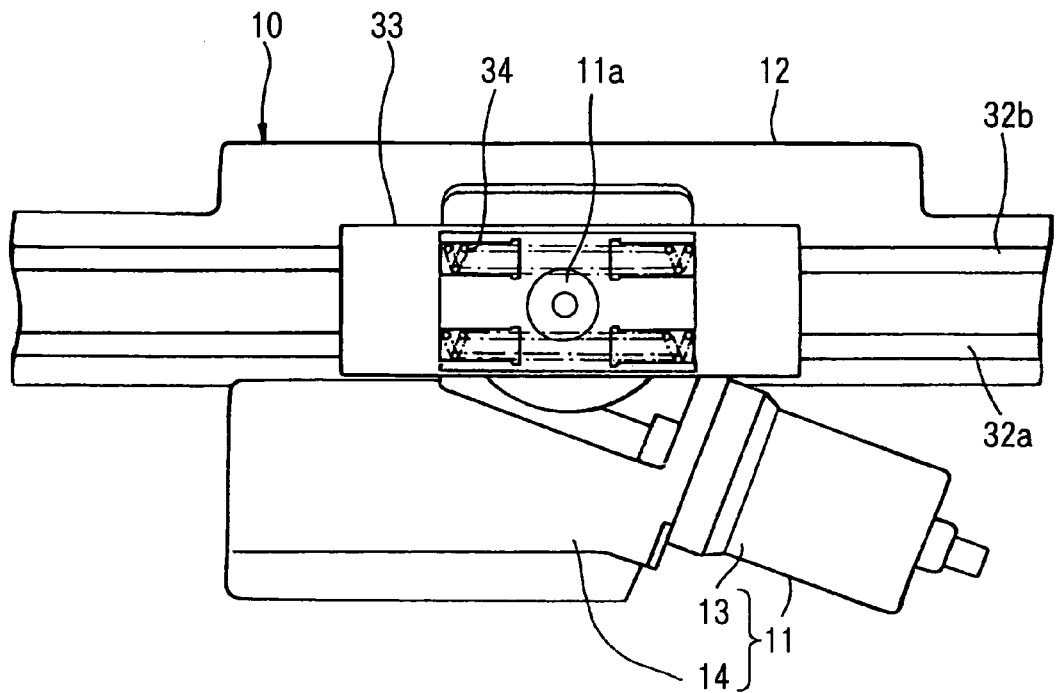
FIG. 3 is a schematic view showing a drive arrangement of the sunshade system of the first embodiment.

As shown in FIG. 3, the drive arrangement 10 includes a motor apparatus 11 and a motor mount member 12. The motor apparatus 11 includes a motor unit 13 and a speed reducing mechanism 14 and is secured to the motor mount member 12. The motor mount member 12 is secured to the roof 2. Various motors, such as DC motors, brushless motors and ultrasonic motors, can be used as the motor unit 13.

As shown in FIGS. 2 and 3, the guide arrangement 30 includes the guide rails 31a, 31b, the cable pipes 32a, 32b, spiral cables 34, sliders 35 and a cable pipe holder 33. The guide rails 31a, 31b are arranged along left and right front pillars 3, respectively. Each cable pipe 32a, 32b is connected to the upper end of the corresponding one of the guide rails 31a, 31b, as described above. Each spiral cable (transmitting member) 34 is movably received in a corresponding one of the guide rails 31a, 31b and a corresponding one of the cable pipes 32a, 32b. Each slider 35 is secured to an end of a corresponding one of the spiral cables 34. The cable pipe holder 33 holds the cable pipes 32a, 32b.

The cable pipe holder 33 is arranged between the motor apparatus 11 and the roof 2. Furthermore, as shown in FIG. 3, the cable pipe holder 33 holds the two cable pipes 32a, 32b, which are arranged parallel to one another under the roof 2. Each cable pipe 32a, 32b has a cut portion along its length, and the corresponding spiral cable 34 is exposed from the cut portion of the cable pipe 32a, 32b.

The motor apparatus 11 includes an output gear 11a, which projects upwardly. The output gear 11a is meshed with the exposed spiral cables 34 in the cable pipe holder 33. As discussed in greater detail below, when the motor apparatus 11 is operated, the output gear 11a is rotated in a normal direction or a reverse direction, and each spiral cable 34 moves left or right in the corresponding cable pipe 32a, 32b according to the rotation of the output gear 11a.

Furthermore, an operation handle 19 (FIG. 15) is connected to the motor apparatus 11 through a connecting means. Through manipulation of the operation handle 19, the output gear 11a is rotated to wind the blind sheet 21.

Figure 4:
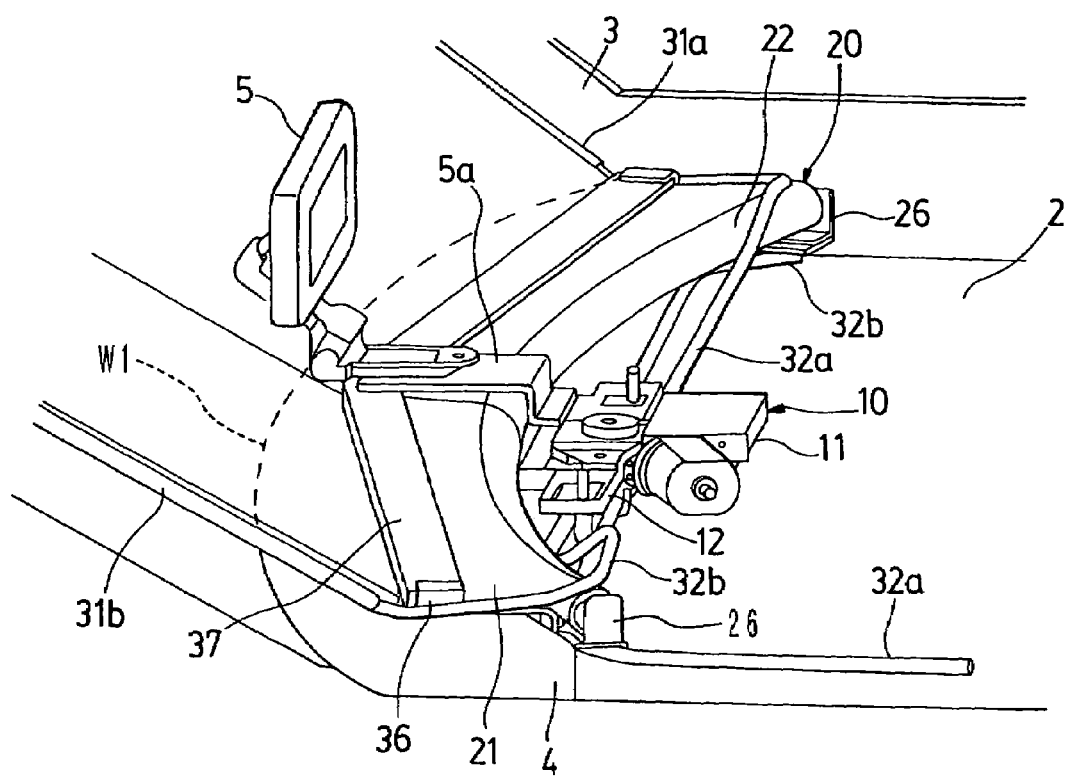
FIG. 4 is a partially enlarged view of the sunshade system of the first embodiment.

As discussed above, at the center of the roof 2, the cable pipes 32a, 32b are arranged parallel to one another. However, as shown in FIG. 4, the cable pipes 32a, 32b are bent to cross one another in a vertical direction at each of lateral sides of the roof 2. Near an upper end of the window W, an end of the cable pipe 32a, which extends from the cable pipe holder 33 on a left side of the cable pipe holder 33, is connected to the guide rail 31a, which extends along the left front pillar 3. The cable pipe 32a is bent to avoid interference with a roll shade arrangement 22. The cable pipe 32a, which extends from the cable pipe holder 33 on a right side of the cable pipe holder 33, is bent rearwardly along the roof 2 at the right side of the roof 2.

Furthermore, the cable pipe 32b, which extends from the cable pipe holder 33 on the left side of the cable pipe holder 33, is bent rearwardly along the roof 2 at the left side of the roof 2. Near the upper end of the window W, an end of the cable pipe 32b, which extends from the cable pipe holder 33 on the right side of the cable pipe holder 33, is connected to the guide rail 31b, which extends along the right front pillar 3. The cable pipe 32b is bent to avoid interference with the roll shade arrangement 22.

Figure 5:
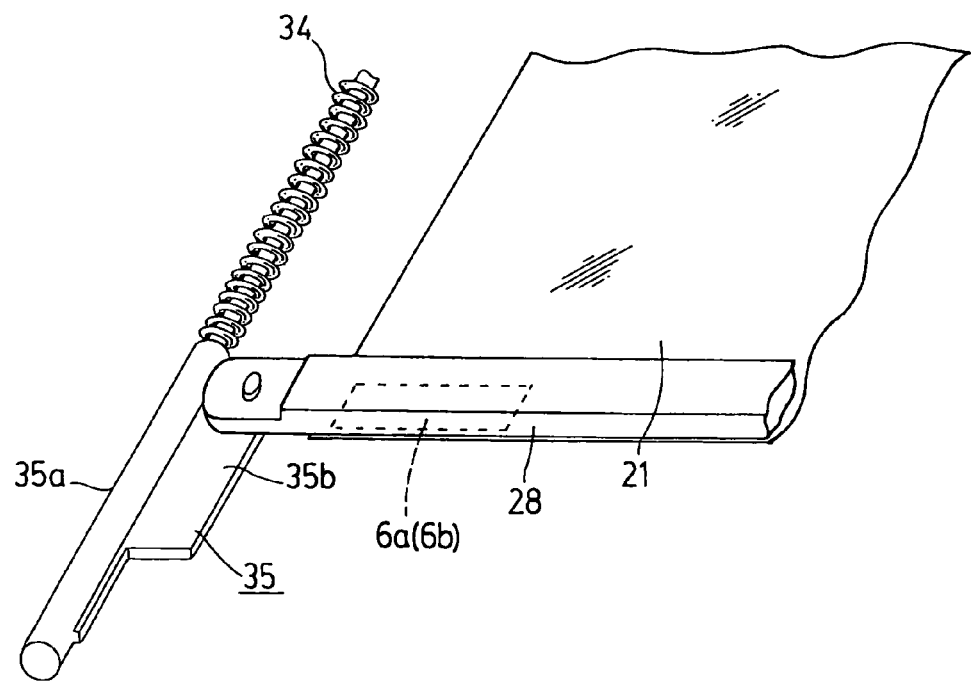
FIG. 5 is a perspective view showing a slider of the sunshade system of the first embodiment.
Figure 6:
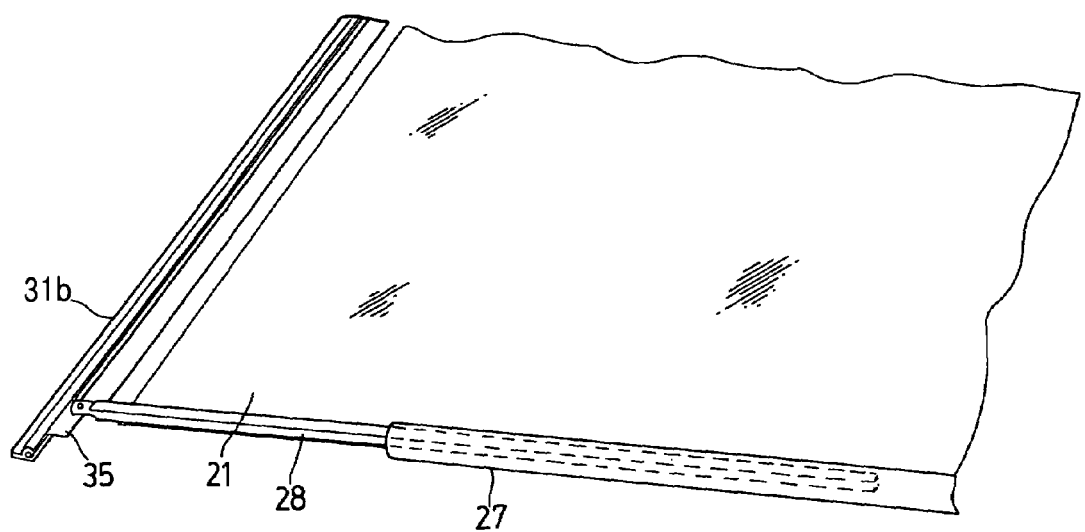
FIG. 6 is a descriptive view showing a slide shaft of the first embodiment.

The guide rails 31a, 31b are arranged along the left and right front pillars 3, respectively, and are connected to the cable pipes 32a, 32b, respectively, near the inner top end of the window W, as discussed above. The window W is formed into a trapezoidal shape, in which a width is increased toward its lower end. Thus, a space between the two guide rails 31a, 31b increases toward the lower ends of the guide rails 31a, 31b. As shown in FIG. 5, each slider 35 is connected to the end of the corresponding spiral cable 34. The slider 35 includes a sliding portion 35a, which has a generally circular cross section, and a shaft connecting portion 35b, which is formed integrally with the sliding portion 35a. The shaft connecting portion 35b of each slider 35 is connected to an outer end of a corresponding one of slide shafts 28 described below. The sliding portion 35a is slidably held in a corresponding one of the guide rails 31a, 31b, each of which is hollow and has a C-shaped cross section that is opened toward the widthwise center of the window W, as shown in FIG. 6.

As shown in FIG. 5, each spiral cable 34 is flexible and includes a coiled cable and a flexible cable. The flexible cable is inserted into the coiled cable and is secured. Thus, when the spiral cable 34 is driven by the drive arrangement 10, the spiral cable 34 can be smotthly moved in the corresponding cable pipe 32a, 32b along the curvature of the cable pipe 32a, 32b.

Since the drive arrangement 10 and the guide arrangement 30 are constructed in the above described manner, each spiral cable 34 is guided in the corresponding cable pipe 32a, 32b and the corresponding guide rail 31a, 31b upon rotation of the motor apparatus 11 in the normal direction or the reverse direction. Thus, each slider 35, which is secured to the end of the corresponding spiral cable 34, is moved between the upper end and the lower end of the corresponding guide rail 31a, 31b. Accordingly, the slide shafts 28 are moved between the upper end position near the upper end of the window W and the lower end position near the lower end of the window W.

Furthermore, in the present embodiment, the output gear 11a of the motor apparatus 11 is meshed with the spiral cables 34, as discussed above. Thus, when the motor apparatus 11 is driven to rotate the output gear 11a, the spiral cables 34 are driven to upwardly or downwardly move the sliders 35, which are secured to the distal ends of the spiral-cables 34. However, the present invention is not limited to this. For example, in place of each spiral cable 34, a flexible wire member, which has a distal end secured to the corresponding slider 35, may be used. In such a case, a rack is formed in the flexible wire member, and the output gear 11a is used as a pinion to form a rack and pinion structure, which drives the flexible wire member. Alternatively, each wire may be wound by the motor to pull the corresponding slider 35 toward the fully extended position, and vice versa.

Furthermore, in place of the spiral cables 34, ball screws may be used. In such a case, the rotational force of the output gear 11a is transmitted to each screw shaft, which serves as a transmitting member. With this arrangement, the screw shaft is rotated by the rotation of the output gear 11a, and a ball screw nut, which serves as the slider 35, is moved along the corresponding guide rail 31a.

Next, the roll shade mechanism 20 of the present embodiment will be described in greater detail. As shown in FIGS. 4 to 7, the roll shade mechanism 20 of the present embodiment includes the roll shade arrangement 22, roll shade holders 26, the blind sheet 21, a guide pipe 27 and the slide shafts 28. The roll shade holders 26 are arranged on opposed ends, respectively, of the roll shade arrangement 22 and support the roll shade arrangement 22. A base end of the blind sheet 21 is secured to the roll shade arrangement 22. The guide pipe 27 and the slide shafts 28 are connected together along a free end of the blind sheet 21. More specifically, the roll shade arrangement 22 is formed into a cylindrical shape and is curved along a reinforcement 4, which is located in a connection W1 between the window W and the roof 2. The guide pipe 27 and the slide shafts 28 correspond to a shaft of the present invention.

Figure 7:
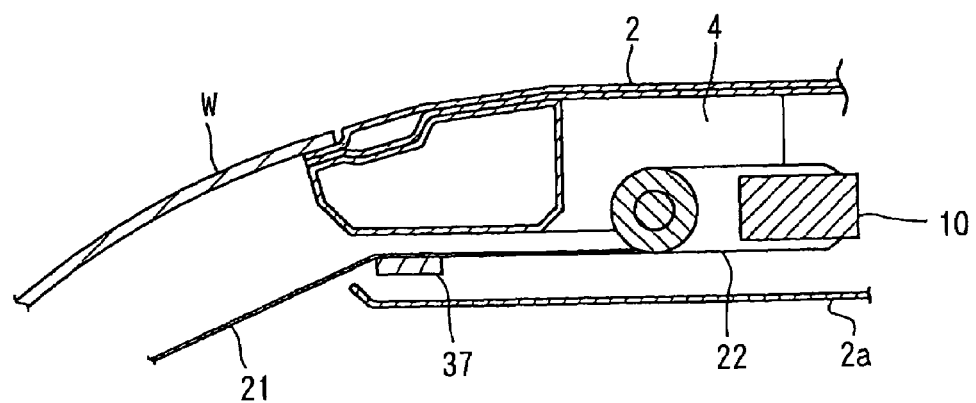
FIG. 7 is a descriptive cross sectional view showing a roll shade arrangement of the first embodiment.

When the window W is seen from the occupant compartment side, the window W is curved in such a manner that the widthwise center of the window W is convexed toward a front end of the vehicle in comparison to the left and right sides of the window W. The connection W1 between the window W and the roof 2 is curved, as shown in FIG. 4. Furthermore, as shown in FIGS. 4 and 7, the curved reinforcement 4 is connected to the connection W1 by, for example, welding, and the connection W1 forms the upper edge of the window W. As discussed above, in the roll shade mechanism 20 of the present invention, the roll shade arrangement 22, around with the blind sheet 21 is wound, is arranged rearward of the reinforcement 4 and follows the curved shape of the reinforcement 4. Thus, the roll shade arrangement 22 can be placed adjacent to the window W. Furthermore, since the roll shade arrangement 22 is curved, a space, which is at least partially bound with the roll shade arrangement 22, is provided. The motor apparatus 11 is advantageously arranged in this space while avoiding interference with, for example, a sunroof system.

Also, in this way, as shown in FIG. 7, the roll shade arrangement 22 and the motor apparatus 11 of the drive arrangement 10 can be arranged one after the other in the fore-aft direction of the vehicle in the space between a ceiling panel (a trim member) 2a and the roof 2. In other words, it is not required to arrange the roll shade arrangement 22 and the motor apparatus 11 one after the other in the vertical direction above a head of a driver. Thus, an appropriate space can be provided above the head of the driver. As discussed above, the roll shade arrangement 22 is curved along the edge of the window W, so that the structure around the roll shade arrangement 22 and the drive arrangement 10 is made compact in the fore-aft direction and also in the vertical direction of the vehicle.

Furthermore, as shown in FIG. 4, a plate-like mirror holding member 5a is connected to the motor mount member 12 and projects forward, and a room mirror 5 is connected to the mirror holding member 5a to form a stay.

Two sheet limiting member holders 36 are connected to the cable pipes 32a, 32b, respectively, below the reinforcement 4. Ends of a sheet limiting member 37 are supported by the sheet limiting member holders 36, respectively. In the present embodiment, the sheet limiting member 37 is formed into a V-shaped flat plate, which projects toward the front end of the vehicle, as shown in FIG. 4. A position of each of the upper ends of the guide rails 31a, 31b generally coincides with a position of the adjacent front edge of the sheet limiting member 37.

The blind sheet 21 is arranged between the sheet limiting member 37 and the reinforcement 4. This structure advantageously limits movement of the blind sheet 21 in a direction away from the surface of the window W in the fully extended state of the blind sheet 21. As discussed above, when the blind sheet 21 is pulled from the roll shade arrangement 22 toward the window W, the sheet limiting member 37 holds the blind sheet 21 at the location near the upper ends of the guide rails 31a, 31b, i.e., the location near the upper edge of the window W.

That is, the blind sheet 21 is pulled forward from the roll shade arrangement 22 and is then redirected at the sheet limiting member 37, so that the blind sheet 21 is pulled downwardly in the oblique direction along the inner surface of the window W. Due to the presence of the sheet limiting member 37, the blind sheet 21 can cover the inner surface of the window W near the inner surface of the window W. Thus, the blind sheet 21 can effectively limit an increase in the temperature of the occupant compartment by the sunlight.

The sheet limiting member 37 is formed into the V-shaped plate in the present embodiment, as discussed above. Alternatively, the sheet limiting member 37 can be formed into a curved plate, which is curved along the connection line between the window W and the roof 2 to substantially coincide with the connection line. Furthermore, the sheet limiting member 37 is not necessarily the plate. For example, the sheet limiting member can be a roller(s), which are rotatably supported by a corresponding rotatable shaft. In such a case, when the blind sheet 21 is extended or retracted, the roller allows smooth movement of the blind sheet 21.

Figure 8:
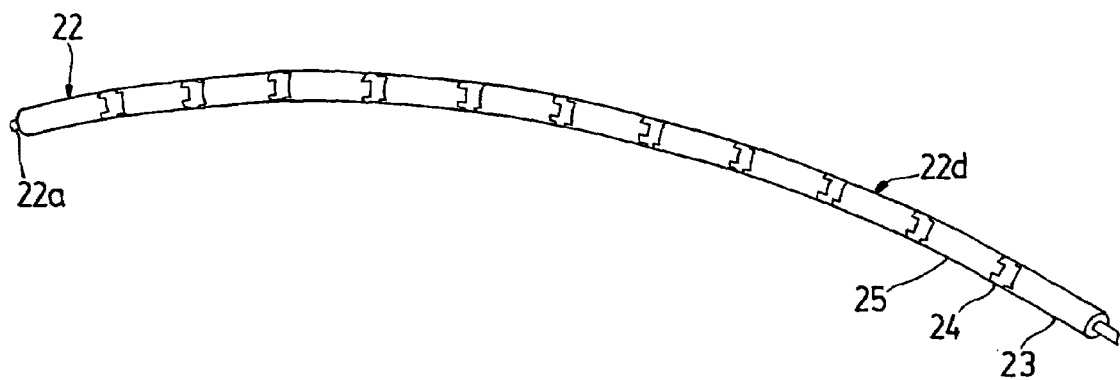
FIG. 8 is a descriptive view of the roll shade arrangement of the first embodiment.
Figure 9:
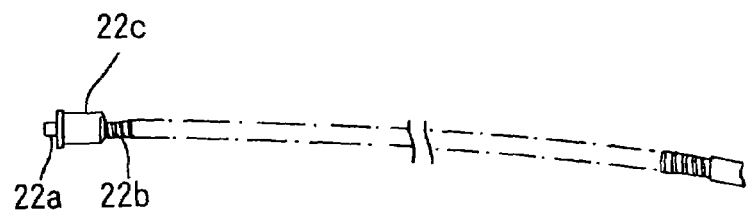
FIG. 9 is another descriptive view of the roll shade arrangement of the first embodiment.
Figure 10:
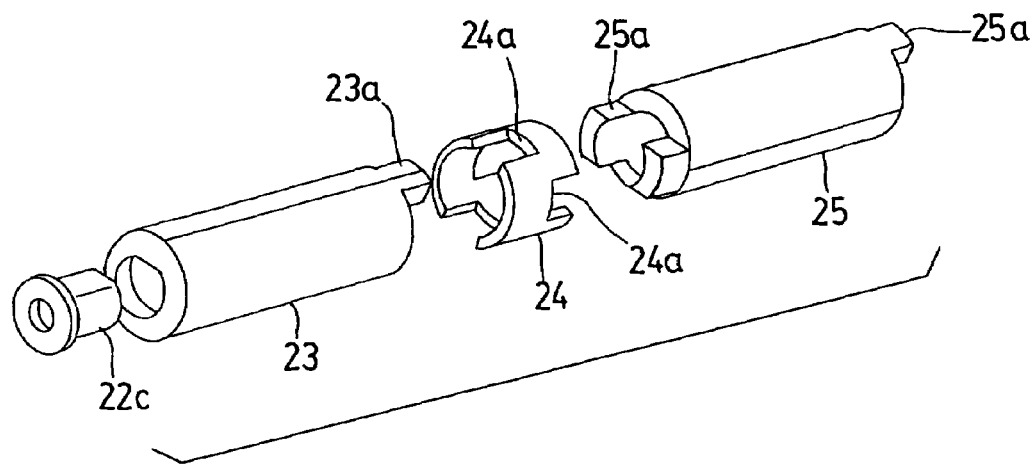
FIG. 10 is another descriptive view of the roll shade arrangement of the first embodiment.

The roll shade arrangement 22, which is curved in the manner shown in FIGS. 8-10, includes a center shaft 22a, a coil spring 22b, a cylindrical spring holder 22c and a cylindrical rotatable rod 22d. The center shaft 22a is curved symmetrically with respect to the widthwise center of the vehicle body. One end of the coil spring 22b is secured to one end of the center shaft 22a. The other end of the coil spring 22b is rotatably arranged at the other end of the center shaft 22a and is secured to the spring holder 22c. The rotatable rod 22 covers the center shaft 22a and the coil spring 22b.

The base end of the blind sheet 21 is connected to the rotatable rod 22d. The rotatable rod 22d includes side rods 23, joints 24 and center rods 25, which are connected together to form the rotatable rod 22d. The side rods 23, the joints 24 and the center rods 25 are made of, for example, synthetic resin and are formed into rigid bodies, which do not have flexibility and elasticity that are present in, for example, rubber. The ends of the center shaft 22a are secured to the roll shade holders 26, respectively. Furthermore, the coil spring 22b is twisted to apply a rotational force in a winding direction of the blind sheet 21.

The center shaft 22a is only required to maintain the curved state while the ends of the center shaft 22a are secured to the roll shade holders 26, respectively. Thus, the center shaft 22a can be a permanently curved tubular resin member. Alternatively, the center shaft 22a can be made of a flexible material and can be curved when the center shaft 22a is connected to the roll shade holders 26.

The side rods 23 are arranged at the ends, respectively, of the center shaft 22a. With reference to FIG. 10, one end surface (a left end surface in FIG. 10) of one of the side rods 23 is generally annular. A flat surface portion, which serves as an engaging portion engaged with the spring holder 22c, is formed in an interior of the side rod 23. The side rod 23 and the spring holder 22c are fitted together to rotate integrally. Two engaging projections 23a are formed in the other end surface of the side rod 23 at 180 degree intervals in such a manner each engaging projection 23a projects in the axial direction and has a predetermined angular width.

Also, similar to the engaging projections 23a of the side rod 23, two engaging projections 25a project from each end of the center rod 25. However, the engaging projections 25a provided in the one end of the center rod 25 are displaced about 90 degrees from the engaging projections 25a provided in the other end of the same center rod 25.

Each joint 24 connects between the corresponding side rod 23 and the corresponding center rod 25 or connects between two of the center rods 25. Thus, two engaging recesses 24a, which engage the engaging projections 23a or the engaging projections 25a, are formed in each end of the joint 24. Furthermore, similar to the engaging projections 25a of the center rods 25, the engaging recesses 24a provided in the one end of the joint 24 are displaced about 90 degrees from the engaging recesses 24a provided in the other end of the same joint 24. The engaging projections 23a of each side rod 23 and the engaging projections 25a of each center rod 25 are loosely fitted to the engaging recesses 24a of the corresponding joint 24 to connect the side rods 23, the center rods 25 and the joints 24 together.

In this way, the rotatable rod 22d, which includes the side rods 23, the joints 24 and the center rods 25, can be axially connected while the center shaft 22a is inserted through the rotatable rod 22d. When these components are constructed into a sub-assembly to form the roll shade arrangement 22, a clearance (play) is provided between each adjacent two of the side rods 23, the joints 24 and the center rods 25. Due to the presence of the play, each side rod 23 or center rod 25, which is connected to the corresponding joint 24, can be bent about 90 degrees relative to the joint 24, which serves as an articulation.

In the present embodiment, the connection between the engaging projections 23*a*, 25*a* and the engaging recesses 24*a* is achieved by simply engaging the engaging projections 23*a*, 25*a* with the engaging recesses 24*a*. Alternatively, a hinge pin or the like can be used to rotatably connect them together in a manner that allows smooth pivotal movement of the articulated links.

Furthermore, a circumferential width of each engaging projection 23*a*, 25*a* is substantially the same as a circumferential width of the corresponding engaging recess 24*a*. When the rotatable rod 22*d* is rotated about the center shaft 22*a*, the rotatable rod 22*d* can conduct the rotational force without causing a substantial positional deviation of any of the side rods 23, the joints 24 and the center rods 25. Thus, the side rods 23, the joints 24 and the center rods 25, which are connected together in the axial direction, can be integrally rotated while the side rods 23, the joints 24 and the center rods 25 are curved in conformity with the curved shape of the center shaft 22*a*.

The roll shade arrangement 22 is constructed in the above-described manner, so that the roll shade arrangement 22, which is formed as the sub-assembly, can be curved along the reinforcement 4 and can be secured to the roll shade holders 26 at its ends. At this time, the center shaft 22*a* is secured to the roll shade holders 26, and the rotatable rod 22*d*, which is arranged around the center shaft 22*a*, can be rotated while the rotatable rod 22*d* is curved in conformity with the curved shape of the center shaft 22*a*. That is, even when the rotatable rod 22*d* is rotated about the center shaft 22*a*, which serves as the rotational axis of the rotatable rod 22*d*, the curved shape of the center shaft 22*a* is maintained, and the roll shade arrangement 22 maintains the curved shape that coincides with the cured shape of the reinforcement 4.

Next, an exemplary comparative case will be described for comparative purpose. In the exemplary comparative case, the roll shade arrangement 22 is made of an elastic tube, such as a vinyl hose, and ends of the elastic tube are rotatably supported by holders. In such a case, due to the elasticity of the elastic tube, the elastic tube can be curved along the reinforcement 4. However, due to occurrence of twist of the vinyl tube, the left and right ends of the blind sheet can be disadvantageously, unequally wound around the roll shade arrangement 22. Furthermore, in a case where a permanently curved rigid resin tube is used to form the roll shade arrangement 22, when the resin tube is rotated, each end of the resin tube will disadvantageously orbit along a relatively large circle.

In order to limit occurrence of such deviation, the rigid components (e.g., the center rods 25) need to be used in the roll shade arrangement 22. When the rigid components are not used in the roll shade arrangement 22, twist will be generated in the roll shade arrangement 22, so that the blind sheet 21 cannot be smoothly extended or retracted. Thus, in the present invention, the rotatable portion of the roll shade arrangement 22 is made of the center rods 25 and the side rods 23, which are connected through the joints 24.

Furthermore, as discussed above, the one end of the coil spring 22*b* is secured to the center shaft 22*a*, and the other end of the coil spring 22*b* is connected to the rotatable rod 22*d* through the spring holder 22*c*. Thus, when the rotatable rod 22*d* is rotated forward to extend the blind sheet 21, the rotational force is applied to the coil spring 22*b* in a retracting direction of the blind sheet 21. Thus, at the time of extending the blind sheet 21, a tension is applied to the blind sheet 21, so that the blind sheet 21 can be smoothly retracted at the time of retracting the blind sheet 21 by the spring force of the twisted coil spring 22*b*.

The blind sheet 21 of the present embodiment is made of a sheet material, which has a predetermined light transmittance and does not substantially stretch in the extending/retracting direction of the blind sheet 21 while being stretchable in a width direction (a direction that is perpendicular to the extending/retracting direction of the blind sheet 21). Furthermore, in a natural state, the blind sheet 21 has a shape close to a rectangular shape. For example, in the stretchable sheet material, which is stretchable in the width direction, stretchable threads are used as threads that extend in the width direction. Furthermore, even when the threads show only little stretchability, the sheet can be formed to have stretchability in the width direction by appropriate weaving. Furthermore, a sheet material, which shows stretchability in both of the width direction and the extending/retracting direction, can be used to form the blind sheet 21.

Furthermore, in the present embodiment, the blind sheet 21 is entirely stretchable in the width direction. Alternatively, each of left and right ends of the blind sheet 21 can be formed from a sheet material, which is stretchable in the width direction, and the center of the blind sheet 21 connected to the guide pipe 27 can be formed from a sheet material, which shows only little stretchability or no stretchability in the width direction. These sheets can be joined together by sewing to form the blind sheet 21.

Figure 14A:
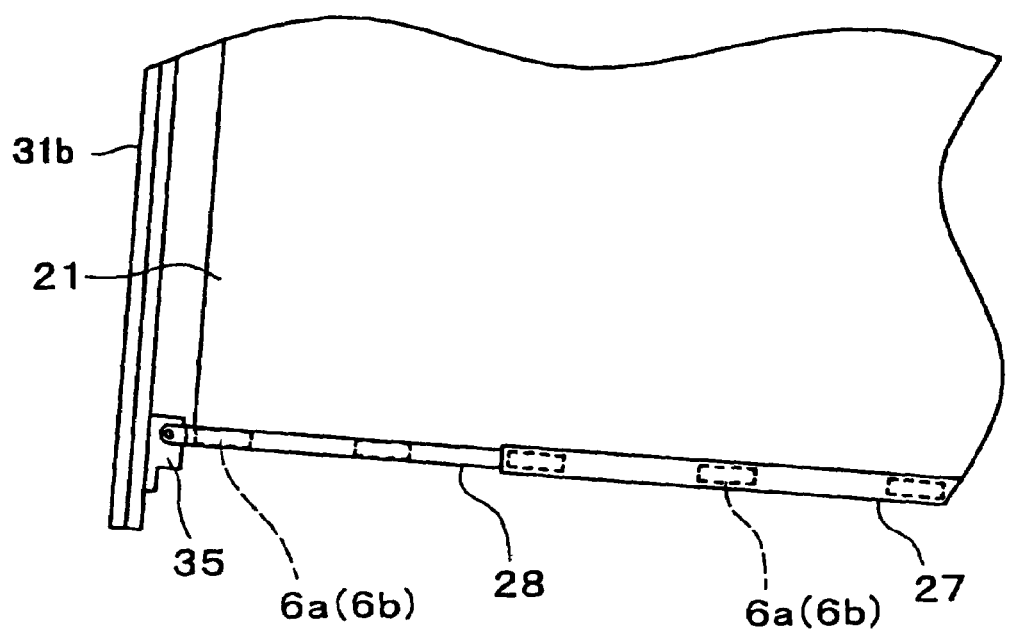
FIG. 14A is a descriptive view showing installation of the blind sheet of the first embodiment.
Figure 14B:
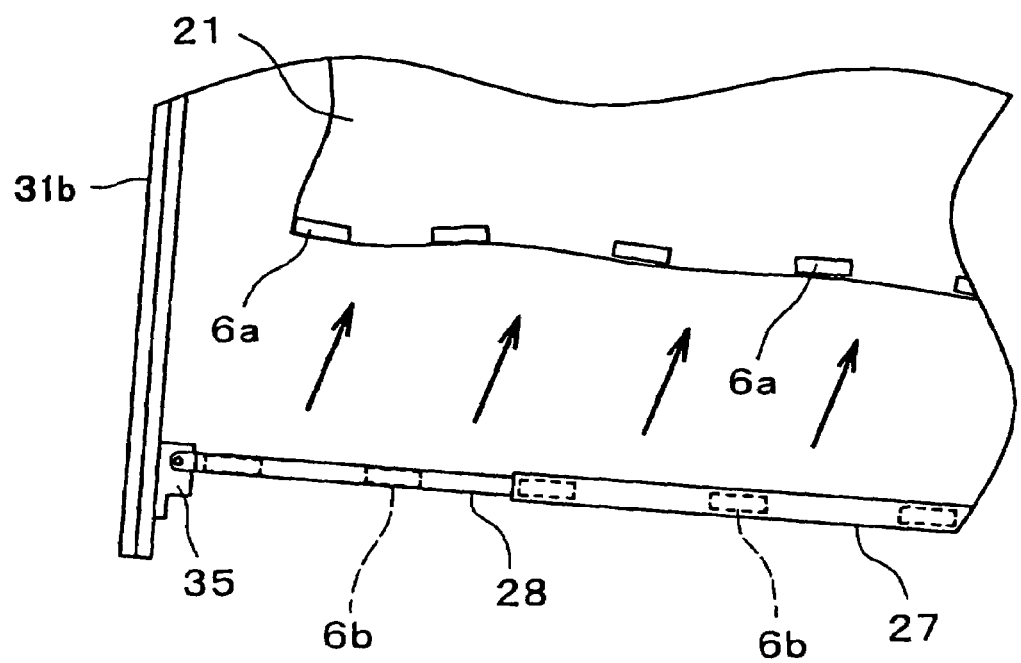
FIG. 14B is a descriptive view showing releasing of the blind sheet of FIG. 14A.

The free end of the blind sheet 21 is connected to the hollow guide pipe 27, which is bent into the V-shape at its center and has linear portions on its left and right ends (FIG. 1). A plurality of hook-and-loop fasteners 6*a*, each of which has a predetermined length, is secured to the blind sheet 21. Also, a plurality of hook-and-loop fasteners 6*b*, each of which has a predetermined length, is secured to the guide pipe 27. The blind sheet 21 and the guide pipe 27 are detachably connected to one another by connecting between the hook-and-loop fasteners 6*a* secured to the blind sheet 21 and the hook-and-loop fasteners 6*b* secured to the guide pipe 27 (FIGS. 14A and 14B).

Furthermore, as shown in FIG. 6, slide shafts 28 are slidably received in the left and right ends of the guide pipe 27, respectively. Alternative to the structure shown in FIG. 6, two coil springs may be provided in the guide pipe 27. In such a case, an inner end of each coil spring is secured to an interior of the guide pipe 27, and an outer end of the coil spring is secured to the inserted end of the corresponding slide shaft 28, which is inserted into the guide pipe 27. In this way, each slide shaft 28 is urged laterally outwardly by the corresponding coil spring.

Furthermore, the guide pipe 27 can be curved with a predetermined curvature to correspond with the curved shape of the window W. In such a case, the slide shafts 28, which are inserted into the guide pipe 27, can be shaped to correspond with this curvature to allow slide movement of the slide shafts 28 relative to the guide pipe 27.

As shown in FIG. 5, a hook-and-loop fastener 6*b*, which has a predetermined length, is secured to the outer end of each slide shaft 28. Also, a hook-and-loop fastener 6*a*, which has a predetermined length, is secured to each of the left and right lateral sides of the free end of the blind sheet 21. Each slide shaft 28 and the blind sheet 21 are also detachably connected to one another by connecting between the hook-and-loop fastener 6*a* secured to the blind sheet 21 and the hook-and-loop fastener 6*b* secured to the slide shaft 28.

As described above, the space between the left guide rail 31a and the right guide rail 31b is increased toward the lower end of the window W. Thus, when the sliders 35 are moved downward, the slide shafts 28, which are inserted in the guide pipe 27, are progressively pulled outwardly from the guide pipe 27. When the slide shafts 28 are pulled outwardly from the guide pipe 27, the blind sheet 21 is pulled outwardly by the slide shafts 28, so that the blind sheet 21 stretches in the width direction.

The system S of the present embodiment is constructed in the above described manner. When the blind sheet 21 is fully extended, the blind sheet 21 stretches in the width direction in conformity with the shape of the window W. Thus, the blind sheet 21 can cover substantially the entire surface of the window W.

Figure 11A:
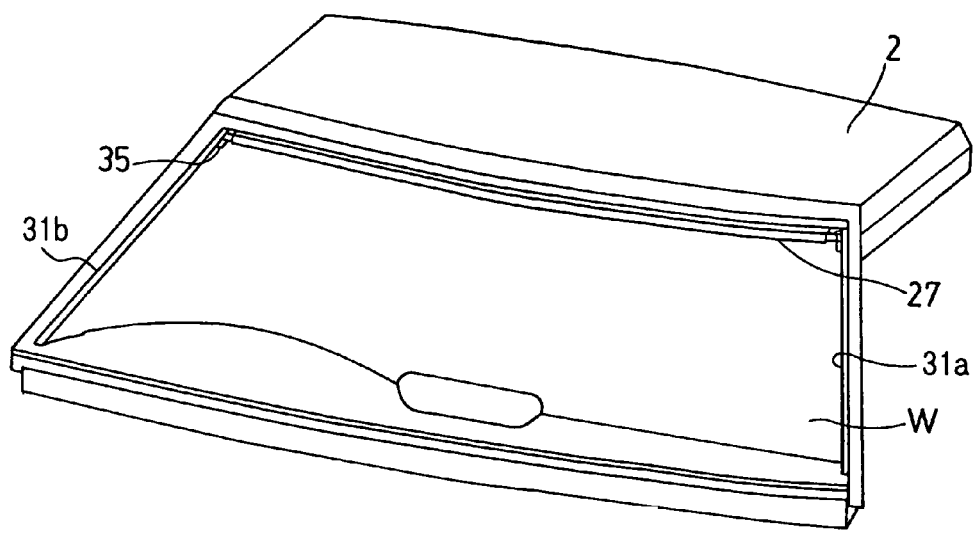
FIG. 11A is a descriptive view showing a fully retracted state of a blind sheet of the first embodiment.
Figure 11B:
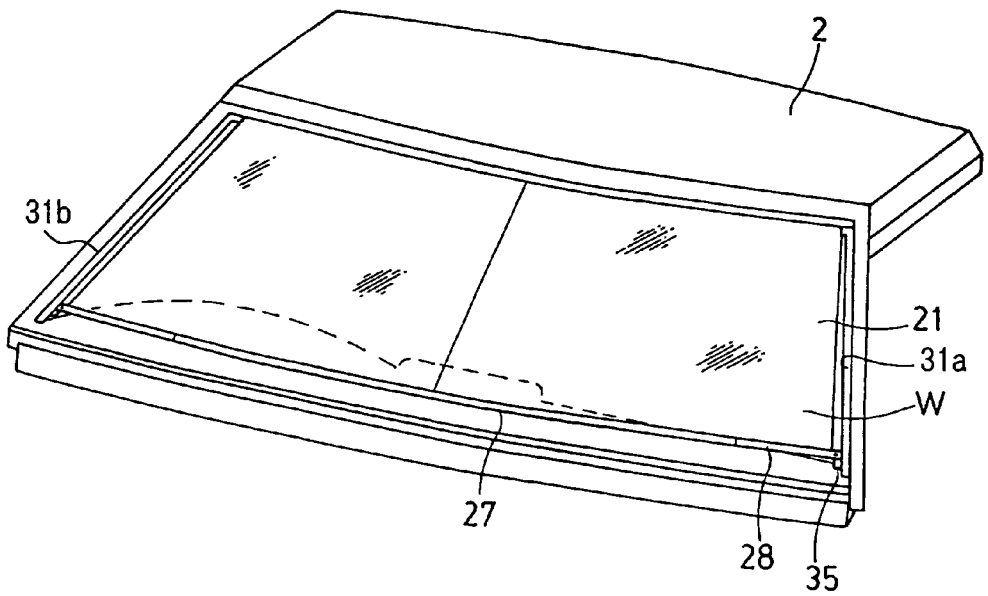
FIG. 11B is a descriptive view showing a fully extended state of the blind sheet of the first embodiment.

FIG. 11A shows the state where the blind sheet 21 is fully wound (the fully retracted position). FIG. 11B shows the state where the blind sheet 21 is fully extended (the fully shading position or simply referred to as the shading position). As shown in FIG. 11B, in the system S of the present embodiment, substantially the entire surface of the window W can be covered at the fully shading position to shade the sunlight. That is, a triangular space (unshaded portion) is not left in each of the left and right sides of the window. Thus, it is possible to limit an increase in the temperature of the occupant compartment, which could be more rapidly induced by transmission of the sunlight into the occupant compartment through the triangular space.

Next, the electrical construction of the system S will be described with reference to FIG. 12. The system S includes a controller 40, which outputs a drive signal to the motor apparatus 11 of the drive arrangement 10, which provides a drive force to extend or retract the blind sheet 21. The controller 40 includes a microcomputer. The controller 40 receives a control signal from an operation switch 41, a measurement signal from a temperature sensor 42, a measurement signal from an optical sensor 43, a measurement signal from a position sensor 44 and a measurement signal from a gear position sensor 45. The operation switch 41 is operable by the occupant. The temperature sensor 42 senses the temperature of the occupant compartment. The optical sensor 43 senses an illuminance and an incident direction (angle) of the sunlight, which enters the occupant compartment. The position sensor 44 senses the position of the blind sheet 21. The gear position sensor 45 senses a gear position of the vehicle. The controller 40 outputs a drive signal to the motor apparatus 11 to rotate the motor apparatus 11 in the normal direction or the reverse direction.

The operation switch 41 includes a plurality of switch elements for retracting the blind sheet 21 and for extending the blind sheet 21. When the occupant wants to extend or retract the blind sheet 21, the occupant selects and operates a corresponding one of the switch elements of the operation switch 41, so that a corresponding operation signal is outputted from the operation switch 41 to the controller 40. When the controller 40 receives the operation signal, the controller 40 outputs a corresponding drive signal to the motor apparatus 11 based on the operation signal to rotate the motor apparatus 11 in a corresponding one of the normal direction and the reverse direction.

The temperature sensor 42 and the optical sensor 43 are arranged in predetermined locations (e.g., the inner surface of the window W or a top of a dashboard) in the occupant compartment. The temperature sensor 42 senses the temperature of the occupant compartment and outputs the measurement signal, which corresponds to the measured temperature, to the controller 40. The optical sensor 43 senses the illuminance and the incident angle of the sunlight, which enters the occupant compartment.

The optical sensor 43 can sense the illuminance of the sunlight, which enters the occupant compartment, as discussed above. In addition, the optical sensor 43 can sense whether the sunlight enters the occupant compartment within a predetermined incident angle (direction) range. The optical sensor 43 includes one or more directional sensor elements and senses that the sunlight enters the occupant compartment within a predetermined angular range, in which the sunlight reaches the height of the eyes of the driver or of an occupant, who seats on a front passenger seat.

A slit arrangement may be provided in front of the sensor element of the optical sensor 43 to achieve the directionality, so that only the predetermined incident sunlight, which enters the occupant compartment at a predetermined angular range, can reach a surface of the sensor element of the optical sensor 43. The location of the optical sensor 43 is not limited to the inner surface of the window W or the top of the dashboard, and the optical sensor 43 can be provided to, for example, the stay of the mirror.

The controller 40 monitors the above-described measurement signals. In a parked state of the vehicle where the controller 40 determines that the vehicle is in the parked state based on the measurement signal from the gear position sensor 45, when the controller 40 determines that the temperature of the occupant compartment is equal to or greater than the predetermined temperature based on the measurement signal from the temperature sensor 42 or when the controller 40 determines that the illuminance of the sunlight, which enters the occupant compartment, is equal to or greater than the predetermined value based on the measurement signal from the optical sensor 43, the controller 40 automatically outputs the drive signal to the motor apparatus 11 to extend the blind sheet 21 and thereby to cover the window W to shade the sunlight. The controller 40 determines that the vehicle is in the parked state, for example, when the gear is in a parking position.

Specifically, when the vehicle is parked without extending the blind sheet 21, the temperature of the occupant compartment becomes equal to or greater than the predetermined temperature. However, when the controller 40 determines that the strong sunlight enters the occupant compartment, the blind sheet 21 is automatically extended to limit an increase in the temperature of the occupant compartment. As described above, by automatically extending the blind sheet 21, the temperature increase of the occupant compartment is advantageously limited. Thus, when the occupant returns to the vehicle, it is not required to increase an air flow of a vehicle air conditioning system to rapidly decrease the temperature of the occupant compartment, thereby limiting waste of a large amount of energy.

As explained above, the position sensor 44 senses the position of the blind sheet 21. For example, with reference to FIG. 13, the position sensor 44 can include a plurality of limit switches, which are provided at multiple positions, such as the fully retracted position (the position A in FIG. 13) and the fully extended position (the position C in FIG. 13), along the guide rails 31a, 31b. When the slider 35 contacts one of the limit switches, a signal is outputted from this limit switch. Thus, the controller 40 can determine the position of the slider 35 based on this signal.

Alternatively, the number of rotations of the roll shade arrangement 22 may be sensed to sense the position of the blind sheet 21, and a measurement signal, which indicates the number of rotations of the roll shade arrangement 22, can be transmitted to the controller 40.

When the drive signal is outputted automatically or manually to the motor apparatus 11 to move the blind sheet 21, the controller 40 receives the measurement signal from the position sensor 44 to sense the position of the blind sheet 21. Based on the measurement signal from the position sensor 44, the controller 40 determines whether the blind sheet 21 is in the fully extended position or in the fully retracted position and stops the transmission of the drive signal at that position. When the transmission of the drive signal is stopped, the blind sheet 21 can be retained at the fully retracted position, the fully extended position or an intermediate position therebetween by a self retaining mechanism (e.g., a clutch) provided in the motor apparatus 11.

Figure 13:
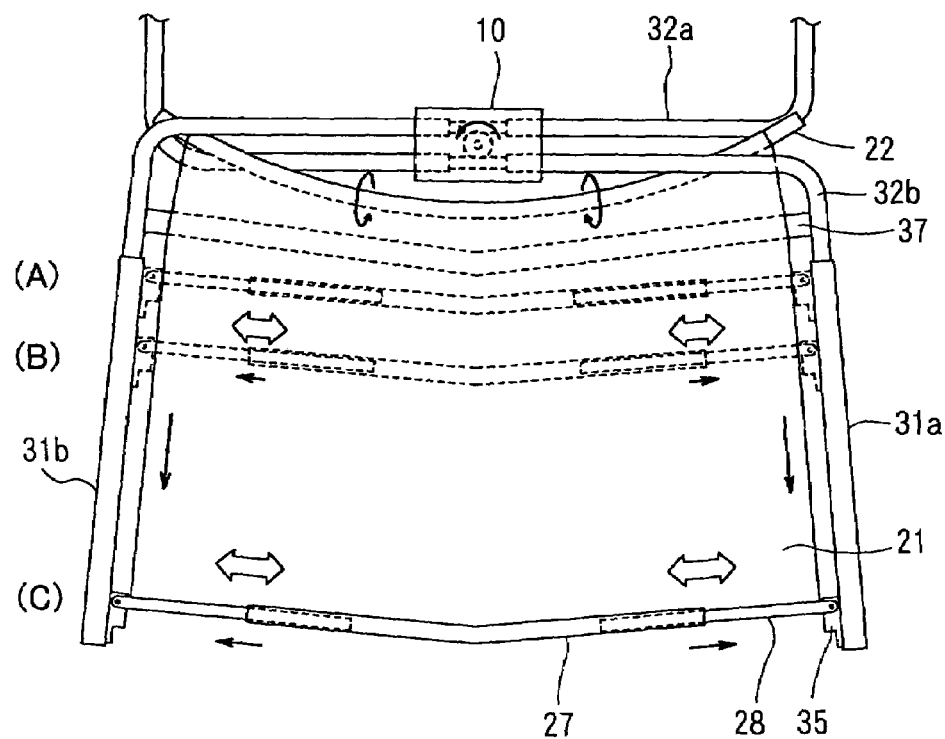
FIG. 13 is a descriptive view showing operation of the sunshade system of the first embodiment.

The above system S can be used as a sun visor. In the system S, the one or more intermediate stop positions may be provided between the fully retracted position and the fully extended position. The system S can be constructed to automatically extend the blind sheet 21 to the corresponding intermediate position during driving of the vehicle. FIG. 13 schematically shows the system S. The position A of FIG. 13 indicates the fully retracted position of the blind sheet 21, as discussed above. The position C of FIG. 13 indicates the fully extended position of the blind sheet 21, as discussed above. The position B of FIG. 13 indicates the intermediate position of the blind sheet 21.

In a driving state of the vehicle where the controller 40 determines that the vehicle is in the driving state based on the corresponding signal from the gear position sensor 45, when the controller 40 determines that the illuminance of the incident sunlight is equal to or greater than the predetermined value based on the measurement signal from the optical sensor 43, and the incident direction of the incident sunlight is within the predetermined angular range, the controller 40 automatically outputs the drive signal to the motor apparatus 11 to extend the blind sheet 21 to the intermediate position. When the blind sheet 21 is extended to the intermediate position, the controller 40 stops the transmission of the drive signal to the motor apparatus 11.

Furthermore, when the controller 40 determines that the illuminance of the incident sunlight is less than the predetermined value, and the incident direction of the incident sunlight is out of the predetermined angular range, the controller 40 transmits the drive signal for rotating the motor apparatus 11 in the reverse direction to the motor apparatus 11 to automatically retract the blind sheet 21.

To achieve this operation, the operation switch 41 includes a corresponding switch element, which is manipulated to extend the blind sheet 21 to the intermediate position. The controller 40 determines that the vehicle is in the driving state, for example, when the gear is in a drive position.

The system S can be modified as follows. That is, in the state where the blind sheet 21 is in the fully extended position in the parked state of the vehicle, the controller 40 may automatically transmit the drive signal for rotating the motor apparatus 11 in the reverse direction to move the blind sheet 21 to the fully retracted position when gear is shifted to the drive position. The system can be also modified as follows. That is, even in the state where the gear is in the drive position, the blind sheet 21 may be moved to the fully retracted position when the operation switch 41 is manipulated manually by the occupant.

In general, the vehicles have thin plate like sun visors in the driver seat side and in the front passenger seat side. A hinge is provided to the vehicle front side of each sun visor. The occupant pivots the sun visor about the hinge toward the front side to shade the sunlight. In such a case, when the sun visor is pivoted, the sun visor passes over the head of the driver. This may interfere with vehicle maneuvering of the driver. However, the above system S can serve as the sun visor and does not pass over the head of the driver to interfere with the vehicle maneuvering of the driver. Also, the system S automatically extends the blind sheet 21. Thus, the occupant does not need to operate the switch 41 to shade the sunlight by the blind sheet 21.

As described above, in the system S, the drive signal is transmitted from the controller 40 to the motor apparatus 11 based on the signal from the operation switch 41 or the measurement signal transmitted from the sensor (s). Then, the motor unit 13 of the motor apparatus 11 is rotated based on the drive signal. The rotational force of the motor unit 13 is transmitted to the spiral cables 34 through the output gear 11a to drive the spiral cables 34. When the spiral cables 34 are driven, the sliders 35 are moved downwardly or upwardly to extend or retract the blind sheet 21.

The blind sheet 21 is wound by the motor apparatus 11. Thus, when the drive signal is not appropriately transmitted to the motor apparatus 11, or when the drive power source has a trouble, the sliders 35, which are secured to the spiral cables 34, are stopped in the guide rails 31a, 31b. In such a case, the blind sheet 21 cannot be wound from the fully extended state to the fully retracted state.

However, the system S is constructed to enable winding of the blind sheet 21 to the fully retracted state.

FIG. 14A shows an exemplary state where the blind sheet 21 is stuck in the fully extended position. At this time, the occupant can manually release the connection between the hook-and-loop fasteners 6a and the hook-and-loop fasteners 6b to release the blind sheet 21 from the guide pipe 27 and the slide shafts 28.

When the blind sheet 21 is released from the guide pipe 27 and the slide shafts 28, the blind sheet 21 is pulled and is wound around the roll shade arrangement 22 by the urging force, which is exerted in the retracting direction by the coil spring 22b. In this way, even when the above trouble is encountered, clear view of the window W can be achieved.

Furthermore, in the system S, when the above trouble is encountered, the drive arrangement 10 can be manually operated to drive the drive arrangement 10 to wind the blind sheet 21 to the retracted state.

Figure 15:
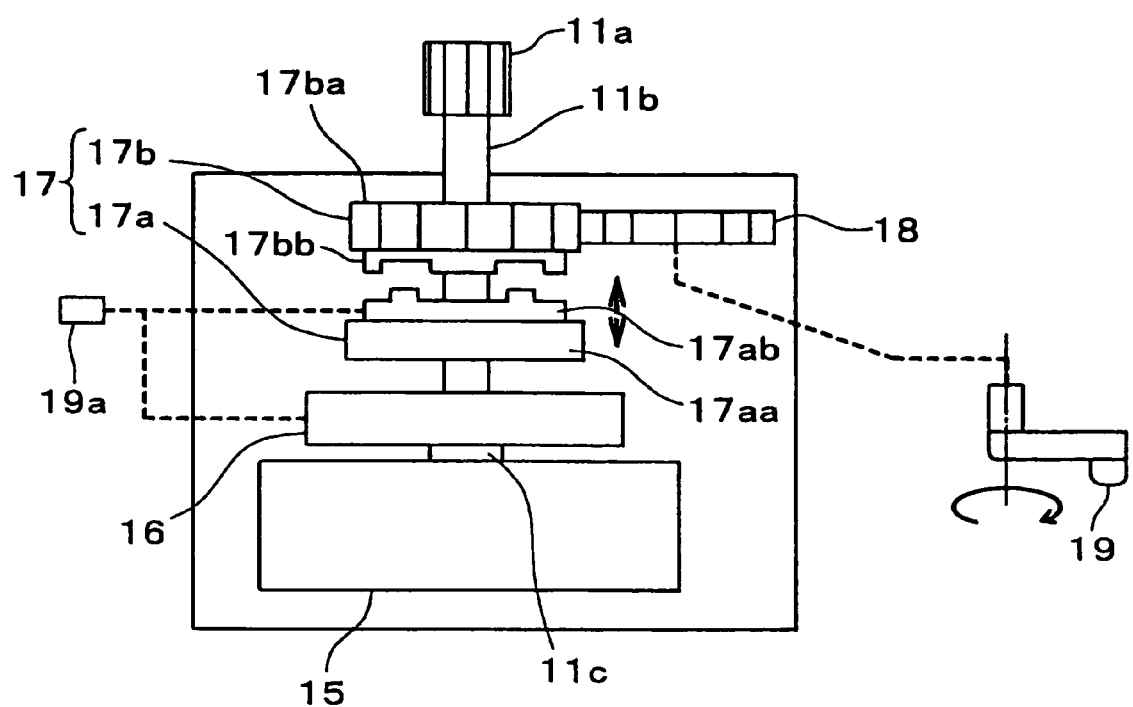
FIG. 15 is a descriptive view showing the drive arrangement of the first embodiment.

As shown in FIG. 15, the speed reducing mechanism 14, which constitutes the motor apparatus 11, includes a speed reducing gear arrangement 15, a clutch arrangement (a coupling means) 16, a switching arrangement 17 and a spur gear 18. The speed reducing gear arrangement 15 reduces the rotational speed of the motor unit 13. The clutch arrangement 16 conducts the rotational force from the speed reducing gear arrangement 15 to the output gear 11a. The switching arrangement 17 is arranged closer to the output gear 11a in comparison to the clutch arrangement 16. The spur gear 18 is meshed with the switching arrangement 17.

The clutch arrangement 16 is an electromagnetic clutch and includes rotatable shafts 11c, 11b. The rotatable shaft 11c is connected to the speed reducing gear arrangement 15, and the rotatable shaft 11b is connected to the output gear 11a. When the motor apparatus 11 is properly operated without having the above trouble, the clutch arrangement 16 conducts the normal rotation or reverse rotation of the rotatable shaft 11c to the output gear 11a through the rotatable shaft 11b. However, when the drive power is not supplied to the motor apparatus 11 or when the controller 40 senses abnormality, the connection between the rotatable shaft 11c and the rotatable shaft 11b is disconnected. In this way, the conduction of the rotational force from the speed reducing gear arrangement 15 to the output gear 11*a* is interrupted, and the conduction of the rotational force from the output gear 11*a* to the speed reducing arrangement 15 is also interrupted.

The switching arrangement 17 includes a driving-side engaging portion 17*a* and a driven-side engaging portion 17*b*. The driving-side engaging portion 17*a* is located on the clutch arrangement 16 side, and the driven-side engaging portion 17*b* is spaced a predetermined distance from the driving-side engaging portion 17*a* in the axial direction of the rotatable shaft 11*b*. The driving-side engaging portion 17*a* is secured to the rotatable shaft 11*b* and rotates integrally with the rotatable shaft 11*b*. The driven-side engaging portion 17*b* is loosely fitted to the rotatable shaft 11*b*.

The driving-side engaging portion 17*a* includes a base 17*aa* and an engaging protrusion 17*ab*. During the normal operation of the motor apparatus 11, engaging protrusion 17*ab* is placed adjacent to the base 17*aa* by the electromagnetic force generated by the base 17*aa*, as shown in FIG. 15. However, at the time of the failure, the base 17*aa* stops generation of the electromagnetic force. Thus, the engaging protrusion 17*ab* is urged and is moved by an urging means (not shown) in a direction away from the base 17*aa*.

The driven-side engaging portion 17*b* includes a spur gear 17*ba* and an engaging groove portion 17*bb*. The engaging groove portion 17*bb* is connected to the spur gear 17*ba*. The spur gear 17*ba* is meshed with the spur gear 18, which is connected to the operation handle 19 through the connecting means. The engaging groove portion 17*bb* is constructed to mesh with the engaging protrusion 17*ab*.

The clutch arrangement 16, the switching arrangement 17, the spur gear 18 and the operation handle 19 constitute a manual operating means of the present invention.

Next, operation of the drive arrangement 10 will be described. At the time of normal operation where the above failure does not exist, the forward or backward rotational force from the motor unit 13 is conducted to the speed reducing mechanism 14 based on the corresponding drive signal. In the speed reducing mechanism 14, the rotational speed is reduced by the speed reducing gear arrangement 15, and the rotational force is conducted to the rotatable shaft 11*c*. At this time, the clutch arrangement 16 connects between the rotatable shaft 11*c* and the rotatable shaft 11*b* through use of the electromagnetic force. Thus, rotational force of the rotatable shaft 11*c* is conducted to the rotatable shaft 11*b* through the clutch arrangement 16. Then, when the rotatable shaft 11*b* rotates, the output gear 11*a*, which is connected to the end of the rotatable shaft 11*b*, is rotated. Therefore, the spiral cables 34, which are meshed with the output gear 11*a*, are driven.

At this time, the driving-side engaging portion 17*a* is located adjacent to the clutch arrangement 16. Thus, the rotational force of the rotatable shaft 11*b* is not conducted to the handle 19 side.

In contrast, at the time of failure, such as at the time of power failure to the motor apparatus 11 or at the time of determining failure by the controller 40, the electromagnetic force of the clutch 16 is stopped, and the connection between the rotatable shaft 11*c* and the rotatable shaft 11*b* is disconnected. Furthermore, the electromagnetic force of the driving-side engaging portion 17*a* is also stopped. Thus, the engaging projection 17*ab* is urged and is moved toward the engaging groove portion 17*bb* of the driven-side engaging portion 17*b* by the urging force. Therefore, the engaging projection 17*ab* is meshed with the engaging groove portion 17*bb*.

In this state, when the operation handle 19 is rotated in one of the normal direction and the reverse direction, the rotational force of the spur gear 18 is conducted to the spur gear 17*ba*, which is meshed with the spur gear 18. Since the driving-side engaging portion 17*a* and the driven-side engaging portion 17*b* are meshed with one another, the rotational force conducted from the spur gear 18, is conducted to the engaging portion 17*a*, which is secured to the rotatable shaft 11*b*, through the driven-side engaging portion 17*b*. In this way, the rotatable shaft 11*b* is rotated, and the output gear 11*a*, which is connected to the rotatable shaft 11*b*, is rotated integrally with the rotatable shaft 11*b*. When the output gear 11*a* is rotated, the spiral cables 34, which are meshed with the output gear 11*a*, are drive in the rotational direction of the operation handle 19.

At this time, the clutch 16 is disconnected. Thus, even when the rotatable shaft 11*b* is rotated, the rotation of the rotatable shaft 11*b* is not conducted to the speed reducing gear arrangement 15.

As described above, the drive arrangement 10 conducts the rotational force of the motor unit 13 to the spiral cables 34 and thereby drives the spiral cables 34. However, at the time of failure, the drive arrangement 10 conducts the rotational force from the operation handle 19 to the spiral cables 34 to drive the spiral cables 34.

Thus, at the time of stopping the motor unit 13 due to the failure, the occupant can manually rotate the operation handle 19 to wind the blind sheet 21 from the fully extended position to the fully retracted position. Furthermore, the occupant can also manually rotate the operation handle 19 to extend the blind sheet 21 from the fully retracted position to the fully extended position.

Furthermore, in the drive arrangement 10 of the present embodiment, the electromagnetic force is exerted in each of the clutch arrangement 16 and the switching arrangement 17 at the time of the normal operation. A manual switch 19*a* is provided in the drive arrangement 10 to stop the electromagnetic force in each of the clutch arrangement 16 and the switching arrangement 17 through switching of an internal wiring. When the manual switch 19*a* is turned on, the electromagnetic force in each of the clutch arrangement 16 and the switching arrangement 17 is stopped to permit the manual operation through the operation handle 19.

As described above, in the system S of the present embodiment, by manually operating the operation handle 19 in each of the normal time and the failure time, the window W can be always placed in the clear state where the window W is not covered with the blind sheet 21.

Figure 16A:
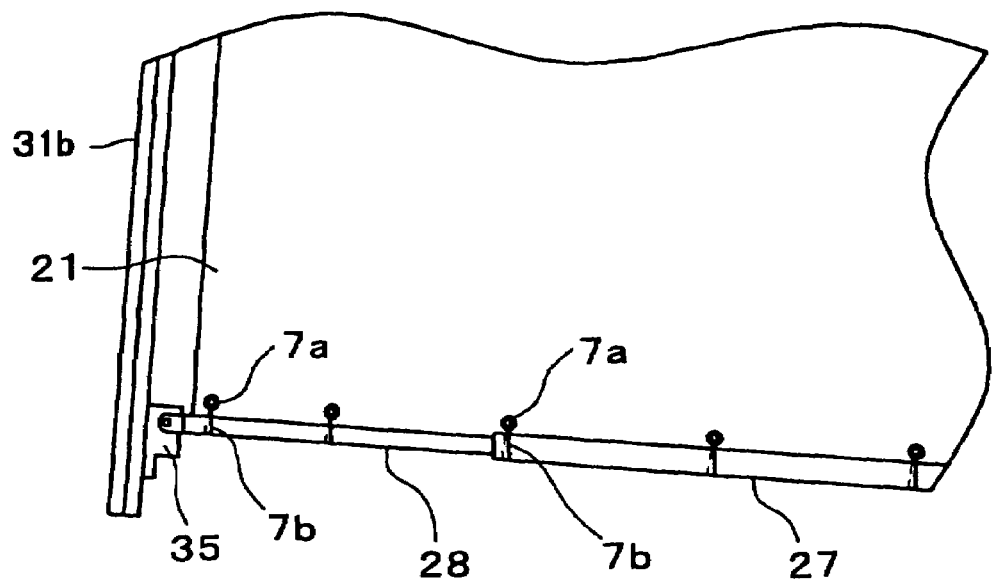
FIG. 16A is a descriptive view showing installation of a blind sheet in a modification of the first embodiment.
Figure 16B:
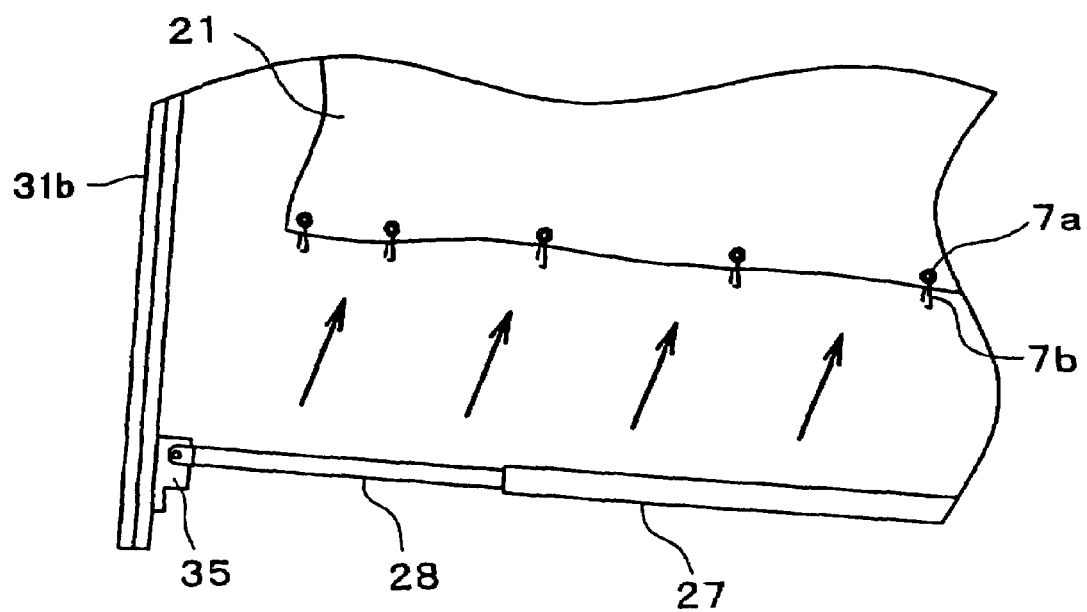
FIG. 16B is a descriptive view showing releasing of the blind sheet of FIG. 16A.

In the above embodiment, the blind sheet 21 is detachably connected to the guide pipe 27 and the slide shafts 28 (the shaft of the present invention) through the connection between the hook-and-loop fasteners 6*a* and the hook-and-loop fasteners 6*b*. However, the present invention is not limited to this. For example, as shown in FIGS. 16A and 16B, connecting holes 7*a* can be formed in the free end of the blind sheet 21, and threads 7*b* can be inserted through the connecting holes 7*a*, respectively, and can be tied to the guide pipe 27 and the slide shafts 28. Each thread 7*b* can be made from a cotton thread, a synthetic resin thread, a copper thread or the like as long as it can be cut, i.e., can be ruptured upon pulling of the blind sheet 21 by application of a predetermined force to the blind sheet 21.

FIG. 16A shows the state where the blind sheet 21 is in the fully extended position. In FIG. 16A, the blind sheet 21 is connected to the guide pipe 27 and the slide shafts 28 by the threads 7*b*. In the state shown in FIG. 16A, when the occupant pulls the blind sheet 21 toward the fully retracted position, the threads 7b are cut. Thus, the blind sheet 21 is separated from the guide pipe 27 and the slide shafts 28, as shown in FIG. 16B. Thus, the blind sheet 21 is wound by the urging force of the roll shade arrangement 22 to place the window W in the clear state.

Furthermore, in the case where the blind sheet 21 is connected to the guide pipe 27 and the slide shafts 28 by the threads 7b in a manner shown in FIGS. 16A and 16B, when the blind sheet 21 stretches in the width direction of the blind sheet 21, the threads 7b can be advantageously moved in the width direction to follow the stretching of the blind sheet 21.

Figure 17A:
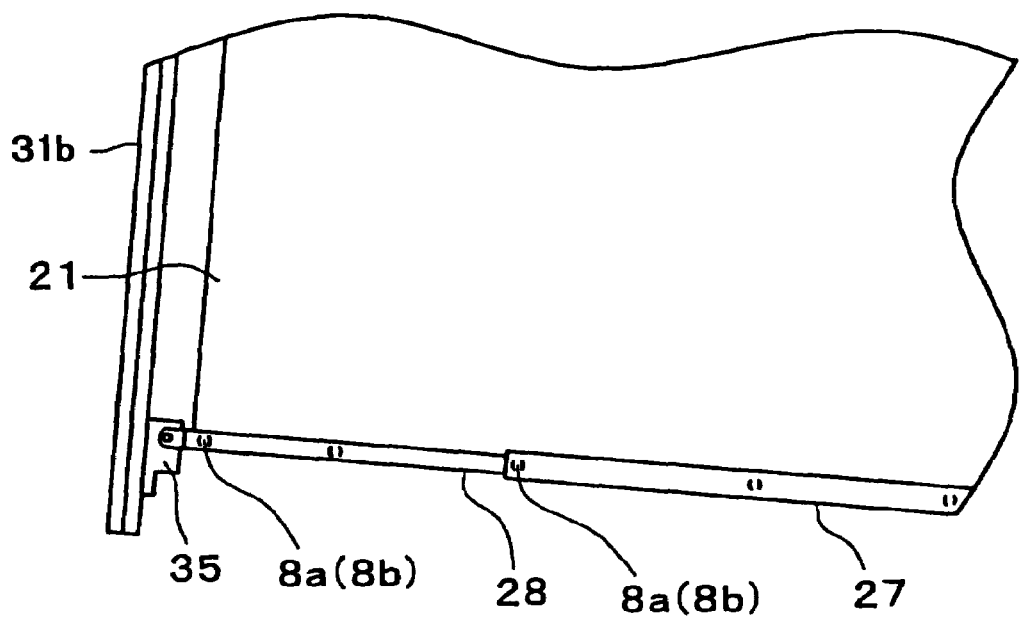
FIG. 17A is a descriptive view showing installation of a blind sheet in another modification of the first embodiment.
Figure 17B:
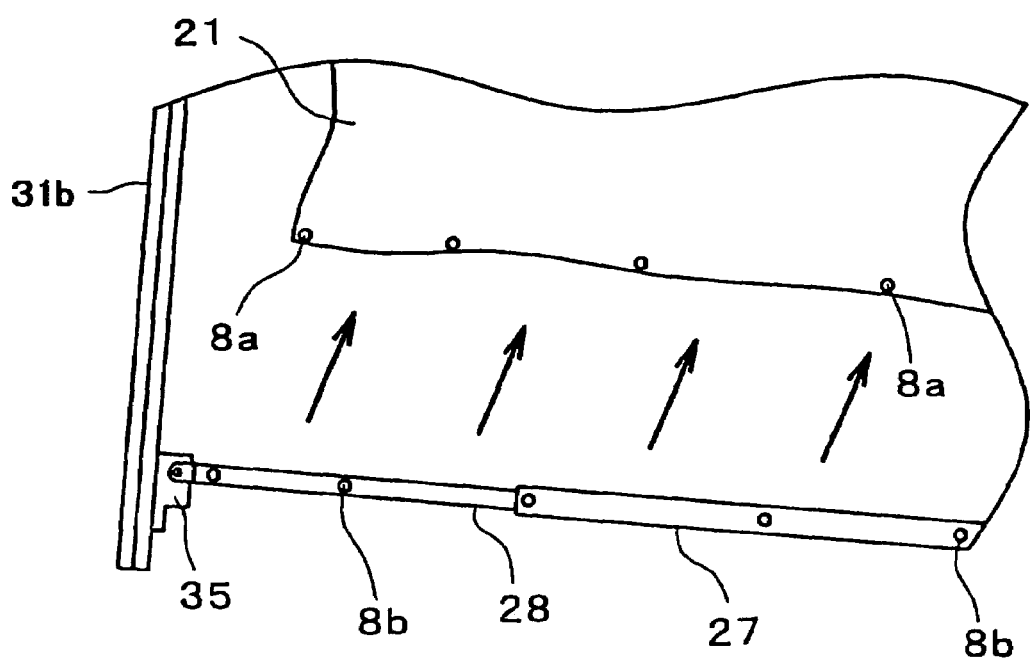
FIG. 17B is a descriptive view showing releasing of the blind sheet of FIG. 17A.

Also, as shown in FIGS. 17A and 17B, the blind sheet 21 can be connected to the guide pipe 27 and the slide shafts 28 through use of detachable snap fasteners (buttons) 8a, 8b. The snap fasteners 8a, 8b can be made of synthetic resin or metal.

FIG. 17A shows the fully extended state of the blind sheet 21. Here, the snap fasteners 8a, which are secured to the blind sheet 21, are engaged with the snap fasteners 8b, which are secured to the guide pipe 27 and the slide shafts 28, so that the blind sheet 21 is connected to the guide pipe 27 and the slide shafts 28. In this state, when the occupant pulls the blind sheet 21 toward the fully retracted position, the snap fasteners 8a are detached from the snap fasteners 8b. Thus, the blind sheet 21 is separated from the guide pipe 27 and the slide shafts 28, as shown in FIG. 17B. Therefore, the blind sheet 21 is wound by the urging force of the roll shade arrangement 22 to place the window W in the clear state.

Furthermore, the engaging members, such as the hook-and-loop fasteners, the threads and the snap fasteners, can be used in any combination to detachably connect the blind sheet 21 to the guide pipe 27 and the slide shafts 28.

In the above embodiment, the blind sheet 21 is connected to the guide pipe 27 and the slide shafts 28 by the engaging members. However, the present invention is not limited to this. For example, the blind sheet 21 can be detachably connected to the sliders 35 by the engaging members. That is, the blind sheet 21 can be detachably connected at least to the guide pipe 27 and the slide shaft 28 or alternatively to the sliders 35 by the engaging members.

In the above embodiment, the guide pipe 27 and the slide shaft 28 (serving as the shaft of the present invention) are connected to the entire length of the free end of the blind sheet 21. However, the present invention is not limited to this. For example, as shown in FIG. 18, only the left and right sides of the free end of the blind sheet 21 can be secured to the sliders 35, respectively, to eliminate the guide pipe 27 and the slide shafts 28.

In this case, the free end of the blind sheet 21 is pulled to the left and right directions to apply a tension to the blind sheet 21. Thus, the two dimensional shape of the blind sheet 21 is maintained by the applied tension. In this way, the guide pipe 27 and the slide shafts 28 are no longer required. Therefore, the structure is more simplified to contribute to a reduction in both the manufacturing costs and the weight.

Figure 18:
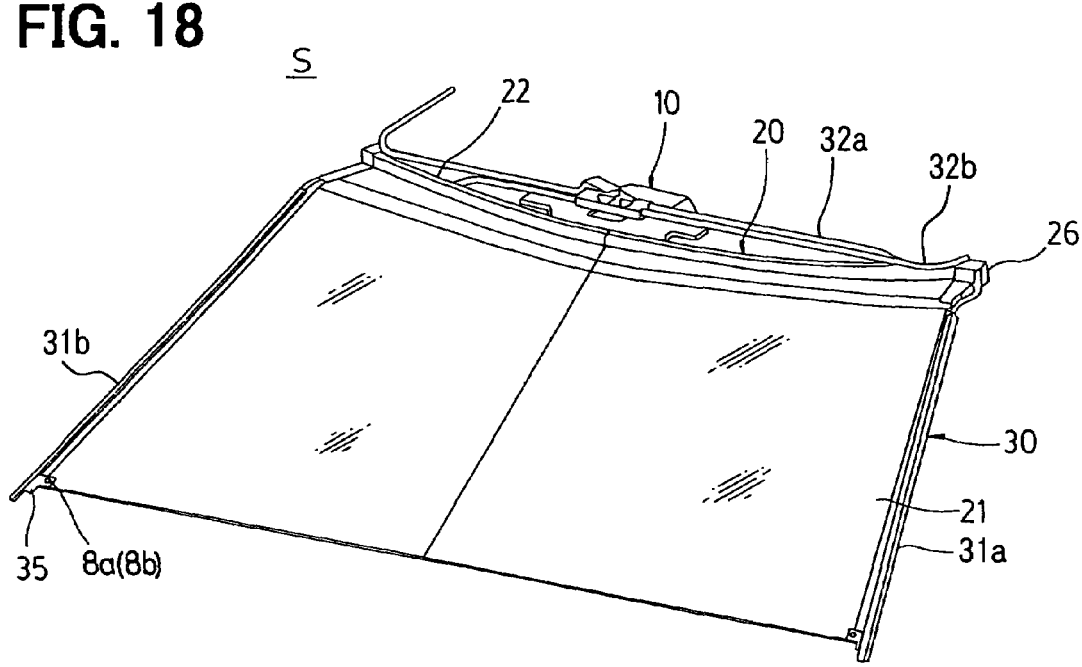
FIG. 18 is a perspective view showing a sunshade system in another modification of the first embodiment.

Furthermore, in the case of FIG. 18, the blind sheet 21 is connected to the sliders 35 by detachable engaging members. In the present case, the snap fasteners 8a, 8b are used as the detachable engaging members. It should be noted that the other detachable engaging members, such as the hook-and-loop fasteners and/or the threads, can be equally used in this case.

FIG. 18 shows the fully extended state of the blind sheet 21. In this state, when the occupant pulls the blind sheet 21 toward the fully retracted position, the snap fasteners 8a are detached from the snap fasteners 8b. Thus, the blind sheet 21 is separated from the sliders 35. Therefore, the blind sheet 21 is wound by the urging force of the roll shade arrangement 22 to place the window W in the clear state.

Figure 19:
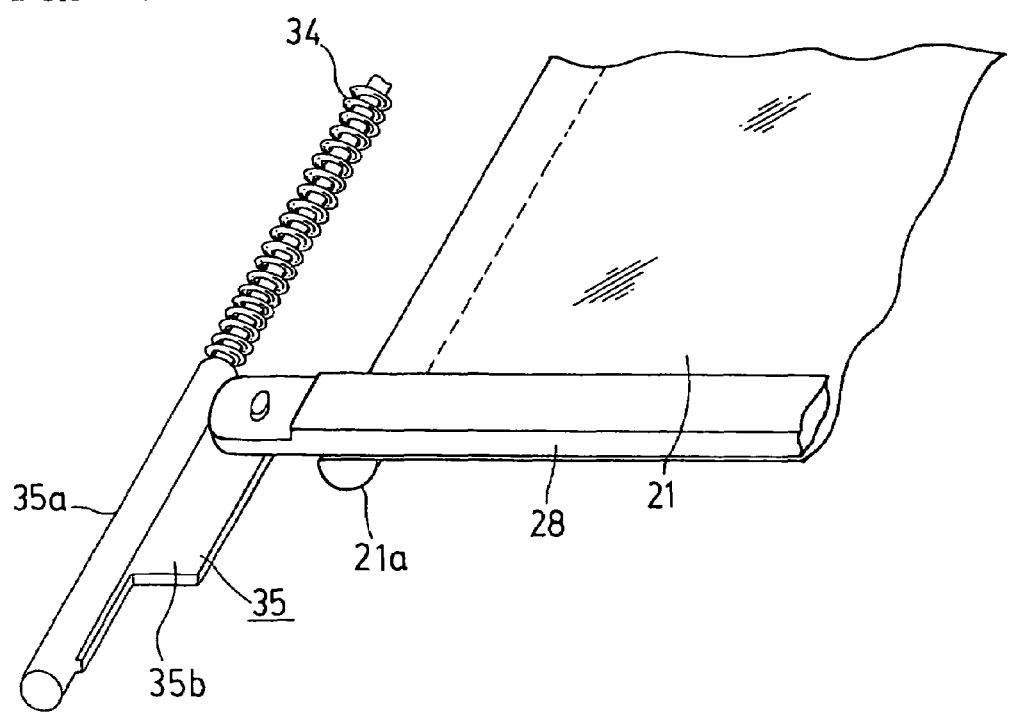
FIG. 19 is a perspective view showing a slider in another modification of the first embodiment.
Figure 20:
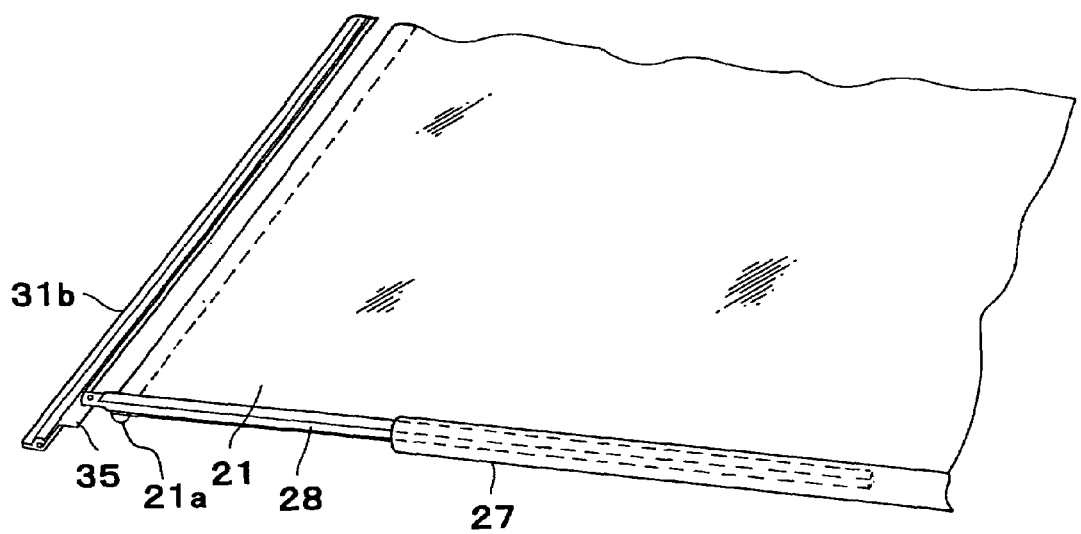
FIG. 20 is a descriptive view showing a side shaft in the modification of FIG. 19.

Furthermore, as shown in FIGS. 19 and 20, left and right sheet-side engaging portions 21a can be provided along the left and right lateral sides, respectively, of the blind sheet 21, which extend along the guide rails 31a, 31b, respectively. The sheet-side engaging portions 21a protrude from a lower surface of the blind sheet 21 in a direction away from the window W. Each sheet-side engaging portion 21a is formed by folding the corresponding lateral side of the blind sheet 21 and sewing the folded portion to achieve a predetermined rigidity and a predetermined flexibility, which allows winding of the blind sheet 21 around the roll shade arrangement 22.

However, the sheet-side engaging portions 21a are not limited to the above described one. For example, separate sheet-side engaging portions 21a, which have the predetermined rigidity and the predetermined flexibility to allow winding of the blind sheet 21 around the roll shade arrangement 22, can be provided in the lateral sides of the blind sheet 21.

In the case of the blind sheet 21 shown in FIGS. 19 and 20, the sheet-side engaging portions 21a are formed continuously along the lateral sides of the blind sheet 21. Alternatively, the sheet-side engaging portions 21a can be intermittently formed at predetermined intervals along the lateral sides of the blind sheet 21.

It is desirable that the sheet-side engaging portions 21a do not overlap in the radial direction of the roll shade arrangement 22 when the sheet-side engaging portions 21a are wound around the roll shade arrangement 22. In such a case, the sheet-side engaging portions 21a may be spirally wound when the sheet-side engaging portions 21a are wound around the roll shade arrangement 22. To achieve this, for example, the blind sheet 21 can be shaped into a trapezoidal shape, which has the increasing width from the base end toward the free end. In this way, when the blind sheet 21 is wound around the roll shade arrangement 22, a section of each sheet-side engaging portion 21a, which is located in the base end of the blind sheet 21, is placed closer to the widthwise center of the blind sheet 21 in comparison to a section of the sheet-side engaging portion 21a, which is located in the free end of the blind sheet 21. In this way, it is possible to avoid overlapping of the sheet-side engaging portion 21a in the radial direction of the roll shade arrangement 22. Furthermore, guide portions can be provided near the roll shade arrangement 22 to guide the sheet-side engaging portions 21a in the corresponding appropriate axial position of the roll shade arrangement 22.

Figure 21:
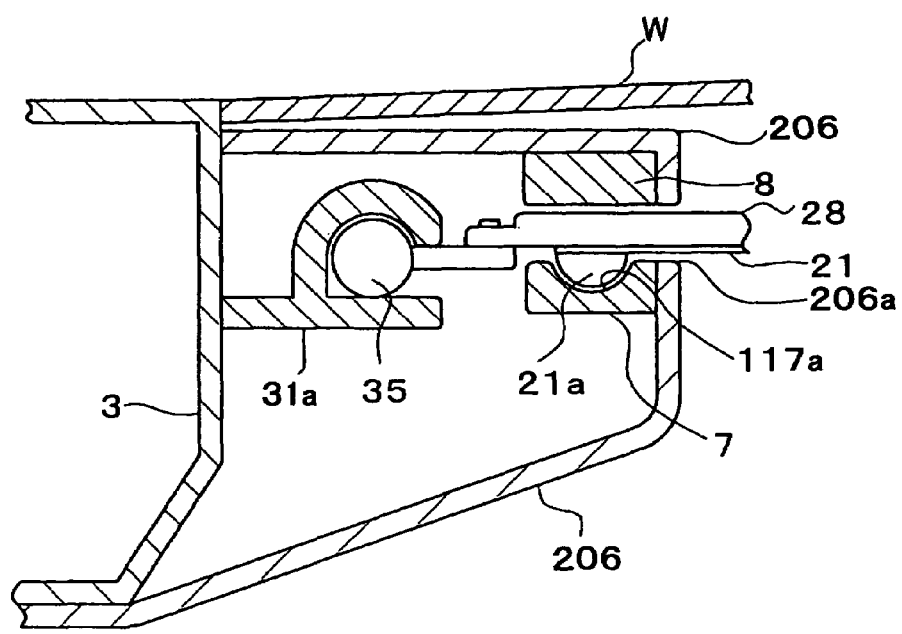
FIG. 21 is a descriptive cross sectional view showing a structure around a guide rail in the modification of FIGS. 19 and 20.

FIG. 21 is a cross sectional view around the guide rail 31a, 31b (depicting only the guide rail 31a in FIG. 21 for the sake of simplicity). As described above, each guide rail 31a, 31b is arranged along the corresponding front pillar 3. Each slider 35, to which the slide shaft 28 and the blind sheet 21 is connected, is guided along the corresponding guide rail 31a, 31b. A trim member 206 is arranged on an occupant compartment side of each front pillar 3. The front pillar 3, the guide rail 31a, 31b and the slider 35 are covered by the trim member 206, so that the occupant cannot see them. Each trim member 206 has a slit 206a, which extends along the corresponding front pillar 3. The slide shaft 28 and the corresponding lateral side of the blind sheet 21 are connected to the slider 35 through the slit 206a.

Two guide members (vehicle body side engaging portions) 7, 8 are provided to each trim member 206 in such a manner that the guide members 7, 8 extend along the corresponding lateral side of the window W. The guide members 7, 8 are arranged parallel to the corresponding guide rail 31a, 31b between the corresponding trim member 206 and the front pillar 3. The guide members 7, 8 extend along a vehicle bottom side edge (lower edge of the slit 206a in FIG. 21) and a vehicle top side edge (upper edge of the slit 206a in FIG. 21), respectively, of the slit 206a of the trim member 206. The guide member 7 and the guide member 8 are opposed to one another and extend parallel to one another.

The guide member 7 slidably supports the corresponding sheet-side engaging portion 21a of the blind sheet 21. The sheet-side engaging portion 21a is guided along an inner surface of a guide groove 117a of the guide member 7 at the time of extending and retracting the blind sheet 21. Furthermore, the guide member 8 is provided to limit lifting of the blind sheet 21 in a direction away from the guide member 7. In this way, when the blind sheet 21 is extended or retracted, the blind sheet 21 is effectively held between the guide member 7 and the guide member 8, and the sheet-side engaging portion 21a is slid along and is guided along the guide groove 117a.

As described above, the sheet-side engaging portions 21a are provided to the blind sheet 21, and the guide members 7, 8 are provided to the front pillar 3 side to slidably hold and to guide the sheet-side engaging portions 21a therebetween. Thus, at the time of extending and retracting the blind sheet 21, each of the left and right lateral sides of the blind sheet 21 retains its linear shape along the guide rail 31a, 31b. Furthermore, if the sheet-side engaging portions 21a are not lifted in the direction away from the guide members 7 at the time of moving the blind sheet 21 along the guide rails 31a, 31b, the guide members 8 are not required and can be eliminated, if desired.

As described above, the space between the guide rails 31a, 31b increases toward the lower ends of the guide rails 31a, 31b, and thereby a width, which needs to be covered by the blind sheet 21 is not constant in the extending/retracting direction of the blind sheet 21. When the blind sheet 21, which is made of the stretchable material, is extended away from the roll shade arrangement 22, the blind sheet 21 is stretched in the width direction in conformity with the space between the guide rails 31a, 31b. The left and right side edges of the lower end of the blind sheet 21 are connected to the sliders 35, respectively, and therefore are forcefully stretched away from one another in the width direction by the sliders 35 at this time. The blind sheet 21, which is stretched in the width direction, is held under tension that pulls back the blind sheet 21 to its original shape.

Therefore, the tension is applied to the blind sheet 21 at the time of fully or partially extending the blind sheet 21. When the left and right guide members 7 do not engage the left and right sheet-side engaging portions 21a, respectively, the portions of the blind sheet 21 other than the free end of the blind sheet 21 tend to shrink toward the widthwise center of the window W, as indicated by dotted lines N in FIG. 22.

In contrast, in the present invention, such shrinkage of the blind sheet 21, which tends to shrink due to the presence of the tension, is limited through the engagement between the sheet-side engaging portions 21a and the guide members 7. Thus, the left and right lateral sides of the blind sheet 21 are linearly extended along the guide rails 31a, 31b, respectively, as indicated by solid lines L in FIG. 22.

Figure 22:
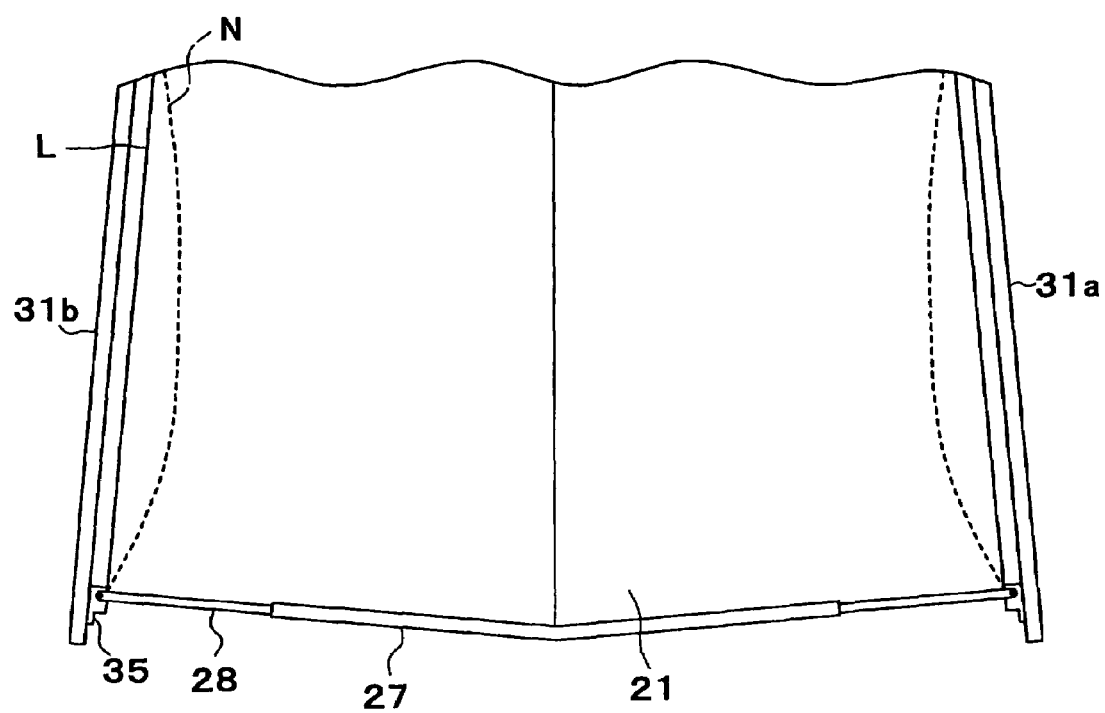
FIG. 22 is a descriptive view showing a fully extended state of the sunshade system in the modification of FIGS. 19 to 21.

In this way, when the blind sheet 21 is fully extended, the blind sheet 21 can generally entirely cover the window W, as shown in FIG. 22. That is, unlike the prior art sunshade system, the uncovered triangular spaces, which are not covered by the blind sheet 21, are not left in the left and right lateral sides of the window W. Thus, it is possible to limit the sunlight entering the occupant compartment through the uncovered spaces and thereby to increase the temperature of the occupant compartment.

Figure 23:
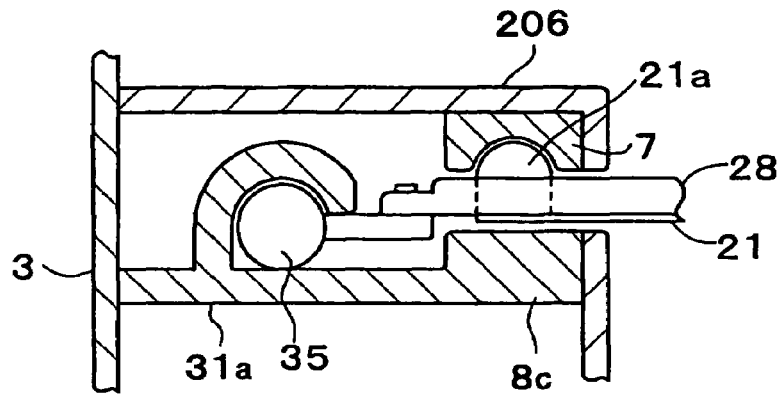
FIG. 23 is a descriptive cross sectional view showing a structure around a guide rail in another modification of the first embodiment.

In the above modification, the sheet-side engaging portions 21a are provided in the blind sheet 21 in such a manner that the sheet-side engaging portions 21a protrude from the lower surface of the blind sheet 21 in the direction away from the window W. Alternatively, as shown in FIG. 23, the sheet-side engaging portions 21a can be provided in an upper surface (a window W side) of the blind sheet 21 to protrude toward the window W. In this case, as shown in FIG. 23, the guide members 7 should be provided on the window W side, and guide members 8c should be provided to oppose the guide members 7, respectively. Furthermore, in this case, each guide member 8c is formed integrally with the corresponding guide rail 31a, 31b and extends from the guide rail 31a, 31b toward the widthwise center of the window W.

Furthermore, although not depicted, two sheet-side engaging portions 21a can be provided to each of the left and right lateral sides of the blind sheet 21 in such a manner that the two sheet-side engaging portions 21a protrude from the upper surface and the lower surface, respectively, of the blind sheet 21 in opposite directions.

Figure 24A:
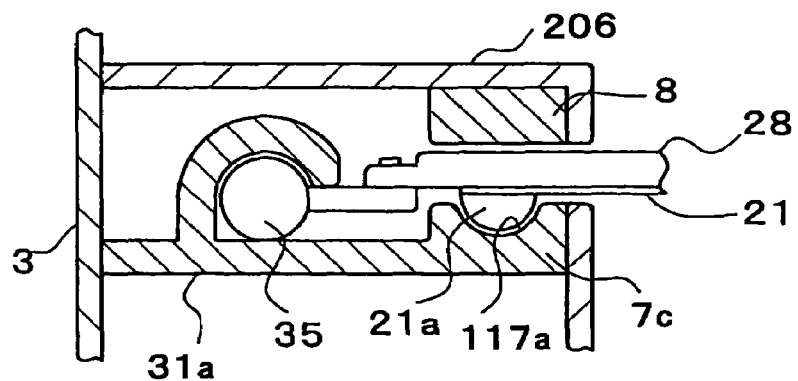
FIG. 24A is a descriptive cross sectional view showing a structure around a guide rail in another modification of the first embodiment.

Furthermore, in the above modification, each guide member 7 is provided to the corresponding trim member 206. However, the present invention is not limited to this. For example, as shown in FIG. 24A, guide portions 7c can be formed integrally with the guide rails 31a, 31b, respectively. Alternatively, as shown in FIG. 24B, the separate guide members 7 can be directly connected to the front pillars 3, respectively.

In the case of FIG. 24A, each guide portion 7c, which has the guide groove 117a, is formed integrally with the corresponding guide rail 31a, 31b and extends from the guide rail 31a, 31b. Similar to the guide groove 117a of the guide member 7 shown in FIG. 21, the guide groove 117a of the guide portion 7c slidably engages the corresponding sheet-side engaging portion 21a to guide the blind sheet 21 between the fully extended position and the fully retracted position.

Figure 24B:
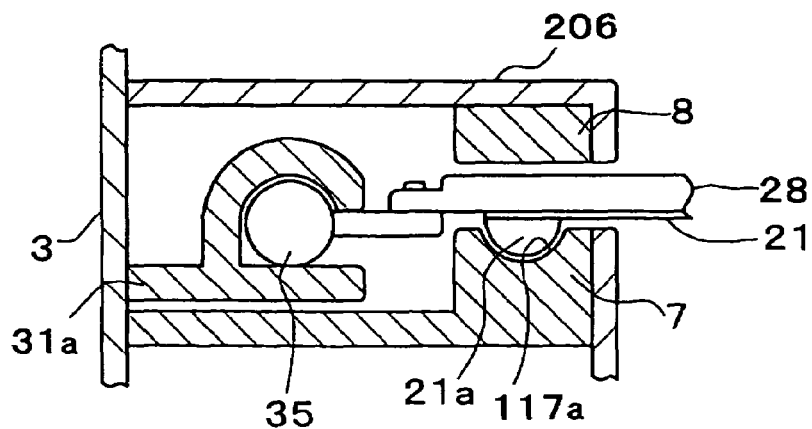
FIG. 24B is a descriptive cross sectional view showing a structure around a guide rail in another modification of the first embodiment.

In the case of FIG. 24B, each guide member 7, which is formed separately from the corresponding guide rail 31a, 31b, is directly connected to the corresponding front pillar 3, and the guide groove 117a of the guide member 7 guides the corresponding sheet-side engaging portion 21a.

Furthermore, although not depicted, two sheet-side engaging portions 21a can be provided to each of the left and right lateral sides of the blind sheet 21, and two guide members/guide portions can be provided to engage with the two sheet-side engaging portions 21a, respectively, in each of FIGS. 24A and 24B.

Figure 25A:
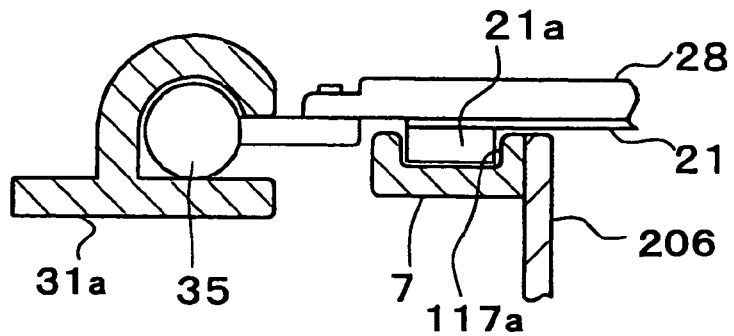
FIG. 25A is a descriptive cross sectional view showing a structure around a guide rail in another modification of the first embodiment.

Also, in the above modification, a cross section of each sheet-side engaging portion 21a and a cross section of each guide groove 117a are semicircular. However, the present invention is not limited to this. For example, as shown in FIG. 25A, the cross section of each sheet-side engaging portion 21a and the cross section of each guide groove 117a can be rectangular or the like.

As discussed above, the sheet-side engaging portion 21a tends to move toward the widthwise center of the window W (i.e., toward the right side in FIG. 25A) due to the tension applied to the blind sheet 21 in the width direction. Thus, the inner lateral surface (i.e., a right lateral surface in FIG. 25A) of the sheet-side engaging portion 21a is better to have a flat surface rather than the curved surface to limit lifting of the sheet-side engaging portion 21a away from the guide member 7 and also to hold and guide the sheet-side engaging portion 21a by the guide member 7. Thus, in the case of FIG. 25A, the sheet-side engaging portions 21a and the guide grooves 117a have the rectangular cross section to achieve slide engagement between each sheet-side engaging portion 21a and the corresponding guide groove 117a while making flat surface contact therebetween.

Figure 25B:
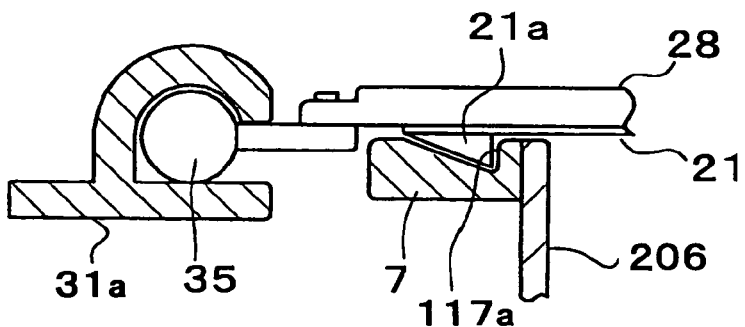
FIG. 25B is a descriptive cross sectional view showing a structure around a guide rail in another modification of the first embodiment.
Figure 25C:
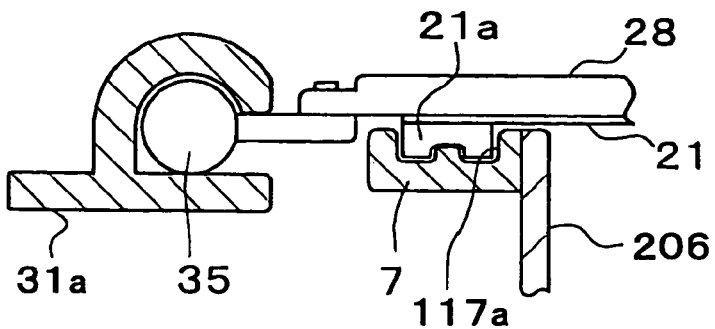
FIG. 25C is a descriptive cross sectional view showing a structure around a guide rail in another modification of the first embodiment.

In a case of FIG. 25B, the sheet-side engaging portion 21a and the guide groove 117a have a triangular cross section. In a case of FIG. 25C, the sheet-side engaging portion 21a and the guide groove 117a have a rectangular cross section. Furthermore, in FIG. 25C, a groove is formed in a lower surface of the sheet-side engaging portion 21a, and a ridge is formed in a base of the guide groove 117a to achieve slide engagement between the groove of the sheet-side engaging portion 21a and the ridge of the guide groove 117a. In this way, the sheet-side engaging portion 21a can be effectively guided by the guide member 7. Also, like the case shown in FIG. 25C, any other type of groove can be formed in the blind sheet 21 as a sheet-side engaging portion, and a corresponding ridge can be formed in the guide member 7 to engage with this groove.

Figure 26:
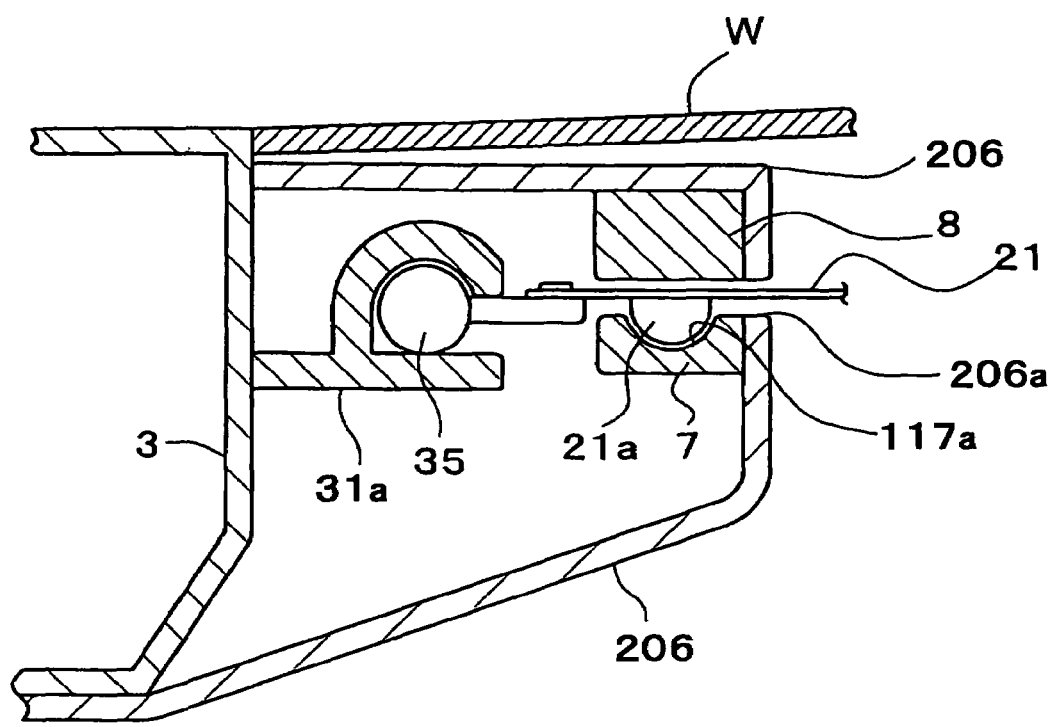
FIG. 26 is a descriptive cross sectional view showing a structure around a guide rail in another modification of the first embodiment.

Furthermore, in the case of FIG. 18 where the guide pipe 27 and the slide shafts 28 are eliminated, a guide member 7 can be provided near each guide rail 31a, 31b, as shown in FIG. 26. In the case of FIG. 26, the slide shafts 28 are not used, so that a size of the slit 206a, which is measured in the vertical direction in FIG. 26, can be reduced in comparison to the case shown in FIG. 21. Thus, each guide member 8 and the opposed guide member 7 can be more closely arranged relative to one another, and thereby lifting of the corresponding sheet-side engaging portion 21a can be more effectively limited to effectively hold and guide the sheet-side engaging portion 21a by the guide member 7.

In the case of FIG. 26, each sheet-side engaging portion 21a protrudes from the lower surface of the blind sheet 21. However, the present invention is not limited to this. For example, similar to the case shown in FIG. 23, each sheet-side engaging portion 21a can be formed to protrude toward the window W. Also, two sheet-side engaging portions can be provided to each of the left and right lateral sides of the blind sheet 21 to protrude from the upper surface and the lower surface, respectively, of the blind sheet 21.

Second Embodiment

A second embodiment of the present invention will be described with reference to FIGS. 27 to 29. In the second embodiment, the sunshade system S of the present invention is applied to a door window (side window) of the vehicle 1. More specifically, the system S of the second embodiment is applied to a front right side door 101 (hereinafter simply referred to as a door 101). Components similar to those discussed above with reference to the first embodiment will be depicted by the same numerals and will not be described further.

Figure 27:
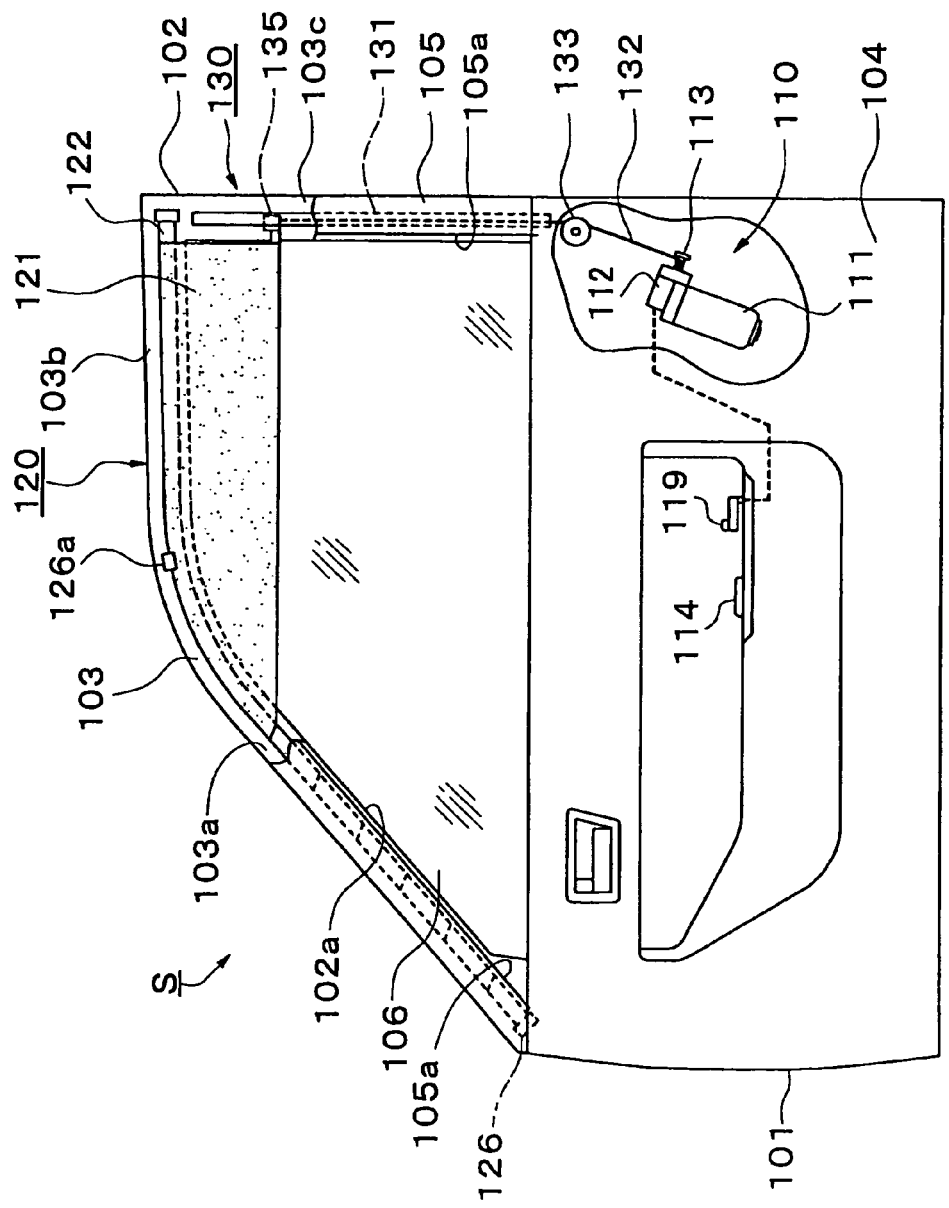
FIG. 27 is a descriptive view showing a sunshade system according to a second embodiment of the present invention.

FIG. 27 is a side view of the right side door 101 seen from the occupant compartment side, and a portion of the door 101 is fragmented for the sake of clarity. Furthermore, FIG. 27 shows the blind sheet 121 of the system S held in an intermediate position between the fully retracted position and the fully extended position.

The door 101 includes a door trim 104 connected to an occupant compartment side of a door panel 102. A window frame 103 is formed in an upper side of the door panel 102. A trim member 105 is connected to an occupant compartment side of the window frame 103. The trim member 105 is connected to the occupant compartment side of the window frame 103 in such a manner that the trim member 105 extends along a front frame 103a, an upper frame 103b and a rear frame 103c of the window frame 103.

It should be noted that the trim member 105 and the door trim 104 can be formed integrally, if desired. The front frame 103a and the rear frame 103c are defined as frames, which extend vertically from the door panel 102. A window glass 106 is arranged to cover an opening 102a, which is formed by the window frame 103. The window glass 106 is vertically moved by a drive apparatus (not shown) to close/open the opening 102a.

The opening 102a of the window frame 103 has a generally trapezoidal shape, so that a width of a top side of the opening 102a is shorter than a width of a bottom side of the opening 102a. In the window frame 103 of the present embodiment, the front frame 103a extends obliquely and upwardly from the main body of the door panel 102, and the rear frame 103c extends upwardly in the vertical direction from the main body of the door panel 102. A connection between the front frame 103a and the upper frame 103b has a round shape, which has a predetermined curvature.

The system S of the present embodiment is installed to the above-described door 101 and includes a drive arrangement 110, a roll shade mechanism 120 and a guide arrangement 130.

The drive arrangement 110 is arranged between the door trim 104 and the door panel 102. The drive arrangement 110 includes a motor unit 111 and a speed reducing mechanism 112. A cylindrical reel 113 is connected to an output side of the speed reducing mechanism 112. The reel 113 winds a wire (transmitting member) 132. Any appropriate one of various motors, such as DC motors, brushless motors and ultrasonic motors, can be used as the motor unit 111. An operation switch 114, which has a raising position and a lowering position, is connected to the drive arrangement 110. When the occupant operates the operation switch 114 to the raising position or the lowering position, electric current is supplied to the motor unit 111 to rotate the reel 113 in a normal direction or a reverse direction to drive the system S.

Furthermore, similar to the speed reducing mechanism 14 of the first embodiment, the speed reducing mechanism 112 of the drive arrangement 110 includes a clutch mechanism and a switching mechanism. During the normal operation, a rotational force of the motor unit 111 is transmitted to the reel 113. However, at the time of failure, the connection is disconnected, and thus the rotational force of the motor unit 111 is not transmitted to the reel 113. Furthermore, at the time of failure, the rotational force of an operation handle 119 is conducted to the reel 113 through the speed reducing mechanism 112. Thus, the occupant can extend or retract the blind sheet 121 by operating the operation handle 119.

The roll shade mechanism 120 includes a roll shade arrangement 122, roll shade holders 126 and a blind sheet 121. The roll shade holders 126 are arranged opposed ends, respectively, of the roll shade arrangement 122 and rotatably hold the roll shade arrangement 122. A base end of the blind sheet 121 is connected to the roll shade arrangement 122, and the blind sheet 121 covers the opening 102a of the window frame 103.

Similar to the blind sheet 21 of the first embodiment, the entire blind sheet 121 of the present embodiment has stretchability.

The roll shade arrangement 122 is a cylindrical member. In a closed state of the window glass 106, the roll shade arrangement 122 is curved along the front frame 103a and the upper frame 103b of the window frame 103 in such a manner that the roll shade arrangement 122 is located along an upper edge of the window glass 106. The roll shade arrangement 122 is arranged between the window frame 103 and the trim member 105. A slit 105a, which faces the opening 102a, is formed in the trim member 105. The blind sheet 121 passes through the slit 105a and is extended from the roll shade arrangement 122 to cover the opening 102a. The roll shade arrangement 122 can be arranged not only along a straight line but also along the curvature of the edge of the window frame 103. Thus, a degree of flexibility of the roll shade arrangement 122 is improved to allow placement of the roll shade arrangement 122 in a small space, and the system S can be made compact. Also, the system S can be arranged in a place, which is not possible by the previously proposed systems.

Similar to the first embodiment, the roll shade arrangement 122 of the present embodiment includes the center shaft 22a, the coil spring 22b, the spring holder 22c and the rotatable rod 22d. The rotatable rod 22d includes the side rods 23, the joints 24 and the center rods 25, which are connected together. Thus, similar to the roll shade arrangement 22 of the first embodiment, the roll shade arrangement 122 of the second embodiment has flexibility.

A bracket 126a is arranged in a vehicle front side of the upper frame 103b. The bracket 126a is arranged around the longitudinal center of the roll shade arrangement 122. Furthermore, the bracket 126a slidably engages and holds an outer peripheral surface of the roll shade arrangement 122 to limit displacement of the roll shade arrangement 122 at the time of rotating the roll shade arrangement 122.

Figure 28:
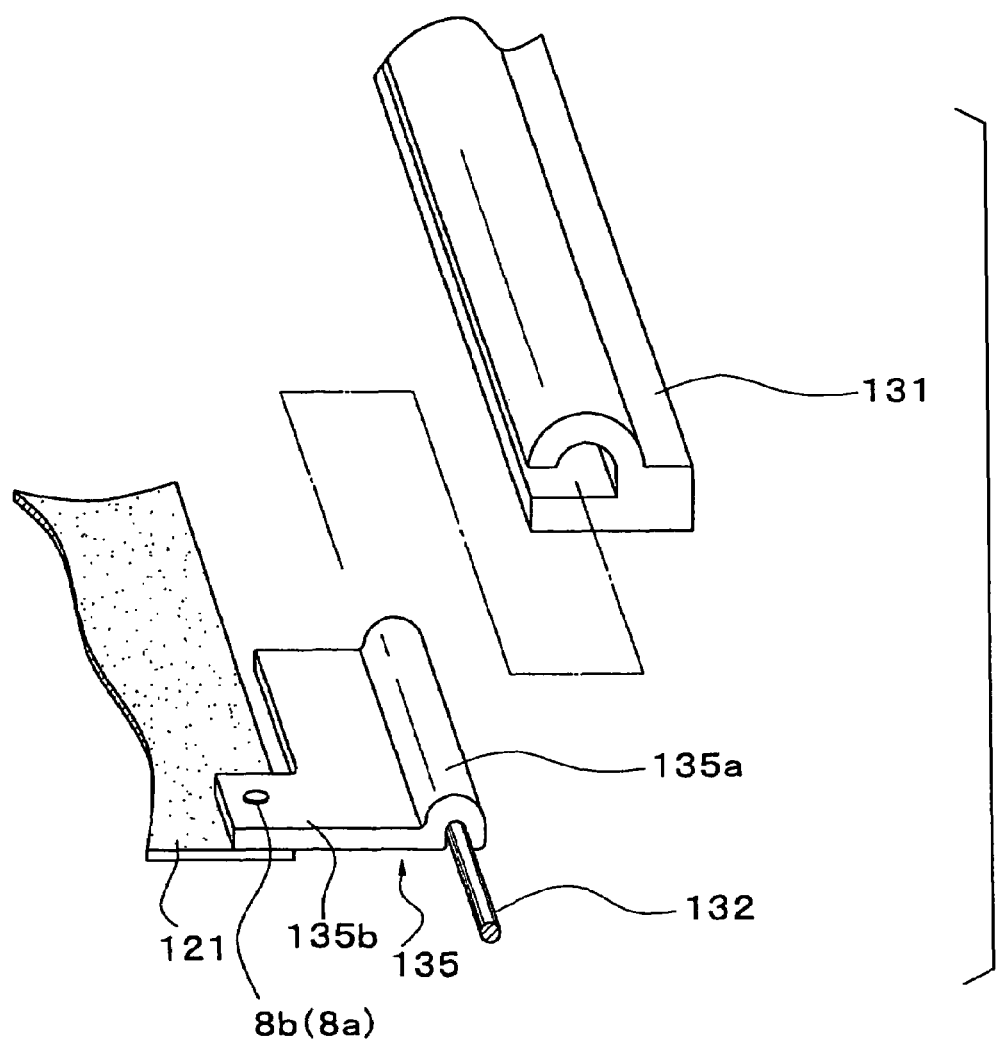
FIG. 28 is a perspective view of a slider of the second embodiment.

As shown FIGS. 27 and 28, the guide arrangement 130 of the present embodiment includes a guide rail 131, a slider 135 and a wire 132. The guide rail 131 is arranged between the rear frame 103c and the trim member 105. The slider 135 is guided in the guide rail 131 to move in the longitudinal direction of the guide rail 131. The wire 132 is received in the guide rail 131, and an end of the wire 132 is connected to the slider 135.

The slider 135 includes a sliding portion 135a and a sheet connecting portion 135b. The sheet connecting portion 135b is formed integrally with the sliding portion 135a. A vehicle rear end side of a free end of the blind sheet 121 is secured to the sheet connecting portion 135b. A snap fastener 8a is connected to the blind sheet 121, and a snap fastener 8b is connected to the sheet connecting portion 135b. The blind sheet 121 is connected to the slider 135 through engagement between the snap fastener 8a and the snap fastener 8b. The connection between the blind sheet 121 and the slider 135 is not limited to the snap fasteners 8a, 8b and can be achieved by any other detachable engaging members, such as the hook-and-loop fasteners or the thread, as discussed with reference to the first embodiment. The sliding portion 135a is slidably received in the guide rail 131, which has a slit in an inner lateral side (i.e., window center side) of the guide rail 131.

The wire 132 is connected to the sliding portion 135a at the one end. The wire 132 passes through the guide rail 131 and is guided to the drive arrangement 110 through the pulley 133. The other end of the wire 132 is connected to the reel 113 of the drive arrangement 110, and the drive arrangement 110 can wind the wire 132 around the reel 113. In the present embodiment, the wire 132 is guided to the drive arrangement 110 through the pulley 133. However, the present invention is not limited to this. In place of the pulley 133, any other appropriate intervening member can be arranged to guide the wire 132 to the drive arrangement 110.

For example, a member, which has a pipe or a groove, can be used as the other intervening member. In such a case, the wire 132 is guided through the pipe or is guided along the groove to allow slide movement of the wire 132 along the pipe or the groove. Furthermore, a member, which has a groove, can be arranged at a shift point, at which a guiding direction of the wire 132 is changed, to change the guiding direction.

Operation of the system S of the present embodiment will be described. As discussed above, when the occupant operates the operation switch 114 to the lowering position, the drive arrangement 110 is rotated in the normal direction, so that the reel 113 is rotated in the normal direction. In this way, the wire 132 is wound, i.e., is reeled around the reel 113. When the wire is reeled, the slider 135 moves downward along the guide rail 131.

When the slider 135 moves downward, the blind sheet 121 is pulled downward by the slider 135. Thus, the roll shade arrangement 122 rotates in the normal direction, and the blind sheet 121 is extended further through the slit 105a. At this time, a rotational force is applied to the roll shade arrangement 122 in the winding direction of the blind sheet 121 by the coil spring 22b. Thus, the blind sheet 121 is pulled from the roll shade arrangement 122 while an appropriate tension is applied to the blind sheet 121 by the coil spring 22b.

Figure 29:
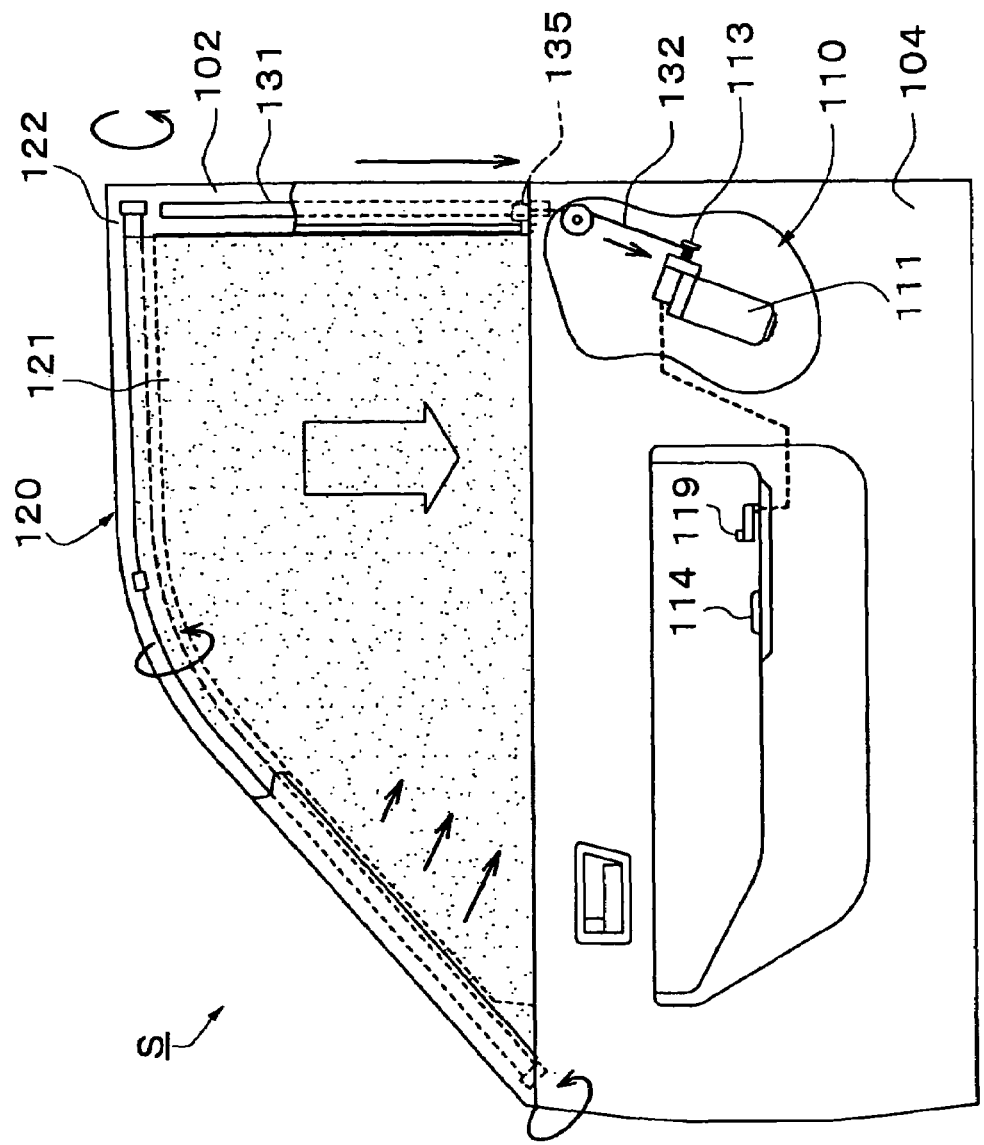
FIG. 29 is descriptive view of the sunshade system of the second embodiment.

As shown in FIG. 29, the blind sheet 121 has stretchability particularly in the width direction. Furthermore, the width of the opening 102a increases toward the lower end of the opening 102a. When the slider 135 moves downward, the blind sheet 121 can be stretched in the width direction to follow the increased width of the opening 102a. Thus, in the system S, the window frame 103, which has the generally trapezoidal opening 102a, can be generally entirely covered by the blind sheet 121.

The occupant can lower the blind sheet 121 to a desired position by maintaining the lowering position of the operation switch 114. When the operation switch 114 is returned to a neutral position, the operation of the drive arrangement 110 is stopped. The blind sheet 121 can be held in that position by a self retaining mechanism (e.g., a clutch) provided in the drive arrangement 110. When the occupant wants to raise the blind sheet 121, the occupant operates the operation switch 114 to the raising position. In this way, the drive arrangement 110 is rotated in the reverse direction, and the blind sheet 121 is wound around the roll shade arrangement 122 by the rotational force applied from the coil spring 22b in the winding direction. When the slider 135 reaches its upper end position, the blind sheet 121 is received in the trim member 105.

In this embodiment, limit switches can be provided to the upper end position, the lower end position and an intermediate position(s) of the movable range of the slider 135. The supply of electricity to the drive arrangement 110 can be stopped when a corresponding one of the limit switches is activated.

As described above, in the system S of the present embodiment, the substantially the entire opening 102a of the window frame 103 can be covered. In this way, the system S can perform its shade function. Thus, it is possible to limit the sunlight entering the occupant compartment to limit an increase in the temperature of the occupant compartment. Furthermore, in the present embodiment, the system S is applied to the front right door 101. However, the present invention is not limited to this. The system S can be provided to all of the side windows. The side windows include not only the door windows but also any other side windows, which are immovably secured to the side of the vehicle or which are movably received in the side of the vehicle. In this way, an increase in the temperature of the occupant compartment can be further advantageously limited.

Furthermore, a material of the blind sheet 121 can be changed to any appropriate one to have an appropriate light transmittance, so that the system S may have a function of a smoke film.

Furthermore, in the system S of the present embodiment, the roll shade arrangement 122 is placed along the front frame 103a and the upper frame 103b of the window frame 103. Thus, the blind sheet 121 can be lowered from the top side of the opening 102a to cover the opening 102a. In this way, the system S can serve as a sun visor. Thus, the system S of the present embodiment can serve as both the sun visor and the shade.

The occupant can fully extend the blind sheet 121 in the state where the window glass 106 is fully lowered. In this way, the system S can be used as an anti-insect net or sheet to limit intrusion of insets into the occupant compartment. Furthermore, when the blind sheet 121 is lowered to a predetermined position, the blind sheet 121 can block wind, which is otherwise applied to an upper side of the occupant body, such as a head, during driving of the vehicle.

Furthermore, in the system S, the drive arrangement 110, the roll shade mechanism 120 and the guide arrangement 130 are placed between the door panel 102 and the door trim 104 or between the door panel 102 and the trim member 105. Thus, when the system S is not in use, the system S does not bother the occupant. Furthermore, the system S is arranged not in the vehicle body side but is arranged in the door side. Thus, the system S does not interfere with operation of, for example, a curtain sealed air bag to keep vehicle safety.

Figure 12:
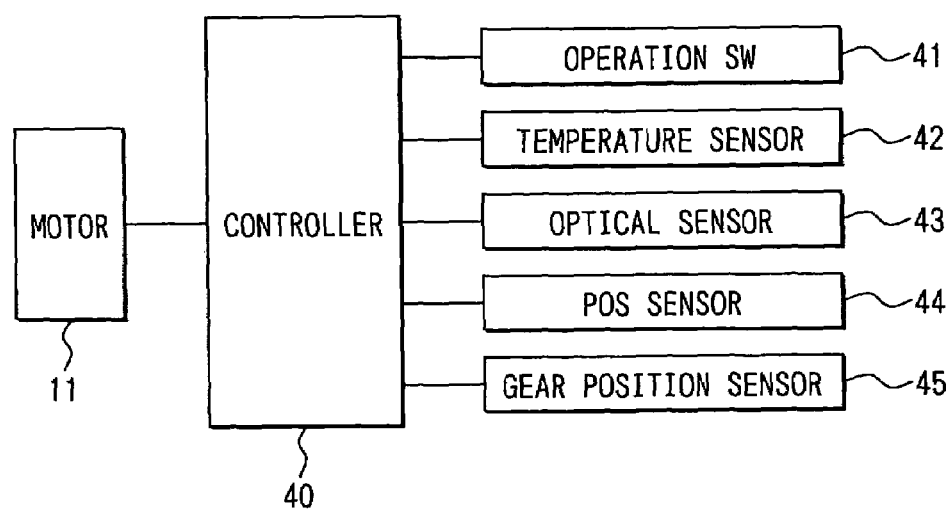
FIG. 12 is a block diagram showing an electrical construction of the sunshade system of the first embodiment.

An electrical construction (not shown) of the system S of the second embodiment can be similar to one described in the first embodiment with reference to FIG. 12. In such a case, similar to the operation switch 41 of the first embodiment, the operation switch 114 of the second embodiment is connected to the controller, and the motor unit 111 is connected to the controller. In this way, the blind sheet 121 can be extended or retracted through manual operation of the operation switch 114 based on the operation signal from the operation switch 114. Alternatively, the blind sheet 121 can be automatically extended or retracted by the motor unit 111 by outputting a drive signal from the controller to the motor unit 111 to drive the motor unit 111 in the normal direction or in the reverse direction based on measurement signals from the temperature sensor, the optical sensor, the position sensor and/or the gear position sensor. At this time, the extending operation and retracting operation of the blind sheets 21, 121 of the front window (and possibly the rear window) and of the side windows can be controlled by a single controller, if desired.

Even in the system S of the second embodiment, when the drive arrangement 110 fails in, for example, the fully extended state of the blind sheet 121, the occupant can disengage between the snap fastener 8a and the snap fastener 8b, which connect between the blind sheet 121 and the slider 135. Upon disengagement between the snap fastener 8b and the snap fastener 8b, the blind sheet 121 is wound around the roll shade arrangement 122 by the urging force of the coil spring 22b applied in the winding direction. Thus, the opening 102a can be placed in the clear state where the opening 102a is not covered with the blind sheet 121.

Furthermore, the occupant can rotate the operation handle 119 to rotate the reel 113 and thereby to wind or unwind the wire 132 around the reel 113, so that the blind sheet 121 is extended or is retracted. Furthermore, similar to the first embodiment, the manual switch 19a can be provided in the drive arrangement 110 to permit the manual operation through the operation handle 119 even in the normal operation.

In the second embodiment, the wire 132 is reeled by the reel 113 of the drive arrangement 110 to vertically move the slider 135. However, the present invention is not limited to this. In place of the wire 132, a resin rack 232 and a pinion 213 can be used as the transmitting member to vertically move the slider 135, as shown in FIG. 30.

Figure 30:
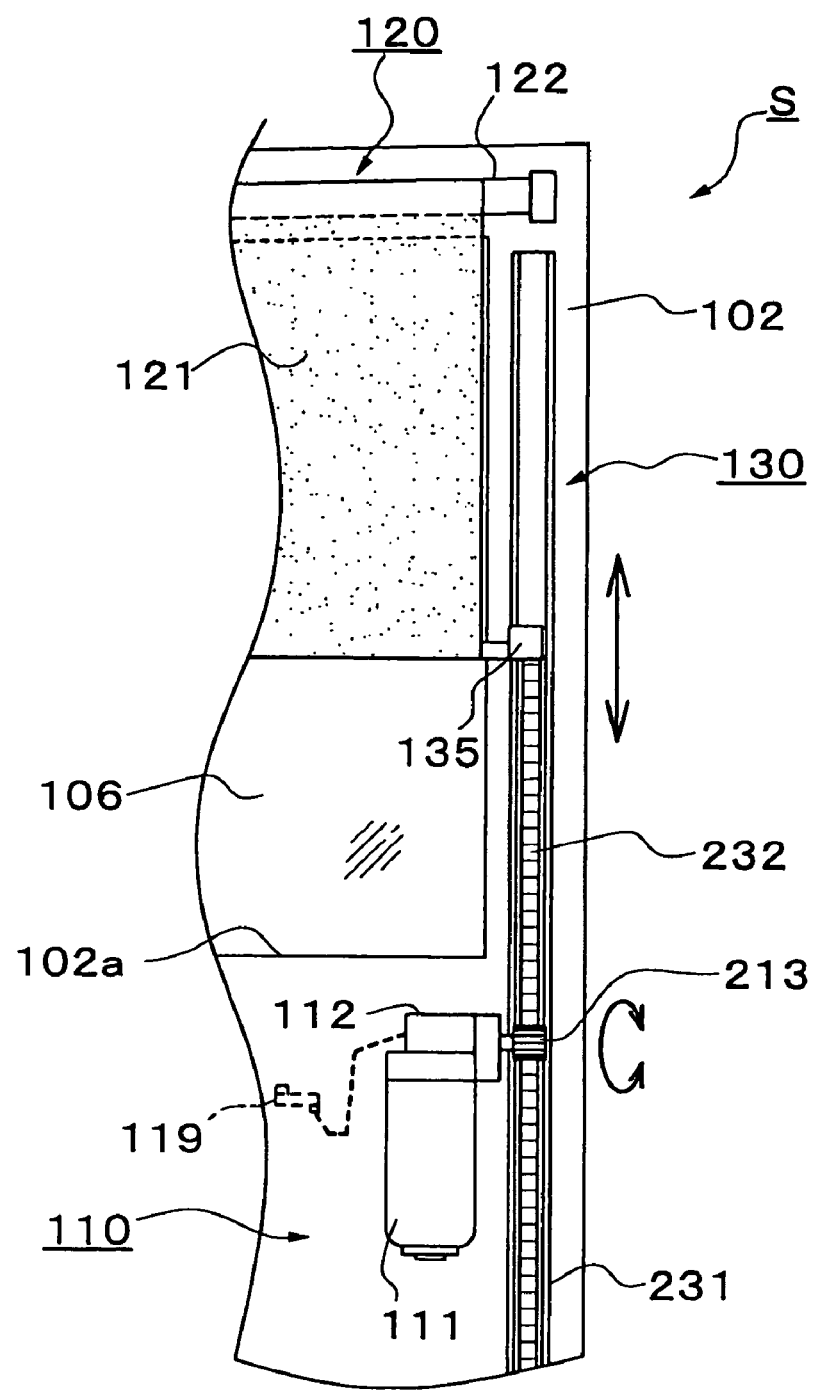
FIG. 30 is a descriptive view showing a sunshade system in a modification of the second embodiment.

As shown in FIG. 30, the guide arrangement 130 includes a guide rail 231, the slider 135 and the rack 232. The guide rail 231 is arranged between the rear frame 103c and the trim member 105. The slider 135 is guided by the guide rail 231 to move along the guide rail 231. An upper end of the rack 232 is connected to the slider 135, which is guided by the guide rail 231. In place of the reel 113, the pinion 213, which is engaged with the rack 232, is connected to the output side of the drive arrangement 110.

The blind sheet 121 and the slider 135 are connected to one another through detachable members, such as the snap fasteners 8a, 8b. Furthermore, the operation handle 119 is connected to the drive arrangement 110.

With the above construction, when the drive arrangement 110 is rotated in the normal direction or in the reverse direction, the pinion 213 is rotated in the normal direction or in the reverse direction, and thereby the rack 232 is moved upwardly or downwardly along the guide rail 231. Thus, the slider 135, which is connected to the upper end of the rack 232, is moved upward or downward to upwardly or downwardly move the blind sheet 121, which is connected to the slider 135.

Even in this modification of the system S, when the drive arrangement 110 fails in, for example, the fully extended state of the blind sheet 121, the occupant can disengage between the snap fastener 8a and the snap fastener 8b, which connect between the blind sheet 121 and the slider 135. Upon disengagement between the snap fastener 8b and the snap fastener 8b, the blind sheet 121 is wound around the roll shade arrangement 122 by the urging force of the coil spring 22b applied in the winding direction. Thus, the opening 102a can be placed in the clear state where the opening 102a is not covered with the blind sheet 121.

Furthermore, in a manner similar to the above described one, the occupant can rotate the operation handle 119 to rotate the pinion 213 and thereby to move the rack 232 upwardly or downwardly. Thus, the blind sheet 121 is extended or retracted. Furthermore, similar to the first embodiment, also, in this case, the manual switch 19a can be provided in the drive arrangement 110 to permit the manual operation through the operation handle 119 even in the normal operation.

Figure 31:
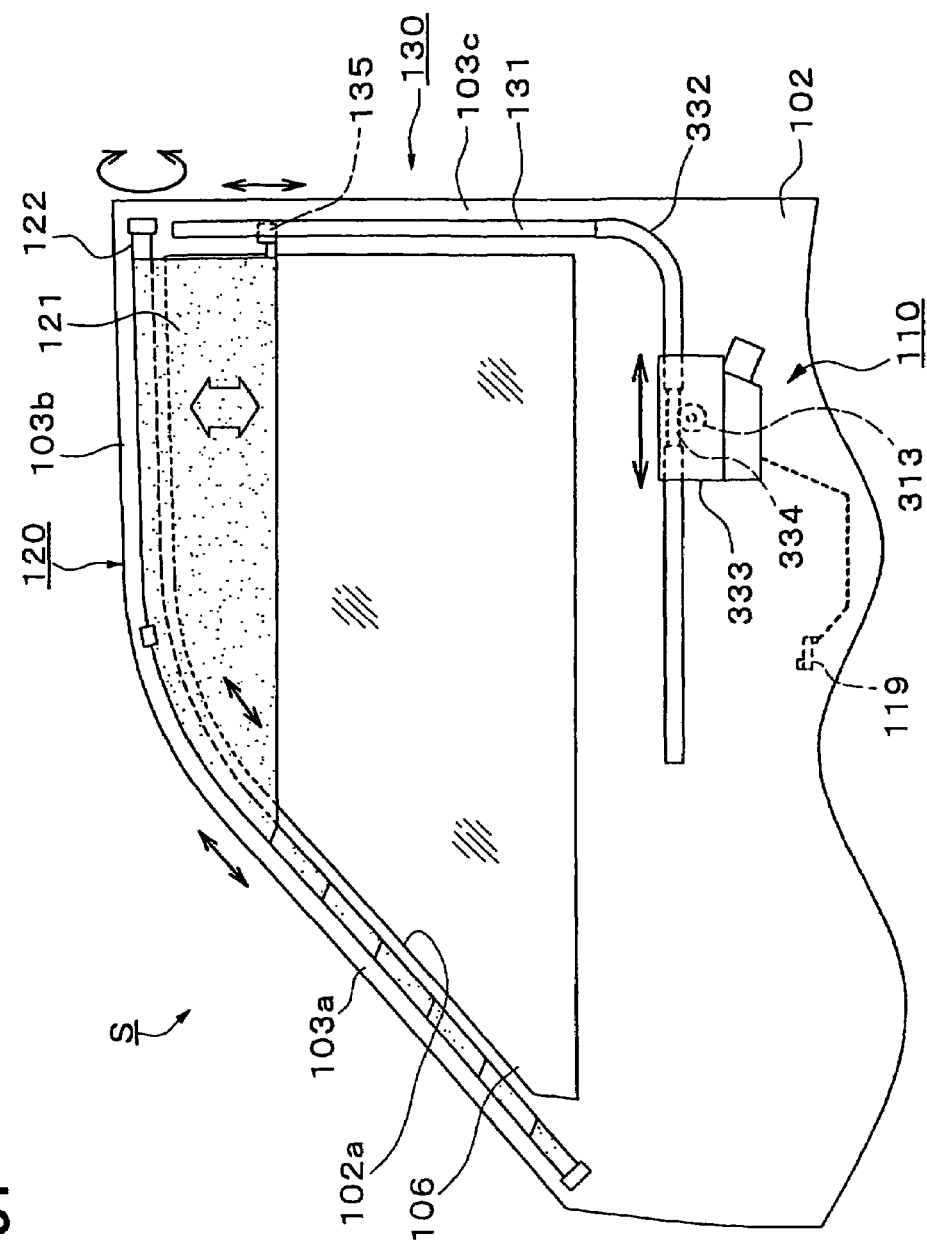
FIG. 31 is a descriptive view showing a sunshade system in another modification of the second embodiment.

In the second embodiment, the wire 132 is directly wound by the drive arrangement 110 (i.e., the reel 113 of the drive arrangement 110). However, the present invention is not limited to this. For example, as shown in FIG. 31, similar to the first embodiment, a spiral cable 334 can be driven by the drive arrangement 110. The roll shade arrangement 122 is arranged and is curved along the front frame 103a and the upper frame 103b. The blind sheet 121 and the slider 135 are connected to one another by the detachable engaging members, such as the snap fasteners 8a, 8b.

The guide arrangement 130 is arranged in the rear frame 103c. The guide arrangement 130 includes the guide rail 131, the slider 135, a hollow cable pipe 332 and the spiral cable 334. The slider 135 is slidably guided in the guide rail 131. The cable pipe 332 is connected to the lower end of the guide rail 131. The spiral cable 334 serves as a transmitting member, which is arranged in the cable pipe 332 and is slidable in the cable pipe 332. The lateral side of the free end of the blind sheet 121 is connected to the slider 135.

The cable pipe 332 is bent at a predetermined curvature around the lower end of the rear frame 103c and protrudes forward (in the left direction in FIG. 31). Furthermore, a cable pipe holder 333 is arranged to hold the cable pipe 332 at the lower side of the window frame 103. In the cable pipe holder 333, the cable pipe 332 is partially cut along its length, and the spiral cable 334 is exposed in the cut portion.

The drive arrangement 110 includes the motor unit and the speed reducing mechanism and is connected to the cable pipe holder 333. An output gear 313 is connected to an output side (e.g., an output shaft) of the drive arrangement 110 in such a manner that the output gear 313 protrudes in the lateral direction of the vehicle. The output gear 313 is installed to mesh with the spiral cable 334, which is exposed in the cable pipe holder 333. The spiral cable 334 and the drive arrangement 110, which is meshed with the spiral cable 334 to drive the spiral cable 334, are similar to those discussed in the first embodiment. Furthermore, the operation handle 119 is connected to the drive arrangement 110 in a manner similar to that of the first embodiment.

Furthermore, the spiral cable 334 is inserted in a guide groove of the guide rail 131 to slidably guide the slider 135 and the spiral cable 334, which is connected to the slider 135.

The drive arrangement 110 and the guide arrangement 130 are constructed in the above described manner. Thus, when the drive arrangement 110 is rotated in the normal direction or in the reverse direction, the spiral cable 334 is guided in the cable pipe 332 and the guide rail 131 in the corresponding direction. Therefore, the slider 135, which is secured to the end of the spiral cable 334, is moved between the upper end and the lower end of the guide rail 131. Accordingly, the stretchable blind sheet 121 is extended or is retracted between the upper end and the lower end of the opening 102a of the window frame 103 while stretching in the width direction.

Even in this modification of the system S, when the drive arrangement 110 fails in, for example, the fully extended state of the blind sheet 121, the occupant can disengage between the snap fastener 8a and the snap fastener 8b, which connect between the blind sheet 121 and the slider 135. Upon disengagement between the snap fastener 8b and the snap fastener 8b, the blind sheet 121 is wound around the roll shade arrangement 122 by the urging force of the coil spring 22b applied in the winding direction. Thus, the opening 102a can be placed in the clear state where the opening 102a is not covered with the blind sheet 121.

Furthermore, in a manner similar to the above described one, the occupant can rotate the operation handle 119 to rotate the output gear 313 and thereby to move the spiral cable 334 forward or backward. Thus, the blind sheet 121 is extended or retracted. Furthermore, similar to the first embodiment, the manual switch 19a can be provided in the drive arrangement 110 to permit the manual operation through the operation handle 119 even in the normal operation.

Figure 32:
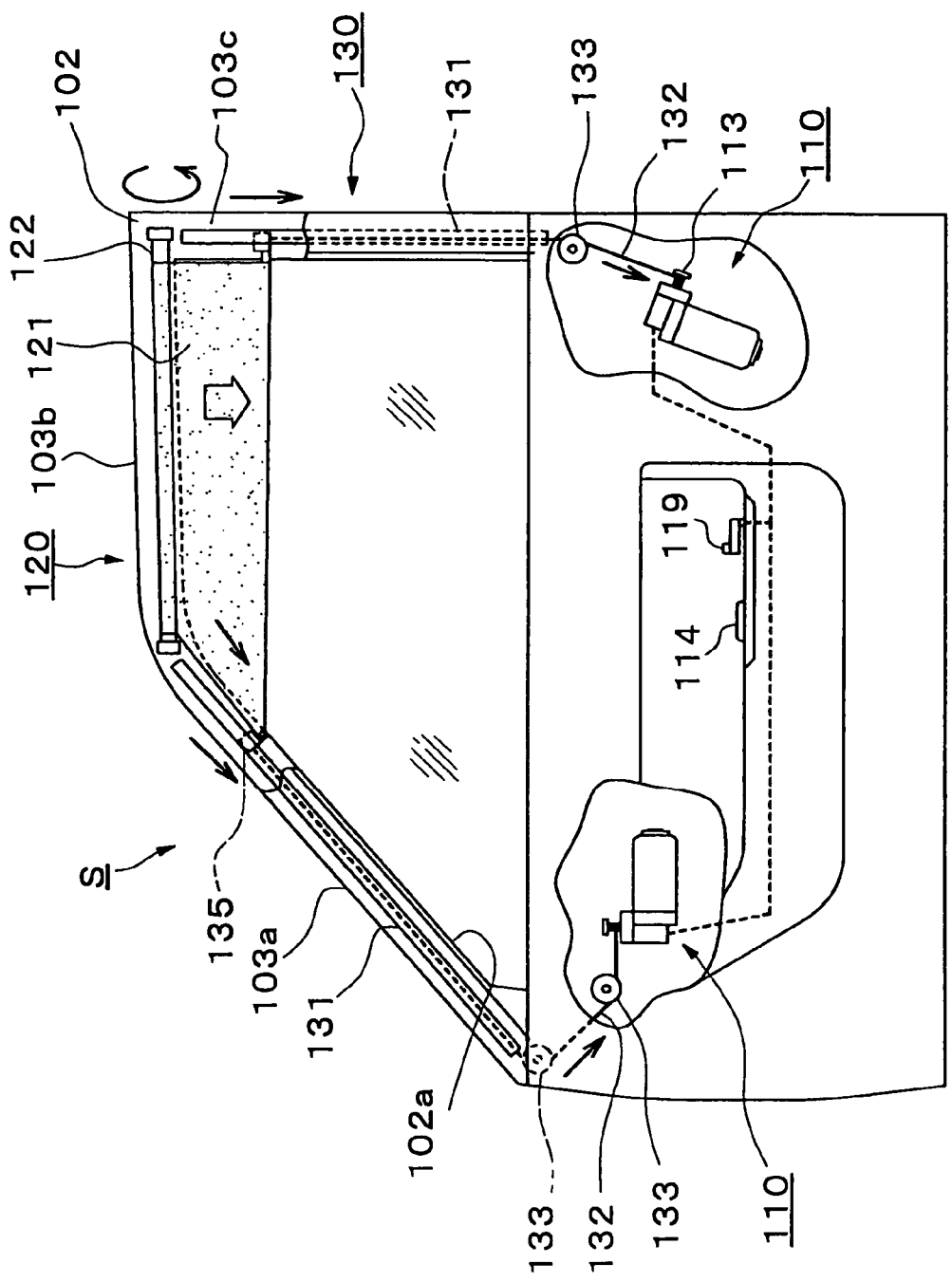
FIG. 32 is a descriptive view showing a sunshade system in another modification of the second embodiment.

In the second embodiment, the guide arrangement 130 is provided only in the rear frame 103c. Alternatively, two guide arrangements 130 can be provided in the front frame 103a and the rear frame 103c, respectively, as shown in FIG. 32. In this modification, two drive arrangements 110 are also provided. Therefore, one of the drive arrangements 110 and one of the guide arrangements 130 are provided on the left side of the roll shade arrangement 122, and the other one of the drive arrangements 110 and the other one of the guide arrangements 130 are provided on the right side of the roll shade arrangement 122. As a result, the one guide rail 131 is provided to the front frame 103a, and the other guide rail 131 is provided to the rear frame 103c. Also, each slider 135 is slidably arranged in the corresponding one of the guide rails 131. The left and right sides of the free end of the blind sheet 121 are connected to the sliders 135, respectively.

The blind sheet 121 is connected to the sliders 135 by detachable engaging members, such as the snap fasteners 8a, 8b. Furthermore, the operation handle 119 is connected to each of the drive arrangements 110.

One end of each wire 132 is connected to the corresponding slider 135. Each wire 132 is received in the corresponding guide rail 131 and is guided to the corresponding drive arrangement 110.

The roll shade mechanism 120 includes the roll shade arrangement 122. The roll shade arrangement 122 is provided in the upper frame 103b and extends along a linear line or a slightly curved line.

With this construction, in the system S, when the operation switch 114 is operated, the two drive arrangements 110 synchronously rotate in the normal direction or in the reverse direction. In this way, the sliders 135, which are connected to the wires 132, are guided along the guide rails 131, respectively. At this time, similar to the first and second embodiments, the stretchable blind sheet 121 can be stretched in the width direction to cover the entire opening 102a.

Even in this modification of the system S, when the drive arrangements 110 fail in, for example, the fully extended state of the blind sheet 121, the occupant can disengage between the snap fasteners 8a and the snap fasteners 8b, which connect between the blind sheet 121 and the sliders 135. Upon disengagement between the snap fasteners 8b and the snap fasteners 8b, the blind sheet 121 is wound around the roll shade arrangement 122 by the urging force of the coil spring 22b applied in the winding direction. Thus, the opening 102a can be placed in the clear state where the opening 102a is not covered with the blind sheet 121.

Furthermore, in a manner similar to the above described one, the occupant can rotate the operation handle 119 to rotate the reel 113 and thereby to wind or unwind the wire 132 around the reel 113, so that the blind sheet 121 is extended or is retracted. Furthermore, similar to the first embodiment, the manual switch 19a can be provided to permit the manual operation through the operation handle 119 even in the normal operation.

Figure 33:
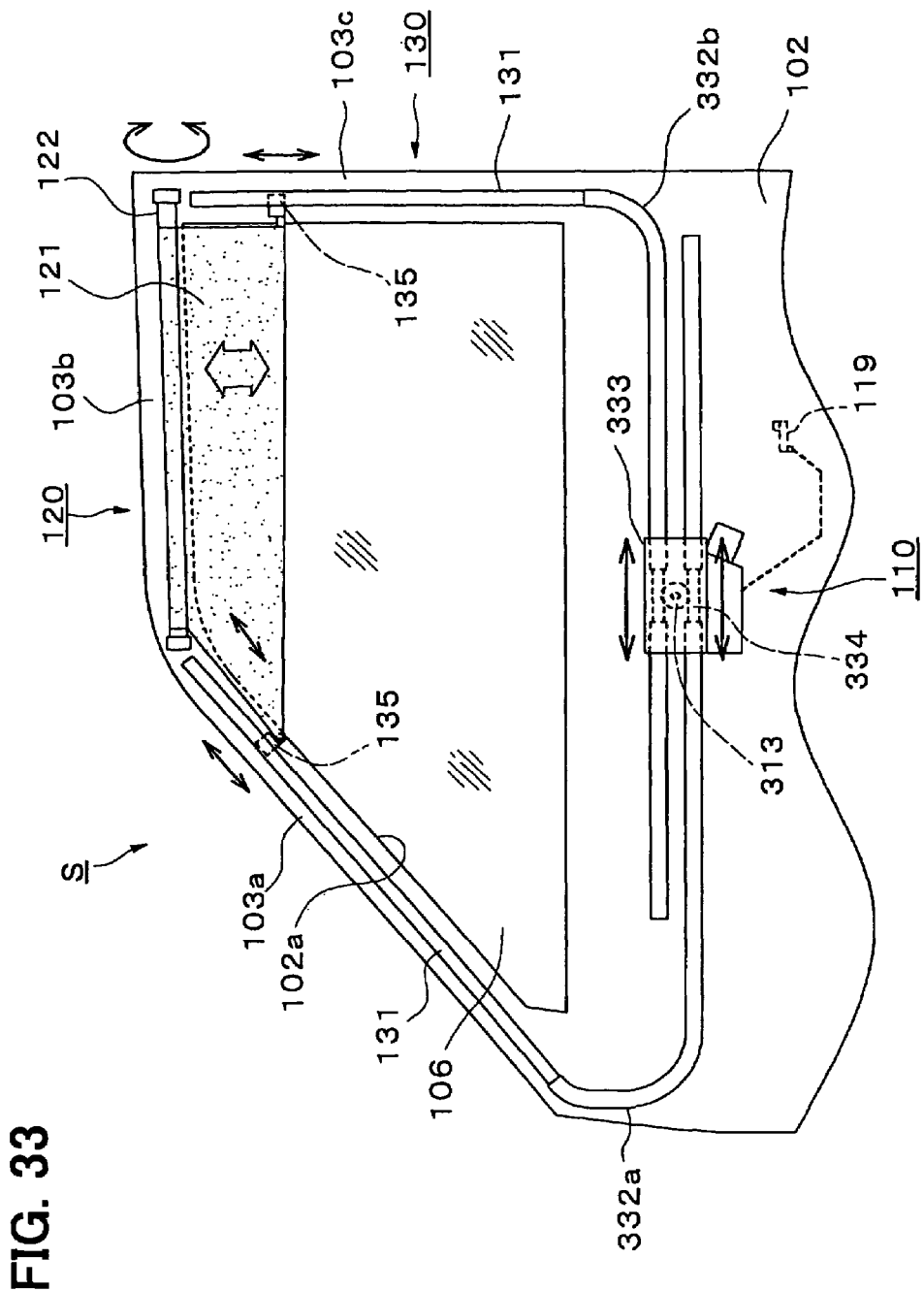
FIG. 33 is a descriptive view showing a sunshade system in another modification of the second embodiment.

Further alternatively, as shown in FIG. 33, two guide arrangements 130 can be provided in the front frame 103a and the rear frame 103c, respectively. Furthermore, similar to the one shown in FIG. 31, the spiral cables 334 can be driven by the drive arrangement 110. Even in this modification, the blind sheet 121 is connected to the sliders 135 by detachable engaging members, such as the snap fasteners 8a, 8b. Also, the operation handle 119 is connected to the drive arrangement 110.

In the modification shown in FIG. 33, two cable pipes 332a, 322b are respectively connected to lower ends of two guide rails 131, which are provided in the front frame 103a and the rear frame 103c, respectively. The cable pipes 323a, 323b are bent at a predetermined curvature at the lower ends of the front and rear frames 103a, 103c, respectively, and are extended in the rear (right in FIG. 33) and front (left in FIG. 33) directions, respectively. At the lower side of the window frame 103, the two cable pipes 332a, 332b are arranged in the vertical direction and extend parallel to one another. Furthermore, the cable pipe holder 333 is provided to integrally hold both the cable pipes 332a, 332b, which are arranged parallel to one another at the lower side of the window frame 103. In the cable pipe holder 333, the cable pipes 332a, 332b are partially cut along its length, and the spiral cables 334 are exposed in the cut portions of the cable pipes 332a, 332b, respectively. One end of each spiral cable 332a, 332b is inserted into the guide groove of the corresponding guide rail 131 and is connected to the corresponding slider 135.

The drive arrangement 110 and the guide arrangements 130 are constructed in the above described manner. Thus, when the drive arrangement 110 is rotated in the normal direction or in the reverse direction, each spiral cable 334 is guided in the corresponding cable pipe 332a, 332b and the corresponding guide rail 131. Thus, each slider 135, which is secured to the end of the corresponding spiral cable 334, is moved between the upper end and the lower end of the corresponding guide rail 131. In response to this movement, the stretchable blind sheet 121 is extended or is retracted between the upper end and the lower end of the opening 102a of the window frame 103 while being stretched in the width direction.

Even in this modification of the system S, when the drive arrangement 110 fails in, for example, the fully extended state of the blind sheet 121, the occupant can disengage between the snap fasteners 8a and the snap fasteners 8b, which connect between the blind sheet 121 and the sliders 135. Upon disengagement between the snap fasteners 8b and the snap fasteners 8b, the blind sheet 121 is wound around the roll shade arrangement 122 by the urging force of the coil spring 22b applied in the winding direction. Thus, the opening 102a can be placed in the clear state where the opening 102a is not covered with the blind sheet 121.

Furthermore, in a manner similar to the above described one, the occupant can rotate the operation handle 119 to rotate the output gear 313 and thereby to drive the spiral cables 334, so that the blind sheet 121 is extended or is retracted. Furthermore, similar to the first embodiment, the manual switch 19a can be provided to permit the manual operation through the operation handle 119 even in the normal operation.

Figure 34:
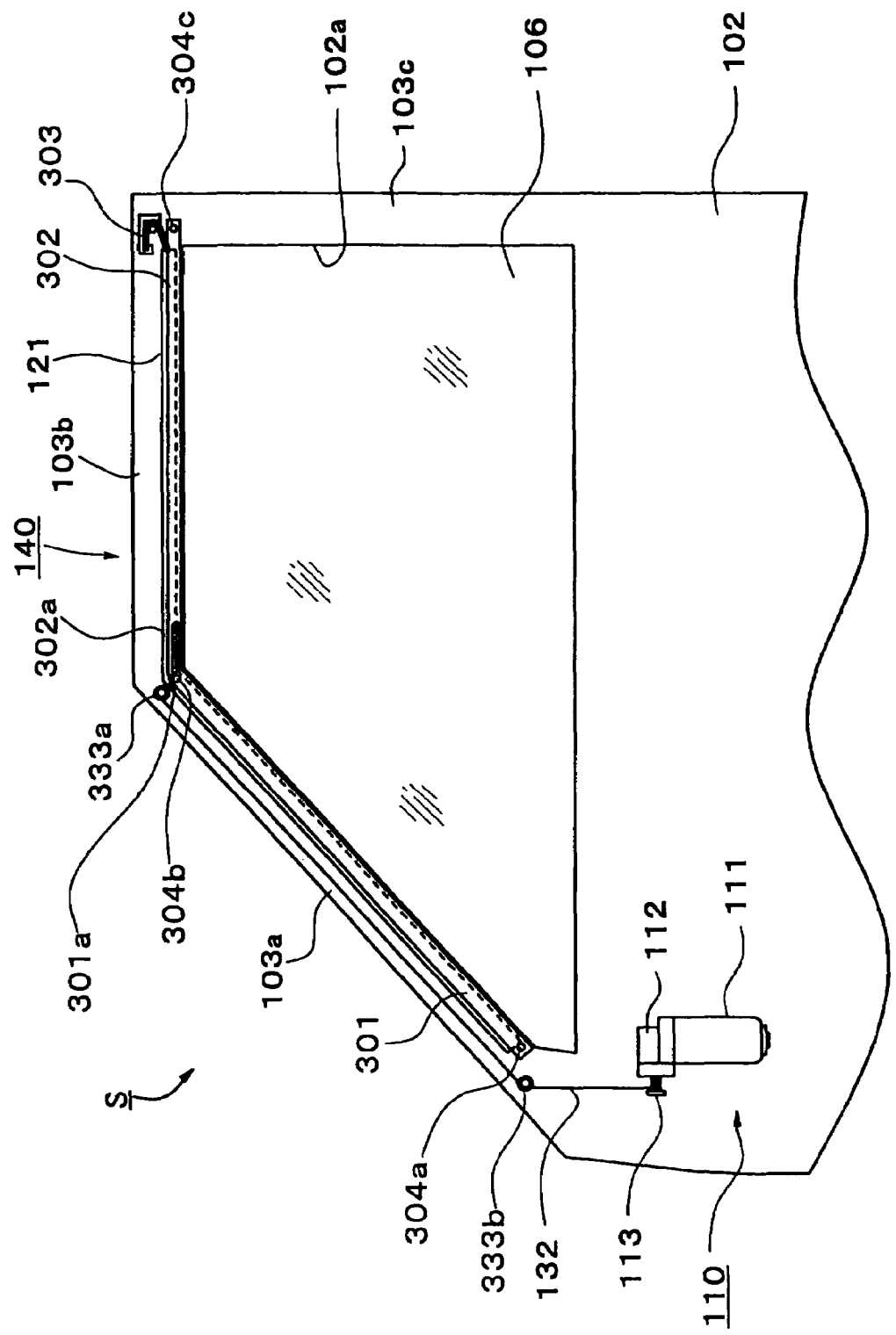
FIG. 34 is a descriptive view showing a sunshade system in another modification of the second embodiment.
Figure 35:
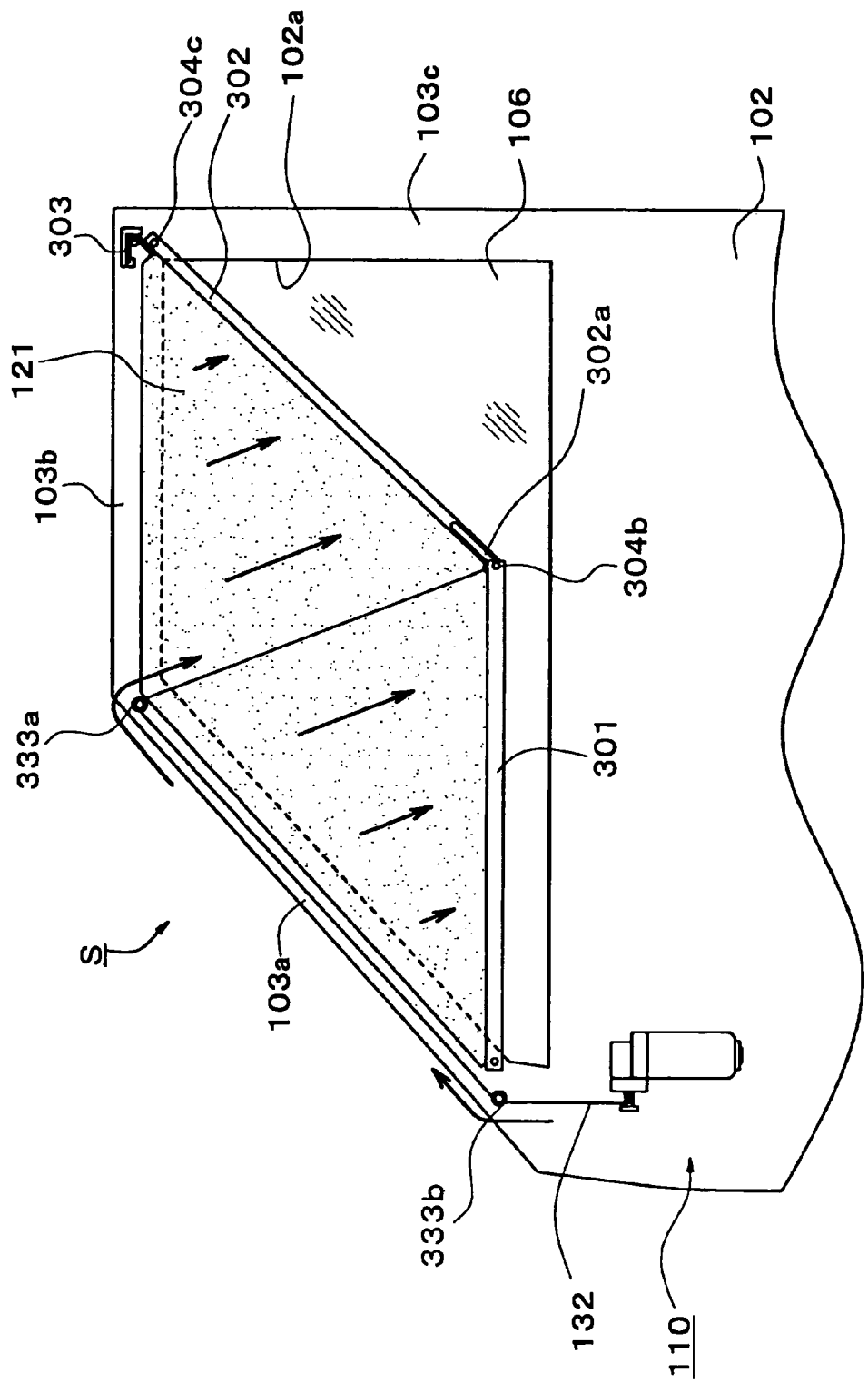
FIG. 35 is a descriptive view of the sunshade system of the modification of FIG. 34.

Also, the system S of the second embodiment can be modified in a manner shown in FIGS. 34 and 35.

In this modification of the system S, as shown in FIGS. 34 and 35, the system S includes the drive arrangement 110 and a sheet deploying mechanism 140. The drive arrangement 110 includes the motor unit 111 and the speed reducing mechanism 112. The reel 113, around which the wire 132 can be wound, i.e., can be reeled, is connected to the output side of the drive arrangement 110.

The sheet deploying mechanism 140 includes the blind sheet 121 and pivotable frames 301, 302. A lower side and a rear side of the blind sheet 121 are connected to the pivotable frames 301, 302, respectively. Each pivotable frame 301, 302 is formed as a rigid linear member and has an opening slit that extends along its length on an upper side of the pivotable frame 301, 302 in FIG. 34, so that each pivotable frame 301, 302 has a U-shaped cross section.

A front end of the pivotable frame 301 is rotatably supported by a support pin 304a, which is arranged at a lower end of the front frame 103a. A rear end of the pivotable frame 302 is rotatably supported by a support pin 304c, which is arranged at a connection between a rear end of the upper frame 103b and a top end of the rear frame 103c.

A slit 302a, which has a predetermined length, is formed in a front end of the pivotable frame 302 in a longitudinal direction of the pivotable frame 302. A support pin 304b is provided in a rear end of the pivotable frame 301 in such a manner that the support pin 304b is received in the slit 302a of the pivotable frame 302. Thus, the pivotable frame 301 and the pivotable frame 302 are connected to one another by the support pin 304b in a manner that allows relative rotation therebetween. When the support pin 304b moves in the slit 302a in the longitudinal direction of the pivotable frame 302, the pivotable frame 301 and the pivotable frame 302 can pivot about the support pins 304a, 304c, respectively.

A leaf spring (urging means) 303 is arranged in the upper end of the rear frame 103c to urge a top surface of the rear end of the pivotable frame 302 in a downward direction. Thus, the pivotable frame 302 receives an urging force of the spring 303, which urges the pivotable frame 302 in a counterclockwise direction about the support pin 304c. In this way, the pivotable frame 302 and the pivotable frame 301, which are connected together in a manner that allows relative rotation therebetween, always receive the urging force in a deploying direction. Although the leaf spring 303 is used as the urging means, any other appropriate means, such as a coil spring or an elastic member, can be used as the urging means. Furthermore, the urging means can alternatively urge the frame 301 in the deploying direction in place of the frame 302.

A pulley 333a is arranged at the upper end of the front frame 103a, and a pulley 333b is arranged at the lower end of the front frame 103a. Furthermore, a hook 301a is connected to the rear end of the pivotable frame 301. One end (upper end in FIG. 34) of the wire 132 is connected to the hook 301a. Then, the wire 132 is guided along the front frame 103a through the pulleys 333a, 333b, and the other end of the wire 132 is connected to the reel 113 of the drive arrangement 110. In this modification, the drive arrangement 110 is provided at the vehicle front side, and the wire 132 is arranged along the front frame 103a. However, the present invention is not limited to this. Alternatively, the drive arrangement 110 may be provided near the rear frame 103c, and the wire 132 may be extended from the reel 113 of the drive arrangement 110 to the hook 301a through corresponding pulleys (not shown). The drive arrangement 110 and the pulleys 333a, 333b constitute a winding means.

The blind sheet 121 has a predetermined shape. In the state shown in FIG. 35, a front side of the blind sheet 121 is secured to the front frame 103a, and an upper side of the blind sheet 121 is secured to the upper frame 103b. Furthermore, the lower side of the blind sheet 121 is secured to the pivotable frame 301, and the rear side of the blind sheet 121 is secured to the pivotable frame 302. In the fully retracted state of the blind sheet 121, the pivotable frame 301 is arranged along the front frame 103a, and the pivotable frame 302 is arranged along the upper frame 103b. Since the cross section of each pivotable frame 301, 302 is U-shaped, each pivotable frame 301, 302 can receive the blind sheet 121 therein.

With the above construction, when the drive arrangement 110 is rotated in the normal direction from the state shown in FIG. 34, the wire 132 is unreeled and is extended from the reel 113. Since the urging force is applied to the pivotable frame 302 from the leaf spring 303 in the deploying direction, the unreeling of the wire 132 causes deployment of the pivotable frames 301, 302. Thus, the blind sheet 121 is extended to cover the opening 102a while being stretched. Thus, even in the middle of the way to the fully deployed position, i.e., the fully extended position, the blind sheet 121 can cover the opening 102a while exerting a predetermined tension. At this time, the support pin 304b moves in the slit 302a. FIG. 35 shows a state where the pivotable frames 301, 302 are held in the fully deployed position.

In the state shown in FIG. 35, when the drive arrangement 110 is rotated in the reverse direction, the wire 132 is reeled around the reel 113 against the urging force of the leaf spring 303. At the fully retracted position, the blind sheet 121 is received in the pivotable frames 301, 302, as described above.

In the modification shown in FIGS. 34 and 35, the two pivotable frames 301, 302 are arranged in the window frame 103 in the pivotable manner. Alternatively, the pivotable frame 301 or the pivotable frame 302 may be eliminated. Specifically, in a case only the pivotable frame 301 is provided to pivot about the support pin 304a from the front frame 103a toward the opening 102a side, the opening 102a can be covered by the stretchable blind sheet 121 by pivoting the pivotable frame 301 toward the opening 102a. Also, in a case only the pivotable frame 302 is provided to pivot about the support pin 304c between the upper front frame 103a and the rear frame 103c, substantially the entire opening 102a can be covered by the stretchable blind sheet 121 by pivoting the pivotable frame 302 toward the rear frame 103c.

Figure 36:
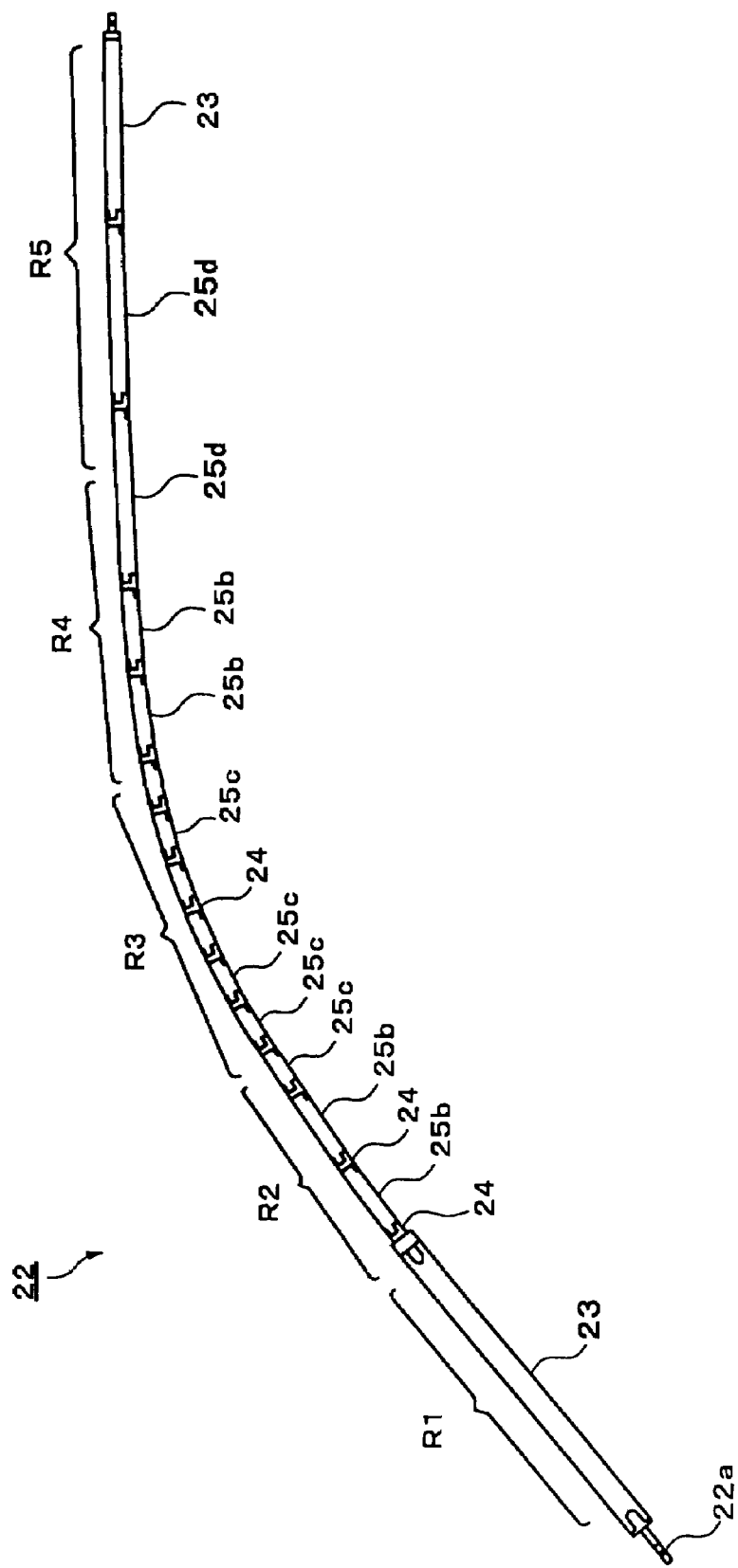
FIG. 36 is a descriptive view showing a roll shade arrangement in another modification of the second embodiment.

FIG. 36 shows a modification of the roll shade arrangement 122 of the second embodiment. The following modification is also equally applicable to the roll shade arrangement 22 of the first embodiment, and thus such a modification of the roll shade arrangement 22 of the first embodiment will not be described for the sake of simplicity. In the roll shade arrangement 22 of FIG. 36, the spring holder 22c (FIG. 9) is arranged at one end of the roll shade arrangement 22, and one end of the spring holder 22c is connected to the adjacent center rod 25b through the joint 24. The center shaft 22a and the coil spring 22b (FIG. 9) are arranged in the interior of the spring holder 22c. The lower end of the coil spring 22b is secured to the spring holder 22c, and the upper end of the coil spring 22b is secured to the center shaft 22a. The roll shade arrangement 22 receives a rotational force from the coil spring 22b in the winding direction of the roll shade arrangement 22.

In FIG. 36, a curvature of the center shaft 22a varies in longitudinal ranges (longitudinal regions) R1-R5. Specifically, in the ranges R1, R5, the curvature is relatively small (i.e., having a relatively large radius of curvature). In the ranges R2, R4, the curvature is intermediate (i.e., having an intermediate radius of curvature). In the range R3, the curvature is relatively large (i.e., having a relatively small radius of curvature).

Due to the presence of these curvatures, a long center rod 25d (or a long side rod 23) is used in the ranges R1 and R5, which have the relatively small curvature. In the ranges R2, R4, which have the intermediate curvature, an intermediate center rod 25b, which has an intermediate axial length, is used. Furthermore, in the range R3, which has the relatively large curvature, a sort center rod 25c, which has a relatively small axial length, is used.

In conformity with the curvature of, for example, the window frame, along which the roll shade arrangement 22 is arranged, the long center rod 25d (or the long side rod 23), the intermediate center rod 25b and the short center rod 25c are selectively used. Thus, the shape of the roll shade arrangement 22 can be easily adapted to the curvature of, for example, the window frame. With this construction, the center rods, 25b, 25c, 25d, the joints 24 and the side rods 23 will receive less resistance when the center rods 25b, 25c, 25d, the joints 24 and the side rods 23 rotate around the center shaft 22a, allowing easy rotation. Thus, a level of the noise is advantageously reduced. Furthermore, use of the long center rods 25d allows a reduction in the number of components.

In the case of FIG. 36, the three types of center rods 25b, 25c, 25d (and the side rods 23) are used. However, the present invention is not limited to this. More specifically, it is only required to use two or more types of center rods (and the side rods).

Furthermore, only the short center rods 25c can be used without using the intermediate and long center rods 25b, 25d. With this construction, the roll shade arrangement 122 can be easily adapted to the curvature and can be smoothly rotated while reducing a level of noise.

Furthermore, in the case of FIG. 36, the axial length of each joint 24 is short (shorter than any of the center rods 25b-25d) and is constant. Alternatively, two or more types of joints, which have different axial lengths, can be used based on the curvature of, for example, the window frame.

Figure 37:
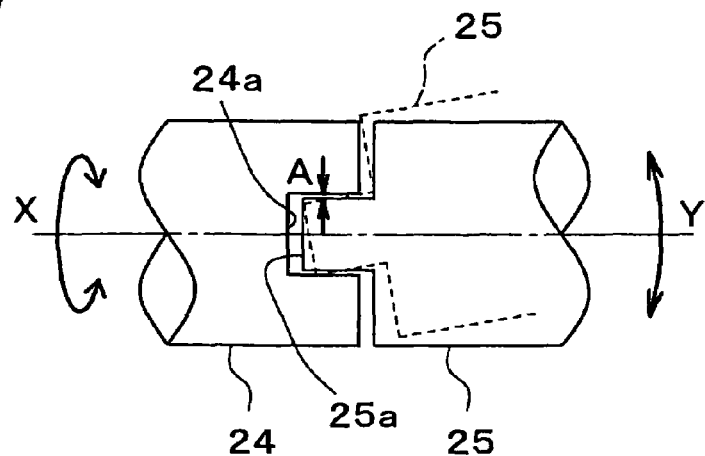
FIG. 37 is another descriptive view of the roll shade arrangement of FIG. 36.

Furthermore, in the first and second embodiments, each joint 24 and the adjacent center rod 25 are connected in such a manner that the rectangular engaging projections 25a of the center rod 25 are loosely fitted to the rectangular engaging recesses 24a of the joint 24, as shown in FIG. 37.

Each end of the center rod 25 has the two engaging projections 25a, which are displaced 180 degrees in the circumferential direction (FIG. 10). The center rod 25 can slide and pivot relative to the joint 24 in a plane, which extends through both the engaging projections 25a in the axial direction, i.e., which is perpendicular to the plane of FIG. 37. More specifically, the center rod 25 can pivot relative to the joint 24 in a direction perpendicular to a direction Y in FIG. 37.

A circumferential width of each engaging recess 24a is greater than a circumferential width of the corresponding engaging projection 25a, so that a predetermined space A is defined between an engaging surface of the engaging recess 24a and an engaging surface of the engaging projection 25a at one circumferential side of the engaging recess 24a. Because of the provision of the space A, the center rod 25 can be pivoted relative to the joint 24 within a predetermined angular range in the direction Y (i.e., the direction in a plane perpendicular to the above plane, which extends through both the engaging projections 25a in the axial direction). When the space A is increased, the pivotable angle of the center rod 25 relative to the joint 24 in the Y direction is increased.

The curvature of the roll shade arrangement 22, 122 is not constant along the length of the roll shade arrangement 22, 122. Thus, a size of the space A needs to be appropriately set according to the curvature of the roll shade arrangement 22, 122. More specifically, in a region of a small curvature, the size of the space A can be set to a relatively small value. However, in a region of a large curvature, the size of the space A needs to be increased to allow the roll shade arrangement 22, 122 to conform with the large curvature. Through the adjustment of the space A in the above described manner, the curvature of the roll shade arrangement 22, 122 can be appropriately set in each of the axial region thereof.

As described above, the center rod 25 can pivot in the direction Y and also in the direction perpendicular to the direction Y. Thus, the roll shade arrangement 22, 122 can smoothly rotate.

Figure 39:
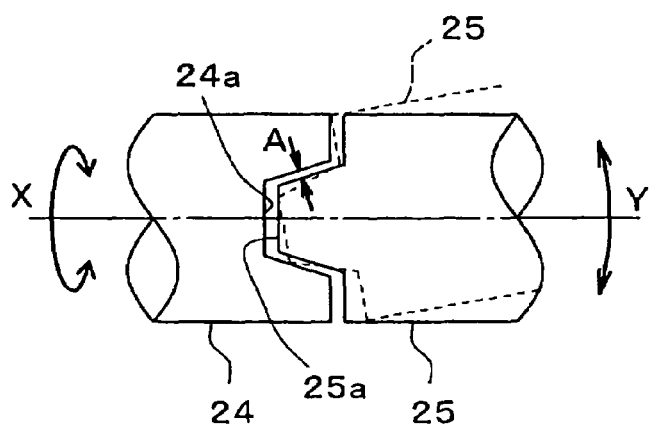
FIG. 39 is a descriptive view showing a roll shade arrangement in another modification of the second embodiment.

The shape of each engaging recess 24a and the shape of each engaging projection 25a are not limited to the rectangular shapes shown in FIG. 37. For example, each engaging recess 24a and each engaging projection 25a can have trapezoidal shapes, as shown in FIG. 39.

Figure 40:
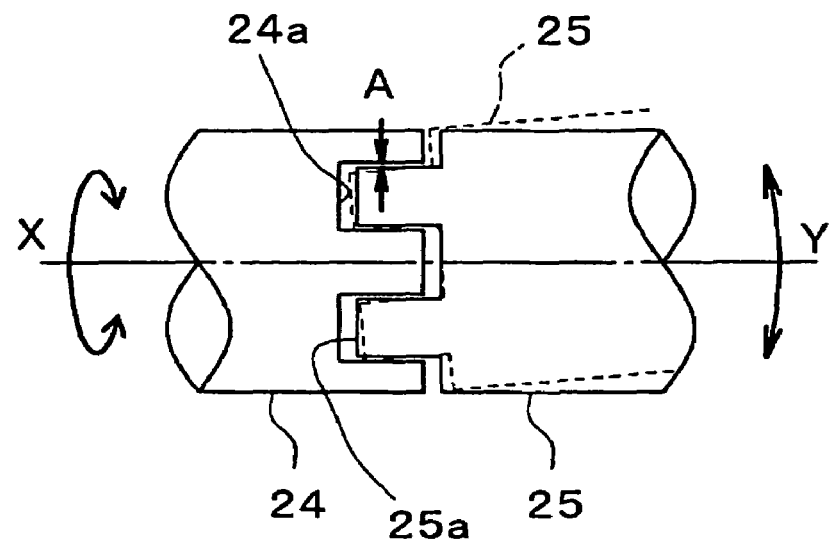
FIG. 40 is a descriptive view showing a roll shade arrangement in another modification of the second embodiment.

Furthermore, as shown in FIG. 40, multiple engaging recesses 24a and multiple engaging projections 25a can be provided. In FIG. 40, four engaging projections 25a are arranged at 90 degree intervals in the circumferential direction, and four engaging recesses 24a are arranged also at 90 degree intervals in the circumferential direction. In this construction, similar to the construction of FIG. 37, the center rod 25 can slide and pivot relative to the joint 24 in the plane perpendicular to the plane of FIG. 40. That is, the center rod 25 can pivot relative to the joint 24 in the direction perpendicular to the direction Y in FIG. 40. Furthermore, due to provision of the space A, the center rod 25 can pivot relative to the joint 24 within a predetermined angular range in the direction Y. The number of the engaging recesses 24a can be alternatively set to three or can be further alternatively set to five or greater. Also, the number of the engaging recesses 25a can be alternatively set to three or can be further alternatively set to five or greater. Even in this case, the above-described pivotal movement of the center rod 25 relative to the joint 24 is possible.

However, in some cases, the space A, which is provided between each engaging projection 25a and the corresponding engaging recess 24a, could cause a delay in transmission of the rotational force of the center rod 25. This delay in the transmission of the rotational force does not have a substantial influence on the extending and retracting operations. However, this delay could possible cause slight time difference between the ends of the roll shade arrangement 22, 122. Furthermore, abutment of the engaging projection 25a to the engaging recess 24a could possible cause generation of noise.

Figure 38:
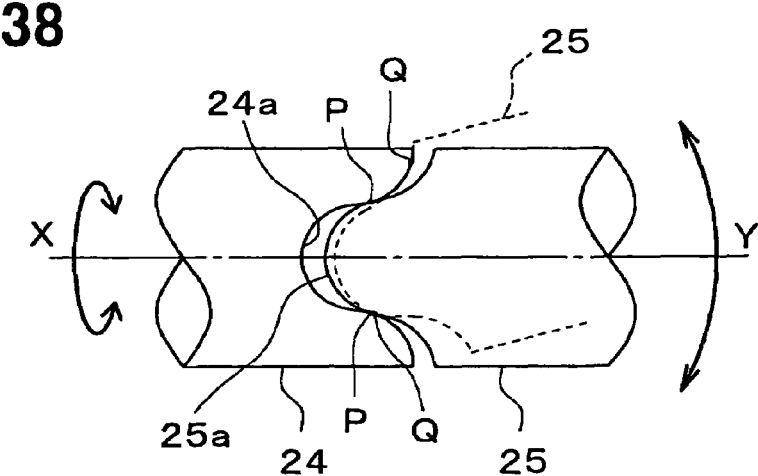
FIG. 38 is a descriptive view showing a roll shade arrangement in another modification of the second embodiment.

Thus, in a modification shown in FIG. 38, an engaging surface of each engaging recess 24a and an engaging surface of each engaging projection 25a are arcuately curved instead of the rectangular shapes. Thus, each engaging recess 24a and the corresponding engaging projection 25a always engage one another. More specifically, when the joint 24 and the center rod 25 are aligned linearly in the axial direction, the curved engaging surface of the engaging recess 24a and the curved engaging surface of the engaging projection 25a engage one another at two points (points P in FIG. 38). When the center rod 25 is pivoted upwardly relative to the joint 24 in the Y direction, the engaging recess 24a and the engaging projection 25a engage one another at two points (points Q in FIG. 38). Also, when the center rod 25 is pivoted relative to the joint 24 in the direction perpendicular to the Y direction, the engaging recess 24a and the engaging projection 25a engage one another at two points (not shown). In FIG. 37, when the roll shade arrangement 22, 122 rotates, the engaging recess 24a and the engaging projection 25a repeatedly make line contact and then point contact therebetween.

As discussed above with reference to FIG. 38, the engaging recess 24a and the engaging projection 25a always engage one another when the center rod 25 is linearly aligned with the joint 24 or when the center rod 25 is pivoted relative to the joint 24 in, for example, the Y direction. Thus, when the center rod 25 is rotated about its axis, the rotational force of the center rod 25 is directly transmitted to the joint 24 without a substantial rotational delay. Furthermore, the rotational force is also directly transmitted to the next center rod 25, which engages the other end of the joint 24. In this way, a rotational delay can be substantially eliminated between the ends of the roll shade arrangement 22, 122.

Furthermore, the engaging recess 24a and the engage projection 25a engage with one another through curved surface to curved surface contact. Thus, at the time of rotating the roll shade arrangement 22, 122, the resistance and noise can be reduced, thereby allowing smooth rotational movement of the roll shade arrangement 22, 122. Furthermore, in the case of FIG. 38, the engaging recess 24a and the engaging projection 25a engage one another through curved surface to curved surface contact even at the time of pivoting the center rod 25 relative to the joint 24 in the Y direction. Thus, the pivotal movement of the center rod 25 relative to the joint 24 is smoother in comparison to the case shown in FIG. 37. As a result, the entire rotational movement of the roll shade arrangement 22, 122 is also smoother in comparison to the case shown in FIG. 37.

As discussed above, in the modification of FIG. 38, the engaging recess 24a and the engaging projection 25a are curved to keep the engagement between the engaging recess 24a and the engaging projection 25a regardless of the curvature of the roll shade arrangement 22, 122. Thus, it is not required to set the size of the space A based on the curvature of the roll shade arrangement 22, 122.

When the engaging recess 24a and the engaging projection 25a are formed into the rectangular shapes, the size of the space A needs to be appropriately set based on the curvature of the roll shade arrangement 22, 122. Thus, the number of types of joints 24 and of the center rods 25 is disadvantageously increased. However, when the engaging recess 24a and the engaging projection 25a are arcuately curved, the engaging recess 24a and the engaging projection 25a can have constant shapes, respectively, regardless of the curvature of the roll shade arrangement 22, 122. Thus, the number of types of joints 24 and of center rods 25 is not increased.

Figure 41:
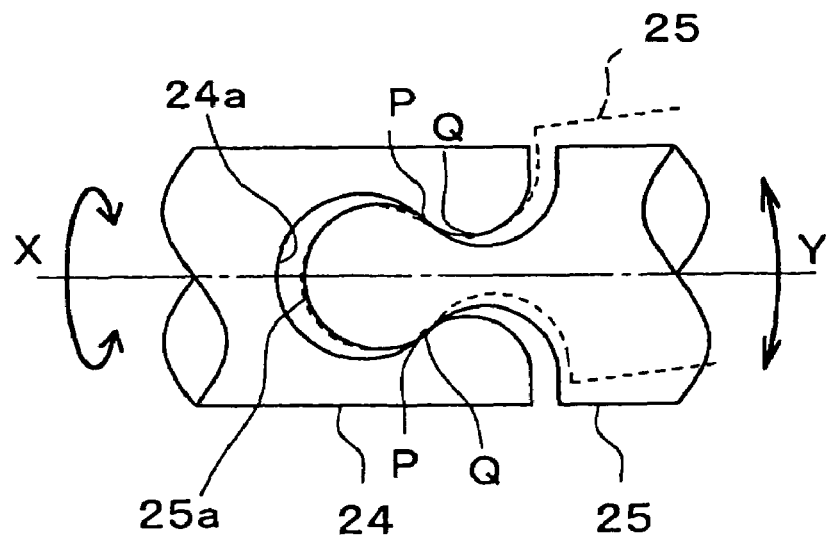
FIG. 41 is a descriptive view showing a roll shade arrangement in another modification of the second embodiment.

Furthermore, the joint 24 and the center rod 25 can be modified in a manner shown in FIG. 41. That is, each engaging recess 24a and the corresponding engaging projection 25a are curved in such a manner that a constricted portion, i.e., a neck is formed in a base of each of the engaging recess 24a and the engaging projection 25a while its distal end is widened.

In the modification of FIG. 41, a distal end of the engaging projection 25a is generally arcuately curved to form the widest portion, and the base of the engaging projection 25a is narrowed in comparison to the distal end of the engaging projection 25a. The engaging recess 24a is slightly larger than the engaging projection 25a and is homothetic to the engaging projection 25a. The narrowest portion of the engaging recess 24a is narrower than the arcuately curved distal end of the engaging projection 25a. Thus, in the engaged state of FIG. 41, the distal end of the engaging projection 25a cannot pass through the narrowest portion of the engaging recess 24a. That is, in the state shown in FIG. 41, when the joint 24 and the center rod 25 are pulled apart from one another to disengage between the joint 24 and the center rod 25, the engagement between the joint 24 and the center rod 25 cannot be released since the axial relative movement between the joint 24 and the center rod 25 is limited. Thus, the engaged state between the joint 24 and the center rod 25 is effectively and reliably maintained.

Similar to the modification shown in FIG. 38, the engaging projection 25a and the engaging recess 24a shown in FIG. 41 are curved and always engage with one another. More specifically, when the joint 24 and the center rod 25 are aligned linearly in the axial direction, the engaging recess 24a and the engaging projection 25a engage one another at two points (points P in FIG. 41). When the center rod 25 is pivoted upwardly relative to the joint 24 in the Y direction, the engaging recesses 24a and the engaging projection 25a engage one another at two points (points Q in FIG. 41). Thus, when the center rod 25 is rotated, the rotational force of the center rod 25 is directly transmitted to the joint 24 without a substantial rotational delay. In this way, a rotational delay between the ends of the roll shade arrangement 22, 122 can be substantially eliminated. Furthermore, the engaging recess 24 and the engaging projection 25 engage one another through curved surface to curved surface contact. Thus, at the time of rotating the roll shade arrangement 22, 122, the resistance and noise can be reduced, thereby allowing smooth rotational movement of the roll shade arrangement 22, 122.

Figure 42A:
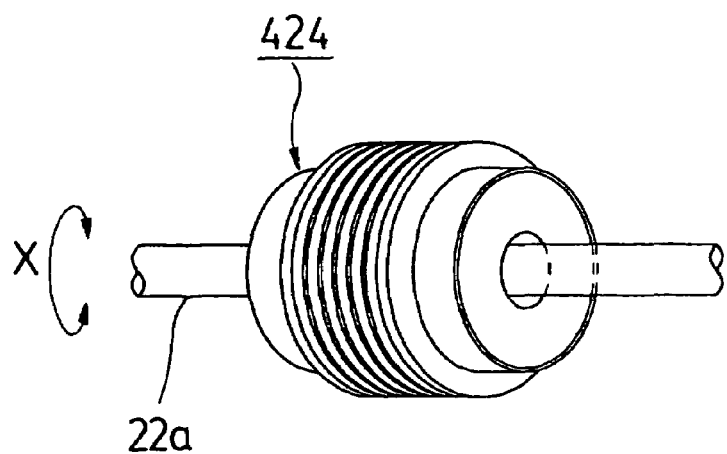
FIG. 42A is a descriptive view showing a roll shade arrangement in another modification of the second embodiment.
Figure 42B:
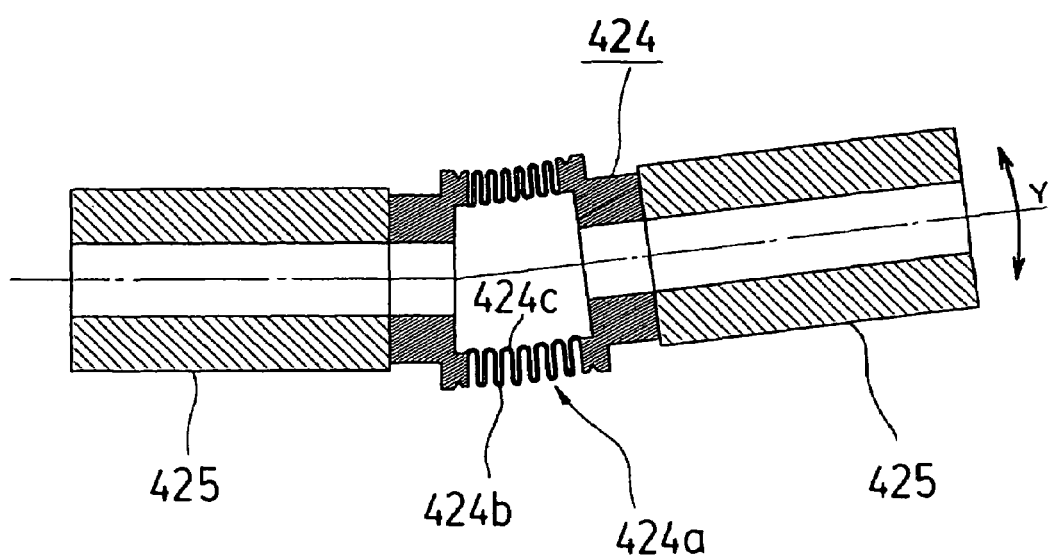
FIG. 42B is another descriptive view of the roll shade arrangement of FIG. 42A.
Figure 43:
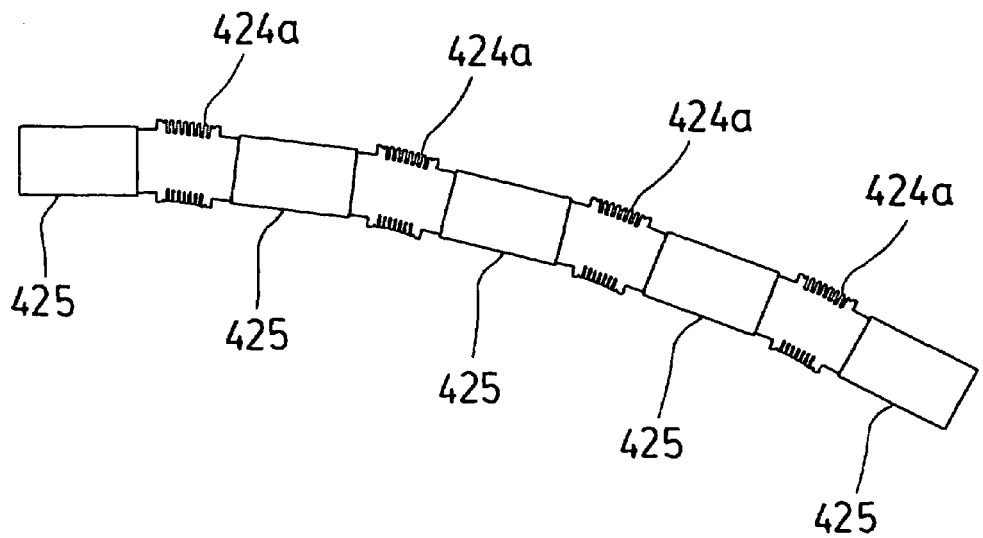
FIG. 43 is another descriptive view of the roll shade arrangement of FIGS. 42A and 42B.

Furthermore, the roll shade arrangement 22, 122 of the first and second embodiments can be modified in a manner shown in FIGS. 42A to 43. In FIGS. 42A to 43, the rotatable rod 22d of the roll shade arrangement 22, 122 is formed by connecting center rods 425 through joints 424, each of which has bellows.

FIG. 43 shows a state where the center rods 425 are joined and are flexed through the joints 424. FIG. 42A shows a perspective view of one of the joints 424. In this modification, each center rod 425 has a predetermined rigidity, and a rigid material, such as synthetic resin or metal, is used to form the center rod 425. Each joint 424 is formed like a flexible coupling. Cylindrical connections are formed in opposed ends, respectively, of the joint 424. The cylindrical connections of the joint 424 are connected by bellows 424a. Ridges 424b and troughs 424c are alternately arranged in the axial direction in the bellows 424a. The shape and material of the ridges 424b and the troughs 424c are selected to allow flexing in the axial direction. Thus, the bellows 424a is extendable in the axial direction. For example, the bellows 424a can be formed as a metal leaf spring assembly. In this way, the joint 424 can be flexed in a manner shown in FIG. 42B. Furthermore, in order to limit a difference in the amount of wound blind sheet 21, 121 between the ends of the rotatable rod 22d at the time of winding the blind sheet 21, 121, the bellows 424a have a predetermined torsional rigidity, which limits torsion of the bellows 424a induced by the rotational force applied from the coil spring 22b around the rotational axis.

The ends of the joint 424 are secured to the adjacent center rods 425, respectively. A known screw means or threaded means, which is generally used in the flexible coupling, can be used as a securing means for connecting the joint 424 to the center rods 425. Furthermore, it is not required to completely secure the joint 424 to the corresponding center rods 425. More specifically, the securing means is only required to prevent relative rotation between the joint 424 and the center rod 425 about the rotational axis. With the above construction, the rotatable rod 22d, which has the center rods 425 connected by the joints 424, can be adapted to conform with the curved shape of the center shaft 22a. Thus, the rotatable rod 22d can smoothly rotate relative to the center shaft 22a.

Figure 44:
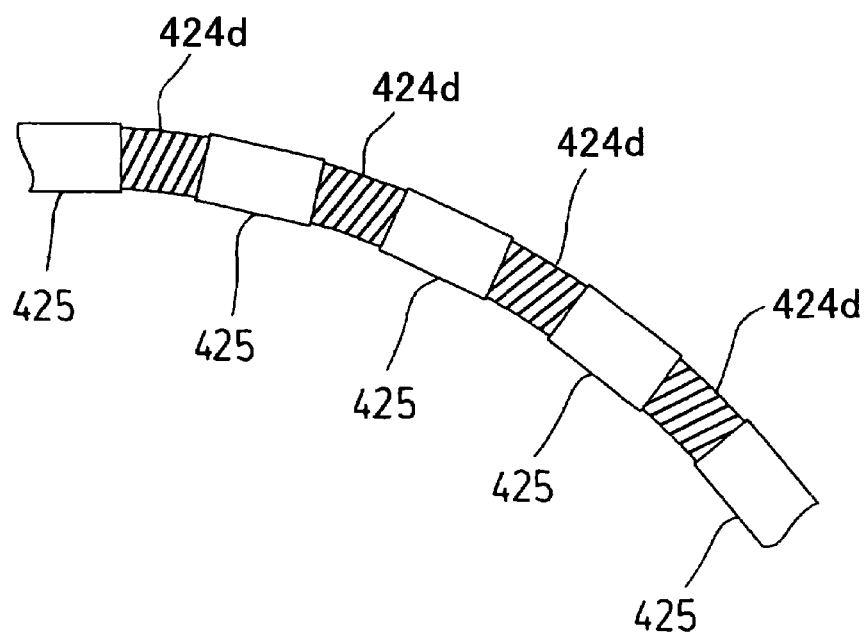
FIG. 44 is a descriptive view showing a roll shade arrangement in another modification of the second embodiment.

Furthermore, the above modification shown in FIGS. 42A to 43 can be further modified in a manner shown in FIG. 44. In FIG. 44, in place of the bellows 424a arranged between the corresponding two center rods 425, an elongated member is coiled to form a coil element 424d. More specifically, a metal circular wire is flattened into a generally flat elongated member through a metal rolling process, and this elongated member is helically wound into a coil. With this construction, the helically wound coil element 424d can be axially resiliently elongated. Thus, similar to the bellows 424a, the coil element 424d, i.e., the joint 424 can be flexed in any circumferential direction. Furthermore, in the coil element 424d, when one end of the coil element 424d is rotated, a circumferential surface of the coil element 424d is radially retracted or extended. Thus, for example, when a limiting member, which limits such radial retraction or extension of the circumferential surface of the coil element 424d, is provided, torsion of the coil element 424d can be limited upon application of a rotational force to the coil element 424d.

In the above joint 424, it is possible to provide multiple layers of the bellows or the coils, which are placed one over the other in the radial direction. With this construction, a desired torsional rigidity, which cannot be achieved with the single layer of the bellows or the coil, can be achieved. Furthermore, in the case where the coils are used to form the joint 424, two coils, which are wound in opposite directions relative to each other, can be stacked one over the other in the radial direction. With this construction, when a rotational force is applied to one ends of the stacked coils, a diameter of one of the two coils is reduced, and a diameter of the other one of the two coils is increased. Thus, relative displacement of the stacked coils is limited, and deformation of the stacked coils is also limited. In this way, the joint 424 will not have a delaying portion, which shows substantial rotational delay upon rotation of the joint 424. Furthermore, the bellows and the coil may be combined together to form the joint.

Furthermore, the joint 424 can be made of a wound tape member, such as a vinyl tape. In such a case, a core material, which can retain its shape or can limit a change in its shape, may be provided, and the tape member may be wound around the core material. Alternatively, the wound tape member alone may be placed between the ends of the joint 424. In this way, the joint 424 can be formed as a flexible member.

Furthermore, in the modifications shown in FIGS. 43 and 44, the short center rods 425, each of which has a relatively short axial length, are connected together, and each flexible joint 424 is placed in the corresponding connection between the adjacent center rods 425. However, it should be understood that the construction of the modification shown in FIG. 36 can be applied to the modifications shown in FIGS. 43 and 44. More specifically, the relatively short center rods 425 and the relatively long center rods 425 may be connected together based on the corresponding curvature, so that the number of components of the rotatable rod 22d may be reduced and may be easily adapted to the curvature of the center rod 22a. Also, in order to facilitate the function of each joint 424 as the articulation, the axial length of each joint 424 is shortened and is made uniform. However, the present invention is not limited to this construction. For example, various types of joints 424, which have different axial lengths, respectively, can be used based on the curvature.

Furthermore, instead of providing the bellows and the coil only in the joint, as in the modifications shown in FIGS. 43 and 44, a predetermined longitudinal portion of the rotatable rod 22d may be made of bellows or a coil. For example, in the case of FIG. 36, each of the ranges R2, R3, R4 can be formed as an elongated member made entirely of bellows or of a coil(s). Furthermore, the entire rotatable rod 22d can be made of bellows or a coil(s). When the elongated member, which is made of the bellows or the coil(s), such bellows or the coil(s) should have a required torsional rigidity, which is required to transmit a required rotational force, and also a required flexural rigidity, which is required to maintain its flexed shape.

The rotatable rod 22d may be modified in the following manner where adjacent center rods 525 are connected to one another through connecting pins 524.

Figure 45A:
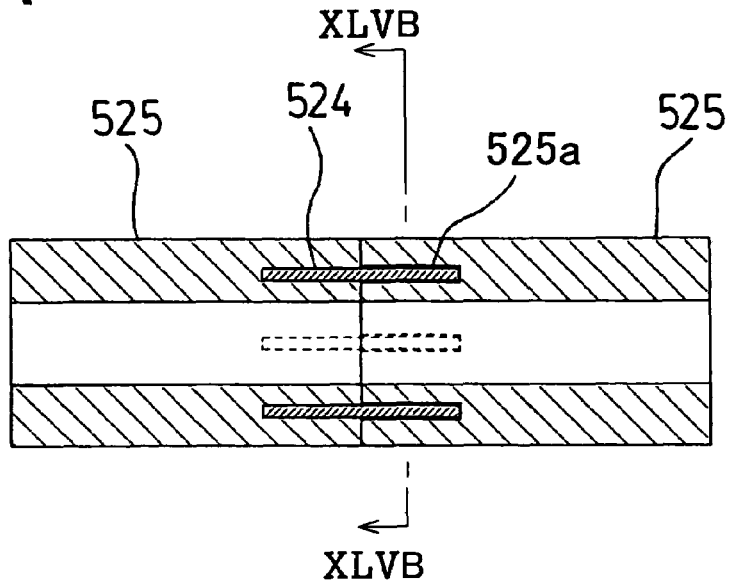
FIG. 45A is a descriptive view showing a roll shade arrangement in another modification of the second embodiment.
Figure 45B:
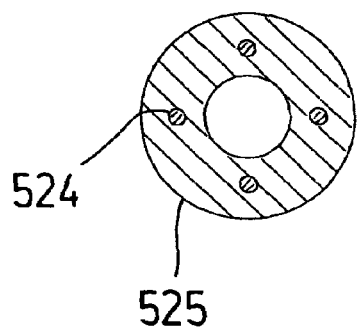
FIG. 45B is a cross sectional view along line XLVB-XLVB in FIG. 45A.

With respect to this modification, FIG. 45A shows a cross section of the connection between the adjacent center rods 525, and FIG. 45B shows a cross section along line XLVB-XLVB in FIG. 45A. As shown in FIGS. 45A and 45B, each cylindrical center rod 525 has a plurality of guide holes 525a at its corresponding longitudinal end. One end of each of the connecting pins 524 is inserted in a corresponding one of the guide holes 525a in such a manner that about one half of the connecting pin 524 is received in the guide hole 525a in a slidable manner.

The guide holes 525a of one of opposed ends of the adjacent center rods 525 are axially opposed to the guide holes 525a of the other one of the opposed ends of the adjacent center rods 525. One end of each of the connecting pins 524 is inserted to and is secured to the corresponding guide hole 525a of the one of the opposed ends of the adjacent center rods 525, and the other end of each of the connecting pins 524 is slidably received in the corresponding guide hole 525a of the other one of the opposed ends of the adjacent center rods 525. Each connecting pin 524 is made of a flexible material, such as a wire material, which is flexible in the flexing direction of the rotatable rod 22d.

Figure 45C:
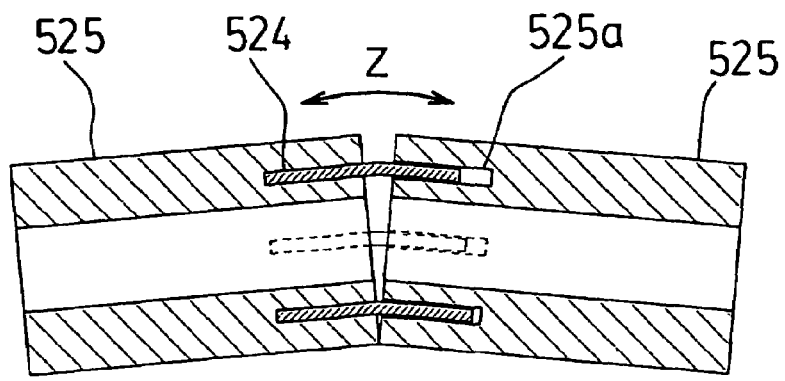
FIG. 45C is a descriptive view of the roll shade arrangement shown in FIGS. 45A and 45B.

With this construction, the adjacent center rods 525 are connected by the connecting pins 524 in a manner that allows relative movement between the adjacent center rods 525 in the longitudinal direction. Furthermore, since each connecting pin 524 has the flexibility in the flexing direction, the connecting pin 524 is flexed in the flexing direction, as shown in FIG. 45C. In this way, the adjacent center rods 525 are flexibly connected by the connecting pins 524. When each connecting pin 524 is formed to flex in the flexing direction in the manner described above, the rotatable rod 22d can be flexed or curved. Furthermore, relative rotation between the adjacent center rods 525 is limited by the shearing strength of the connecting pins 524. Thus, in the case of the rotatable rod, which is formed by connecting the center rods 525, the rotatable rod can follow the curved shape of the center shaft and can be rotated integrally about its axis.

Furthermore, in place of the flexible connecting pins 524, a cushioning material can be provided in an inner peripheral wall surface of each guide hole 525a. When the cushioning material is provided in the inner peripheral wall surface of each corresponding guide hole 525a, the cushioning material can be flexed or deformed by an urging force of the connecting pin 524 to allow flexing of the rotatable rod 22d. At this time, the cushioning material is desirably arranged only in a radial direction of the guide hole 525a rather than in a circumferential direction. With this construction, when the rotatable force is applied to the center rod 525 about the axis of the center rod 525, each connecting pin will press a corresponding surface, which is made of a non-flexible material. Thus, the rotational force is directly transmitted between the adjacent center rods. As a result, the positional deviation between the opposed ends of the rotatable rod can be substantially eliminated at the time of winding the blind sheet 21, 121.

In the above embodiment, the roll shade arrangement 22, 122 includes the center shaft 22a, and the cylindrical rotatable rod 22d is arranged around the center shaft 22a to cover the center shaft 22a. However, the present invention is not limited to this. For example, in an alternative roll shade arrangement 622, as shown in FIG. 46, the center shaft 22a is eliminated, and multiple shaft bodies 625 are connected by couplings, each of which can be flexed and can transmit a rotational force about an axis of the roll shade arrangement 622.

Figure 46:
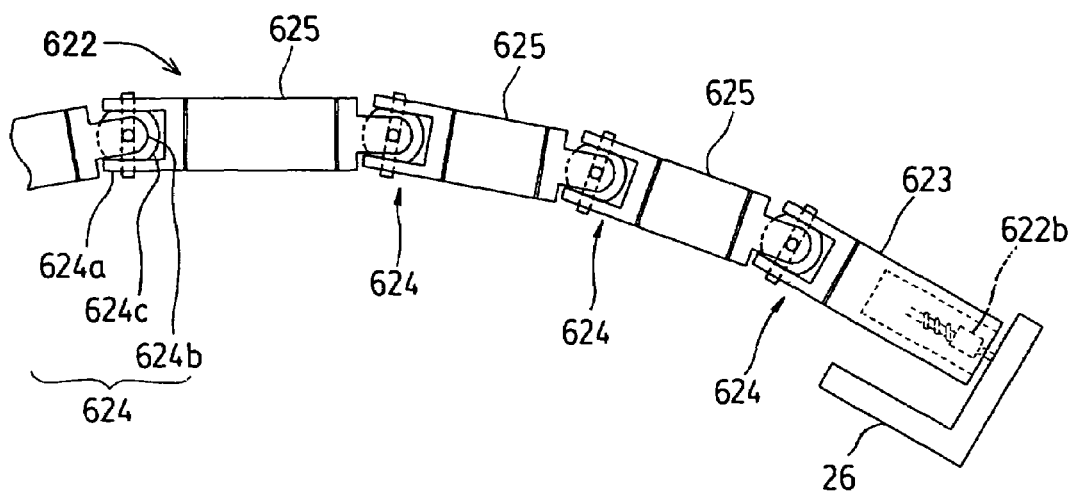
FIG. 46 is a descriptive view showing a roll shade arrangement in another modification of the second embodiment.

In the roll shade arrangement 622 shown in FIG. 46, the multiple shaft bodies 625 are connected together to form an elongated member. Furthermore, each of opposed ends of the roll shade arrangement 622 is connected to one end of a corresponding side rod 623. A base end of the blind sheet 21 is connected to the roll shade arrangement 622.

Furthermore, in this modification, the center shaft is not provided. Thus, the side rods 623, which are connected to the opposed ends of the roll shade arrangement 622, are rotatably supported by the roll shade holders 26, respectively. Here, one end of a coil spring 622b is connected to one of the roll shade holders 26, and the other end of the coil spring 622b is connected to the opposed end of the roll shade arrangement 622. Thus, the roll shade arrangement 622 can receive a rotational force from the coil spring 622b. A roll shade holder 26 side end of the adjacent side rod 623, which is adjacent to the coil spring 622b, is formed as a hollow end, and the coil spring 622b is arranged in the hollow end of the side rod 623.

Next, the couplings 624, each of which connects between corresponding adjacent two shaft bodies 625 of this modification, will be described. Each shaft body 625 is formed into a generally cylindrical body. Furthermore, each coupling 624 includes shaft supporting portions 624a, 624b and a rotatable member 624c. The rotatable member 624c includes two shafts, which are perpendicular to one another. Opposed ends of one of the two shafts of the rotatable member 624c are rotatably connected to the shaft supporting portion 624a, and opposed ends of the other one of the two shafts of the rotatable member 624c are rotatably connected to the shaft supporting portion 624b. Each of the shaft supporting portions 624a, 624b is secured to an end of the corresponding shaft member 625.

With this arrangement, each of the shaft supporting portions 624a, 624b is rotatable about a corresponding one of the two shafts of the rotatable member 624c, which are perpendicular to one another. Thus, the shaft bodies 625, which are connected to the shaft supporting portions 624a, 624b, respectively, can flex relative to one another about the rotatable member 624c. Furthermore, each shaft body 625 does not rotate about its axis relative to the adjacent shaft body 625. That is, the coupling 624, which includes the shaft supporting portions 624a, 624b and the rotatable member 624c, constitutes a universal coupling.

The universal coupling, which connects between the adjacent shaft bodies 625, is not limited to the above configuration. For example, the universal coupling can be a ball joint, in which a spherical rotatable member slidably contacts a spherical inner surface of the corresponding shaft supporting portion. Furthermore, in this modification, each shaft body 625 has a predetermined rigidity and can be made of a rigid material, such as synthetic resin or metal.

With this construction, the roll shade arrangement 622 is formed to flex at each corresponding coupling 624, so that the roll shade arrangement 622 can be curved in conformity with the shape of the edge of the window W. Furthermore, the relative rotation between the adjacent shaft bodies 625 about the axis is limited. Thus, the connected shaft bodies 625 can rotate integrally. In this way, the roll shade arrangement 622 can smoothly wind the blind sheet 21 without generating a delaying portion, which shows substantial rotational delay upon rotation of the roll shade arrangement 622.

In this modification, similar to the above modifications, relatively short shaft bodies 625 and relatively long shaft bodies 625 can be combined in an appropriate manner based on the corresponding curvature of the window W, so that the number of components of the roll shade arrangement can be reduced, and the roll shade arrangement can be easily adapted to the curvature of the window W. More specifically, in a region where the curvature of the window W is relatively small, the relatively long shaft body 625 can be used. Furthermore, in a region where the curvature of the window W is relatively large, the relatively short shaft body 625 can be used.

Furthermore, in the case where the center shaft is eliminated, the following construction can be used in place of the universal coupling. For example, one end of a resilient member, such as a rubber element or a coil spring which has a predetermined torsional rigidity, can be non-rotatably secured to the corresponding end of the shaft body 625, and the other end of the resilient member can be non-rotatably secured to the adjacent end of the next shaft body 625. With this construction, the roll shade arrangement 622 can be flexed and can transmit the rotational force. As a result, the roll shade arrangement 622 can rotate integrally to smoothly wind the blind sheet 21, 121.

In the second embodiment, the drive arrangement 110 is arranged between the door trim 104 and the door panel 102. However, the present invention is not limited to this. For example, one end of the roll shade arrangement 122 can be made hollow, and the drive arrangement 110 can be received in the hollow end of the roll shade arrangement 122. In the second embodiment, for example, when the drive arrangement 110 is arranged in the rear end of the roll shade arrangement 122, the pulley 133 can be arranged in an appropriate location to extend the wire 132 along the rear frame 103c beyond the lower end of the guide rail 131, and the wire can be redirected by pulley(s) to allow pulling of the slider 135 in the downward direction. Further alternatively, the drive arrangement 110 can be arranged in the front end of the roll shade arrangement 122.

In the second embodiment, the drive arrangement 110 and the guide arrangement 130 may be formed integrally as a module. In this way, the assembly of the drive arrangement 110 and the guide arrangement 130 into the door can be advantageously eased. Furthermore, the roll shade mechanism 120 can be formed integrally with the drive arrangement 110 and the guide arrangement 130 as a module.

In the second embodiment, the slider 135 is provided in the free end of the blind sheet 121 such that the slider 135 is guided along the corresponding guide rail 131 in the vertical direction to extend and retract the blind sheet 121. However, the present invention is not limited to this. For example, a wire may be directly connected to the right side of the free end of the blind sheet 121, and the wire may be reeled around a corresponding reel by the drive arrangement to move the blind sheet 121 in the vertical direction.

Figure 47:
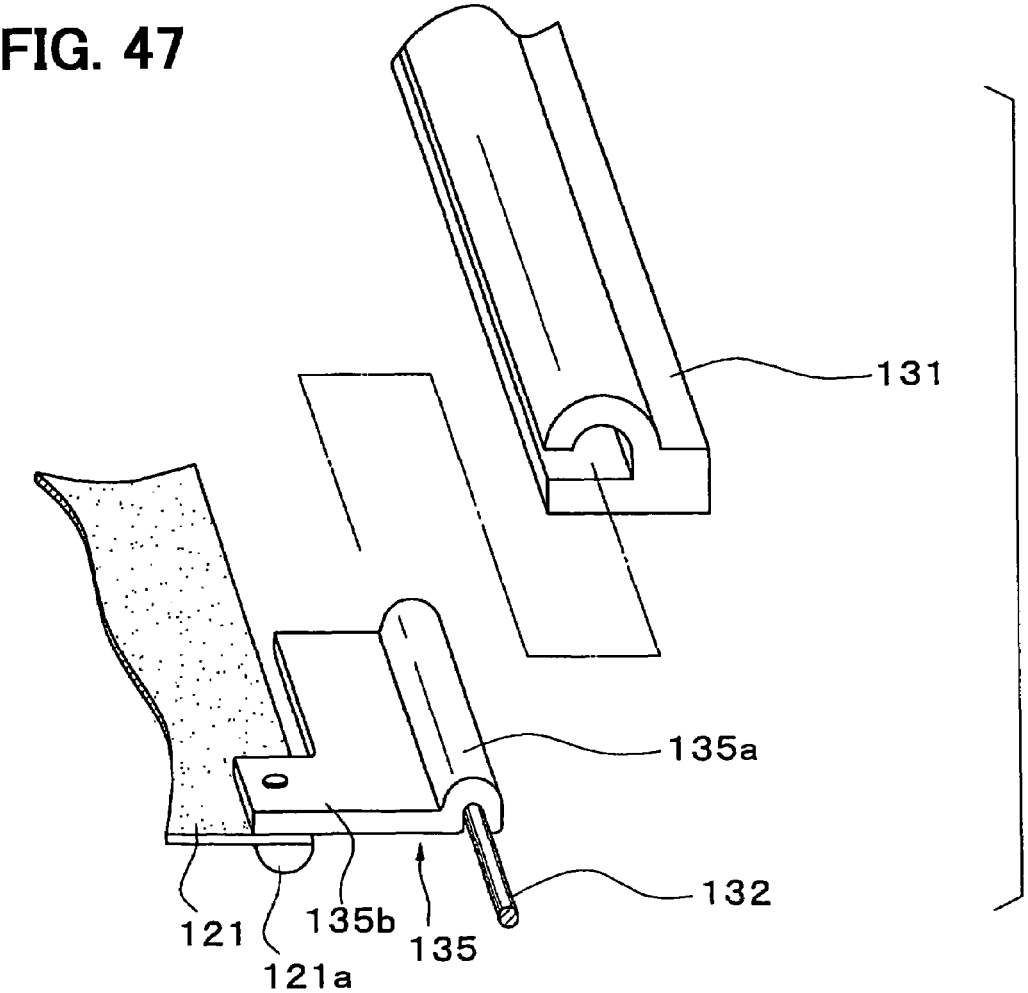
FIG. 47 is a perspective view of a slider in a modification of the second embodiment.
Figure 48:
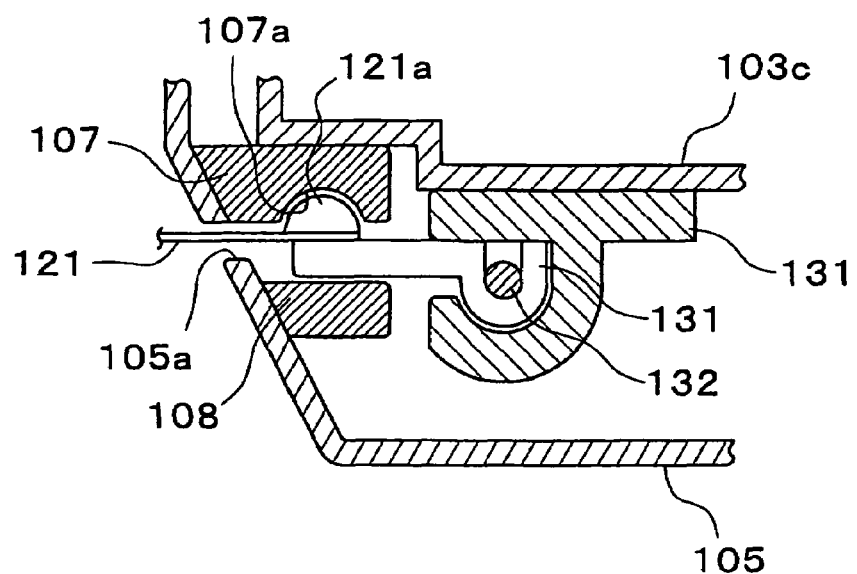
FIG. 48 is a descriptive cross sectional view showing a structure around a guide rail of the modification of FIG. 47.

Furthermore, the structure shown in FIG. 28 can be modified into a structure shown in FIGS. 47 and 48. In FIGS. 47 and 48, the blind sheet 121 is stretchable and is provided with a sheet-side engaging portion 121a. The sheet-side engaging portion 121a of this modification is provided along the lateral side of the blind sheet 121, which is located along the rear frame 103c. Also, in this modification, the sheet-side engaging portion 121a may be intermittently provided along the lateral side of the blind sheet 121.

In this case, similar to the modification of the first embodiment, a guide member 107 and a guide member 108 are provided in opposed relationship to each other along the slit 105a between the trim member 105 and the rear frame 103c at the rear end side of the window glass 106. A guide groove 107a is formed in the guide member 107 to engage with the sheet-side engaging portion 121a. When the blind sheet 121 is extended or is retracted, the sheet-side engaging portion 121a is held between the guide member 107 and the guide member 108 and is guided in the vertical direction while the movement of the sheet-side engaging portion 121a in the width direction of the blind sheet 121 is limited by the guide groove 107a.

In FIG. 47, the sheet-side engaging portion 121a is formed in the outer surface of the blind sheet 121, which is faced to the outside of the vehicle. However, the present invention is not limited to this. For example, the sheet-side engaging portion 121a can be provided to the inner surface of the blind sheet 121, which is faced to the inside of the occupant compartment, or can be provided to each of the outer surface and the inner surface of the blind sheet 121. In such a case, the corresponding guide member(s) 107, which has the guide groove 107a to engage with the sheet-side engaging portion(s) 121a, should be provided.

Furthermore, in the case of FIG. 47, the cross section of the sheet-side engaging portion 121a has a semi-circular shape. However, the present invention is not limited to this. For example, the cross section of the sheet-side engaging portion 121a can have a rectangular cross section or a triangular cross section, like ones shown in FIGS. 25A-25C.

Other modifications, which limit shrinkage of the blind sheet in the width direction of the blind sheet 121 at the time of extending the blind sheet to cover generally the entire window, will be described with reference to FIGS. 49 to 59.

The following modifications will be described with reference to the front window W of the first embodiment. However, it should be understood that these modifications are also equally applicable to the rear window or the side window of the second embodiment.

Figure 50:
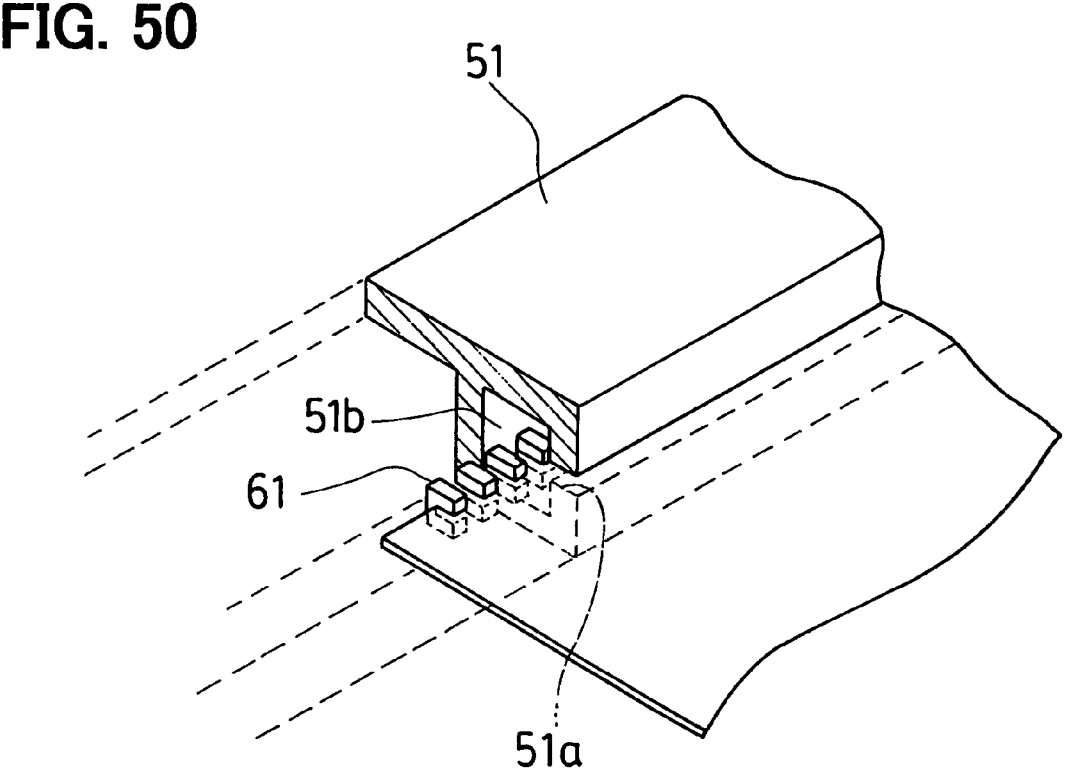
FIG. 50 is an enlarged descriptive view showing a portion of FIG. 49.
Figure 51:
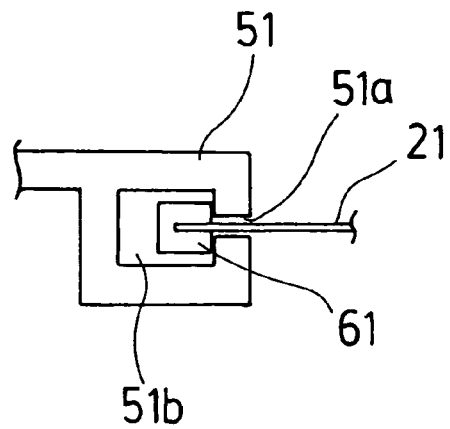
FIG. 51 is another descriptive view showing the structure around the lateral side of the blind sheet of FIG. 49.

First, one of the modifications will be described with reference to FIGS. 49 to 51. In this modification, a plurality of protruding bodies (sheet-side engaging portions) 61 is arranged along each of the lateral sides of the blind sheet 21. The protruding bodies 61, which are arranged at each side of the blind sheet 121, are slidably supported by a corresponding guide rail (a vehicle body side engaging portion) 51.

In the present modification, the guide rails 51, which are used to maintain the shape of the blind sheet 21, are arranged parallel to the guide rails 31a, 31b, which are used to slidably guide the sliders 35. Each guide rail 51 has generally the same length as that of each guide rail 31a, 31b, so that upper and lower ends of the guide rail 51 are located at generally the same heights as those of the guide rail 31a, 31b. Each guide rail 51 can be formed integrally with the corresponding guide rail 31a, 31b, if desired.

Figure 49:
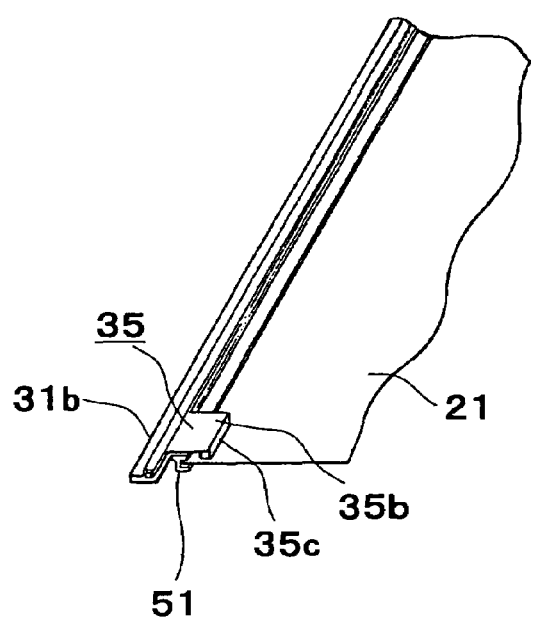
FIG. 49 is a descriptive view showing a structure around a lateral side of a blind sheet in a modification of the first embodiment or the second embodiment.

Furthermore, in the present modification, as shown in FIG. 49, an extension 35c extends from the shaft connecting portion 35b of each slider 35 in a direction perpendicular to the extending direction of the blind sheet 21. A distal end of the extension 35c of each slider 35 is connected to a corresponding portion of the free end of the blind sheet 21, which is slightly spaced away from the corresponding lateral side of the free end of the blind sheet 21 toward the widthwise center of the blind sheet 21.

Also, in the modification shown in FIG. 49, the blind sheet 21 is connected to the sliders 35. However, the present invention is not limited to this. For example, the blind sheet 21 can be alternatively connected to the slide shafts 28.

Each guide rail 51 is a member, which has a generally U-shaped cross section. Furthermore, each guide rail 51 has a sliding space 51b, in which the protruding bodies 61 are slid in the guide rail 51. Also, each guide rail 51 has a slit 51a, which is provided on an occupant compartment side of the guide rail 51 and is communicated with the sliding space 51b.

The protruding bodies 61 are arranged at predetermined intervals along the corresponding lateral side of the blind sheet 21 in such a manner that the protruding bodies 61 engage generally with the entire length of the corresponding guide rail 51 when the blind sheet 21 is placed in the fully extended position. Since the protruding bodies 61 are spaced from one another along the corresponding lateral side of the blind sheet 21, the entire blind sheet 21 retains the flexibility to allow winding of the blind sheet 21 around the roll shade arrangement 22.

Each protruding body 61 is formed as a rectangular body and has a groove at one side of the protruding body 61. The corresponding lateral side of the blind sheet 21 is inserted in the groove of each corresponding protruding body 61 and is securely clamped by the protruding body 61.

A protruding length of each protruding body 61 from each of the upper and lower surfaces of the blind sheet 21 in a direction perpendicular to the upper and lower surfaces of the blind sheet 21 is set to be greater than an opening width of the corresponding slit 51a measured in the direction perpendicular to the upper and lower surfaces of the blind sheet 21. Thus, removal of the protruding bodies 61 through the corresponding slit 51a is prevented, and the protruding bodies 61 are slidable in the longitudinal direction of the corresponding guide rail 51 while the protruding bodies 61 are retained in the sliding space 51b of the corresponding guide rail 51.

In the present modification, the protruding bodies 61 are directly secured to the corresponding lateral side of the blind sheet 21. However, the present invention is not limited to this. For example, the protruding bodies 61 can be secured to a separate flexible member, which is prepared separately from the blind sheet 21 and is connected to a corresponding one of the lateral sides of the blind sheet 21.

Also, in the present modification, the protruding bodies 61 are arranged at the predetermined intervals. However, the present invention is not limited to this. For example, the intervals of the protruding bodies 61 may be changed to have different intervals based on the stretching amount of the blind sheet 21 in the width direction measured at the time of placing the blind sheet 21 in the shading position, i.e., the fully extended position. For instance, since the lower end of the front window W is wider than the upper end of the front window W, the stretching amount of the lower end of the blind sheet 21 in the width direction is greater than the stretching amount of the upper end of the blind sheet 21 in the width direction. Therefore, the intervals of the protruding bodies 61 at the lower end of the blind sheet 21 can be made smaller in comparison to the intervals of the protruding bodies 61 at the upper end of the blind sheet 21.

By setting the intervals of the protruding bodies 61 according to the stretching amount of the blind sheet 21 in the width direction in the manner described above, each lateral side of the blind sheet 21 can be advantageously held along the corresponding guide rail 51. Furthermore, each protruding body 61 can be engaged with the corresponding guide rail 51 at an appropriate tension to allow smooth extending movement and retracting movement of the blind sheet 21.

In the present modification, distal ones of the protruding bodies 61, which are located at the free end of the blind sheet 21, are left in the corresponding sliding space 51b in the fully retracted position of the blind sheet 21. When the drive arrangement 10 is operated to extend the blind sheet 21 from the fully retracted position, the other protruding bodies 61 are guided into the corresponding sliding space 51 one after another. A guide mechanism, which smoothly guides the protruding bodies 61 into the corresponding sliding space 51b, may be provided, if desired. For example, the guide mechanism can be a member, which has a progressively increasing opening size that increases in the longitudinal direction from the upper end of the corresponding guide rail 51.

When the blind sheet 21 is extended in the above described manner, the protruding bodies 61, which are provided to the lateral sides of the blind sheet 21, slide along the respective guide rails 51. Thus, due to the engagement between the protruding bodies 61 and the corresponding guide rail 51, the shrinkage of the blind sheet 21 in the width direction can be advantageously limited. Therefore, the entire area of the window W can be generally covered with the blind sheet 21.

Furthermore, although not described in detail in this specification, the protruding bodies 61 and the guide rails 51 can be provided to the guide arrangement 130 of the door 101.

Figure 52:
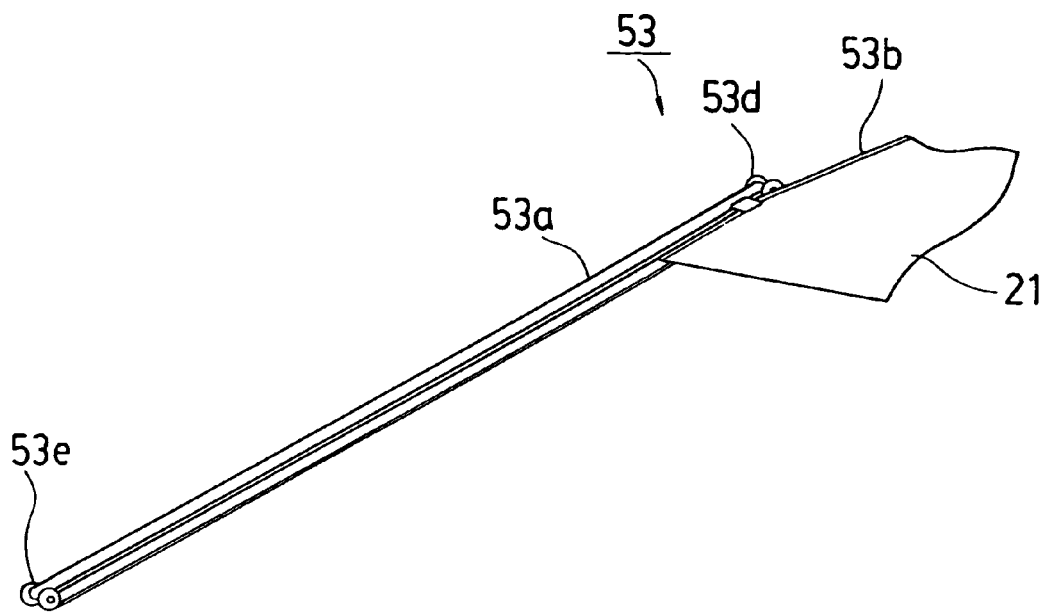
FIG. 52 is a descriptive view showing a structure around a lateral side of a blind sheet in another modification of the first embodiment or the second embodiment.
Figure 53:
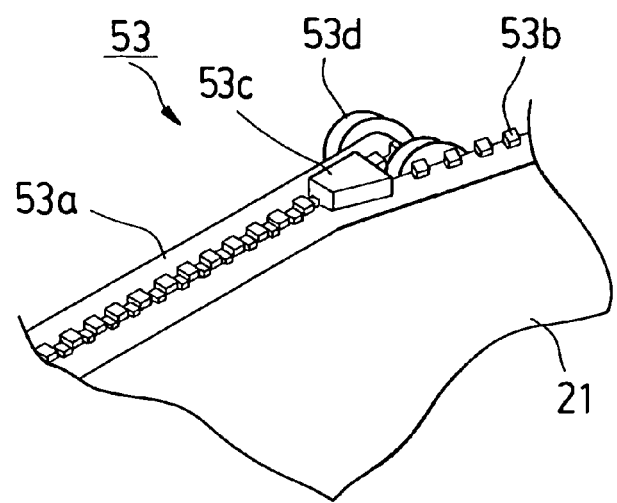
FIG. 53 is an enlarged descriptive view showing a portion of FIG. 52.

Next, another one of the modifications will be described with reference to FIGS. 52 and 53. In the previous modification, the protruding bodies 61 and the guide rails 51 are provided. Alternatively, in the present modification, at each of the lateral sides of the blind sheet 21, a slide fastener (zip fastener) 53 is provided between the blind sheet 21 side and a vehicle body side, as shown in FIG. 52.

Each slide fastener 53 includes pulleys 53d, 53e, an endless fastener element (vehicle body side engaging portion) 53a, a fastener element (sheet-side engaging portion) 53b and a sliding piece 53c. The pulleys 53d, 53e are secured to the corresponding front pillar 3 at the upper and lower ends, respectively, of the corresponding guide rail 31a, 31b (not shown). The endless fastener element 53a is placed over both the pulleys 53d, 53e. The fastener element 53a is provided along a corresponding one of the lateral sides of the blind sheet 21 and is engaged with the endless fastener element 53a. The sliding piece 53c is secured to the corresponding front pillar 3 near the pulley 53d.

The endless fastener 53a is generally parallel to the corresponding guide rail 31a, 31b and is placed around the pulleys 53d, 53e. The sliding piece 53c is used to mesh and to join the fastener elements 53a, 53d together.

The fastener element 53b is flexible, so that the fastener element 53b can be wound around the roll shade arrangement 22. Also, a predetermined length of the fastener element 53b, which is located on the free end side of the blind sheet 21, is meshed with the fastener element 53a when the blind sheet 21 is in the fully retracted state.

In the present modification, when the drive arrangement 10 is operated to extend the blind sheet 21 from the fully retracted position, the fastener element 53b is moved downward along the corresponding guide rail 31a, 31b. When the fastener element 53b is moved downward, the meshed portion of the endless fastener element 53a, which is meshed with the fastener element 53b, is pulled by the fastener element 53b and is thus moved downward. Thus, the endless fastener element 53a is turned around the pulleys 53d, 53e while being supported by the pulleys 53d, 53e. At this time, the fastener elements 53a, 53b are sequentially meshed together by the sliding piece 53c.

As discussed above, when the blind sheet 21 is moved toward its fully extended position, the fastener element 53b, which is arranged along the corresponding lateral side of the blind sheet 21, is sequentially meshed with the vehicle body side fastener element 53a. Thus, the shrinkage of the blind sheet 21 in the width direction can be advantageously limited. Therefore, the entire area of the window W can be generally covered with the blind sheet 21.

Furthermore, although not described in detail in this specification, the slide fasteners 53 of the above modification can be provided to the guide arrangement 130 of the door 101.

Next, another one of the modifications will be described with reference to FIG. 54. In the above modification, which is described with reference to FIGS. 49 to 51, the protruding bodies 61 and the guide rails 51 are provided. In the present modification, in place of the protruding bodies 61 and the guide rails 51, connecting bodies (sheet-side engaging portions) 65 and a guide rail (vehicle body side engaging portion) 55 are provided at each of the lateral sides of the blind sheet 21, as shown in FIG. 54.

In the present modification, each guide rail 55, along which the connecting bodies 65 are slid, is arranged parallel to the corresponding guide rail 31a, 31b, along which the corresponding slider 35 is slid. Each guide rail 55 has generally the same length as that of each guide rail 31a, 31b, so that upper and lower ends of the guide rail 55 are located at generally the same heights as those of the guide rail 31a, 31b. Each guide rail 51 can be formed integrally with the corresponding guide rail 31a, 31b, if desired.

Figure 54:
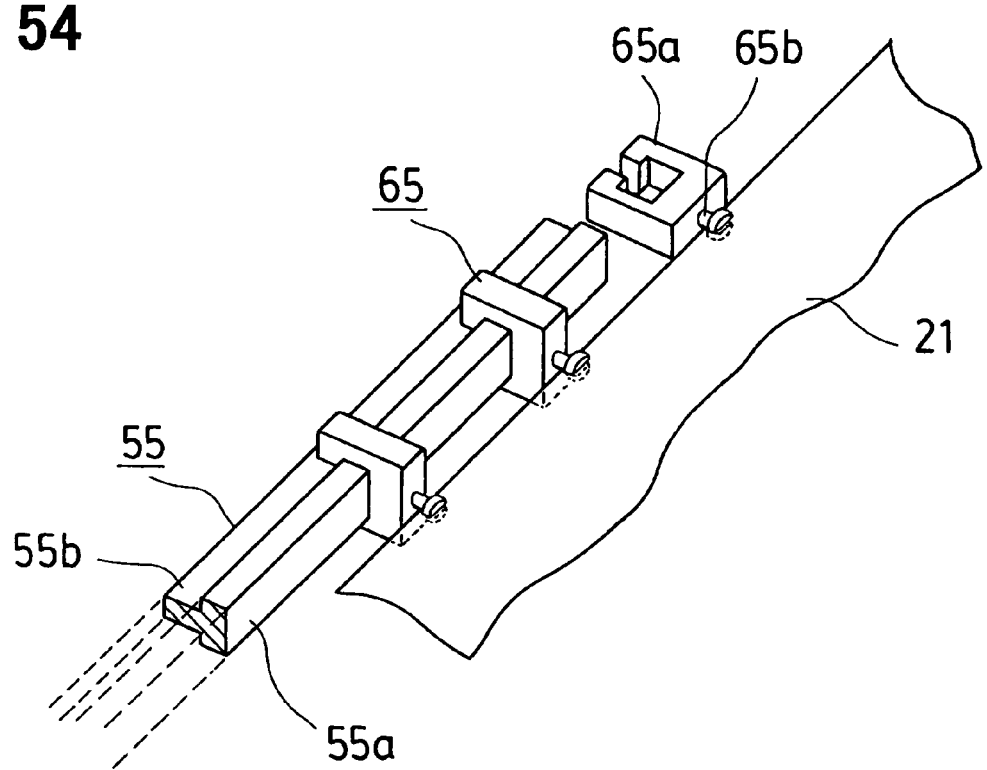
FIG. 54 is a descriptive view showing a structure around a lateral side of a blind sheet in another modification of the first embodiment or the second embodiment.

Furthermore, as shown in FIG. 54, each guide rail 55 is formed as a member that has a T-shaped cross section. The guide rail 55 has a rail portion 55a and a rail support 55b. The rail portion 55a has a rectangular cross section, and the rail support 55b extends laterally outwardly from an intermediate point of the rail portion 55a, which is intermediate in a height direction of the rail portion 55a.

Each connecting body 65 of the present modification includes a sliding portion 65a and a shaft 65b. The sliding portion 65a includes a through hole, which has a generally T-shaped cross section to receive the rail portion 55a. When the rail portion 55a is received in the through hole of the sliding portion 65a, the sliding portion 65a is slidably held by the corresponding guide rail 55.

A base end of the shaft 65b is secured to the corresponding lateral side of the blind sheet 21, and a distal end of the shaft 65b extends laterally outwardly in the width direction of the blind sheet 21. The sliding portion 65a is rotatably connected to the distal end of the shaft 65b.

The connecting bodies 65 are arranged at predetermined intervals along the corresponding lateral side of the blind sheet 21 in such a manner that the connecting bodies 65 engage generally with the entire length of the corresponding guide rail 51 when the blind sheet 21 is placed in the fully extended position. Since the connecting bodies 65 are spaced from one another along the corresponding lateral side of the blind sheet 21, the entire blind sheet 21 retains the flexibility to allow winding of the blind sheet 21 around the roll shade arrangement 22. That is, when the roll shade arrangement 22 is rotated in the winding direction, the connecting bodies 65 are wound around the roll shade arrangement 22 in such a manner that a lateral surface of each connecting body 65, in which the through hole is formed, contacts the outer peripheral surface of the roll shade arrangement 22.

In the present modification, the connecting bodies 65 are arranged at the predetermined intervals. However, the present invention is not limited to this. For example, the intervals of the connecting bodies 65 may be changed to have different intervals based on the stretching amount of the blind sheet 21 in the width direction measured at the time of placing the blind sheet 21 in the shading position, as described with reference to the modification shown in FIGS. 49 to 51.

Furthermore, it is possible to provide a guide mechanism, which guides the connecting bodies 65 to the corresponding guide rail 55 when the roll shade arrangement 22 is rotated in the normal direction to extend the blind sheet 21 toward the fully extended position. The guide mechanism may include, for example, a magnet, which is arranged at the top end of the guide rail 55, and a plurality of magnets, which are connected to the connecting bodies 65, respectively. In this way, when the connecting body 65 approaches the upper end of the guide rail 55, the orientation of the connecting body 65 can be changed by a magnetic attractive force generated between the magnet of the connecting body 65 and the magnet provided at the upper end of the guide rail 55. By changing the orientation of the connecting body 65 through use of the magnetic attractive force, the connecting body 65 is correctly oriented with respect to the upper end of the guide rail 55. Thus, the guide rail 55 can be received in the through hole of the connecting body 65 in this state. Alternatively, the guide mechanism may include any other appropriate mechanical arrangement.

In the present modification, when the drive arrangement 10 is operated to extend the blind sheet 21 from the fully retracted position, the connecting bodies 65 are guided and are slid along the guide rail 55. Thus, due to the engagement between the connecting bodies 65 and the corresponding guide rail 55, the shrinkage of the blind sheet 21 in the width direction can be advantageously limited. Therefore, the entire area of the window W can be generally covered with the blind sheet 21.

Furthermore, although not described in detail in this specification, the connecting bodies 65 and the guide rails 55 can be provided to the guide arrangement 130 of the door 101.

Figure 55:
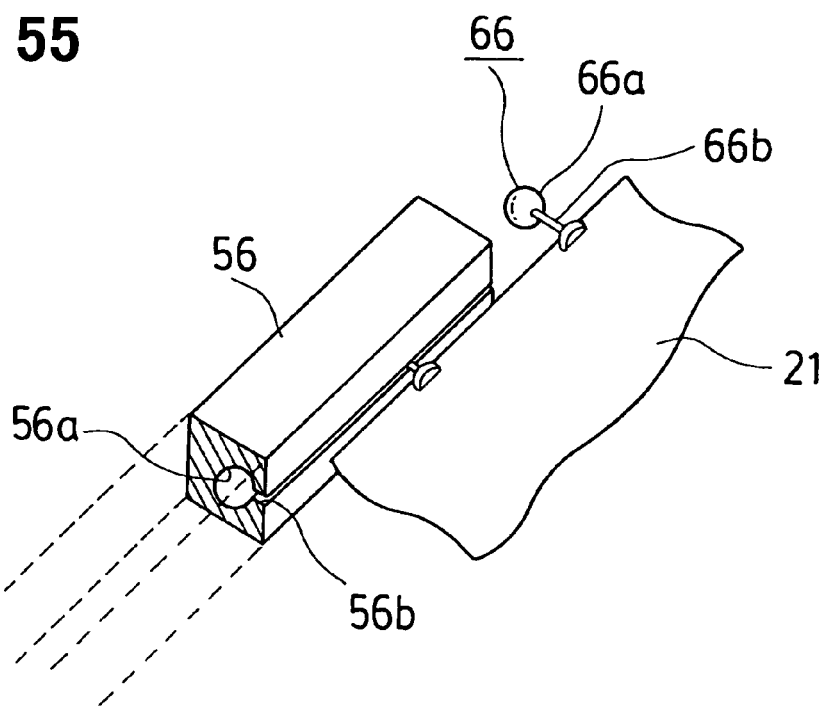
FIG. 55 is a descriptive view showing a structure around a lateral side of a blind sheet in another modification of the first embodiment or the second embodiment.

Furthermore, in place of the connecting bodies 65 and the guide rails 55, connecting bodies 66 and guide rails 56 shown in FIG. 55 may be used. Each connecting body 66 of FIG. 55 includes a spherical sliding portion 66a and a shaft 66b. The shaft 66b supports the sliding portion 66a to the lateral side of the blind sheet 21. Each guide rail 56 includes a sliding hole 56a and a slit 56b. The sliding hole 56a slidably holds the sliding portion 66a of each corresponding connecting body 66. The slit 56b is communicated with the sliding hole 56a. Furthermore, the slit 56b is formed in a corresponding lateral surface of the guide rail 56, which is opposed to the blind sheet 21. When the sliding portion 66a of each corresponding connecting body 66 slides in the sliding hole 56a of the guide rail 56, the shaft 66b of the connecting body 66 moves along the slit 56b of the guide rail 56.

When the blind sheet 21 is extended toward the fully extended position, the sliding portion 66a of each corresponding connecting body 66 is guided along the sliding hole 56a. Thus, due to the engagement between the connecting bodies 66 and the corresponding guide rail 56, the shrinkage of the blind sheet 21 in the width direction can be advantageously limited. Therefore, the entire area of the window W can be generally covered with the blind sheet 21.

Furthermore, although not described in detail in this specification, the connecting bodies 66 and the guide rails 56 can be provided to the guide arrangement 130 of the door 101.

Figure 56:
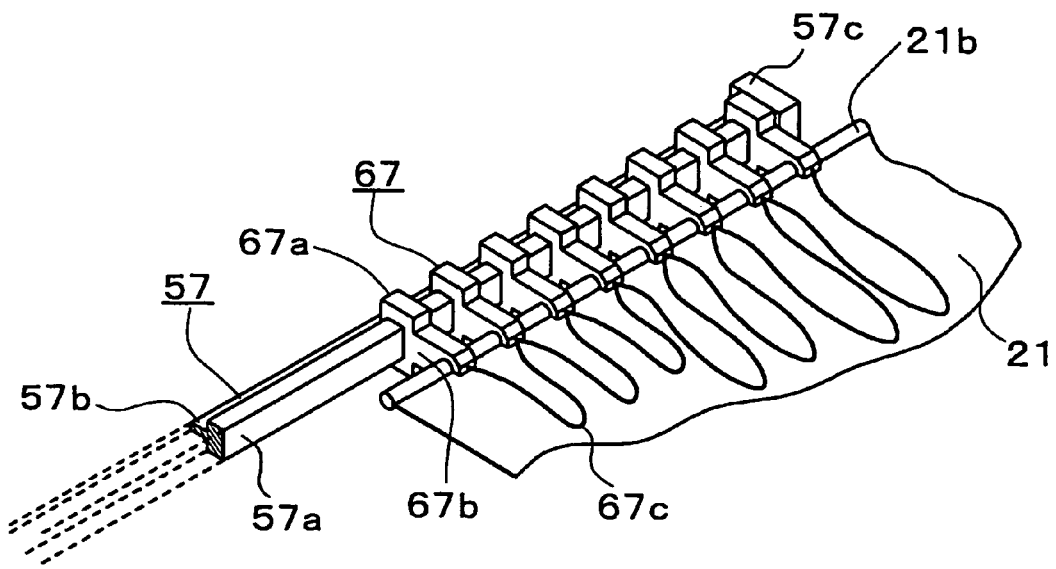
FIG. 56 is a descriptive view showing a structure around a lateral side of a blind sheet in another modification of the first embodiment or the second embodiment.
Figure 57:
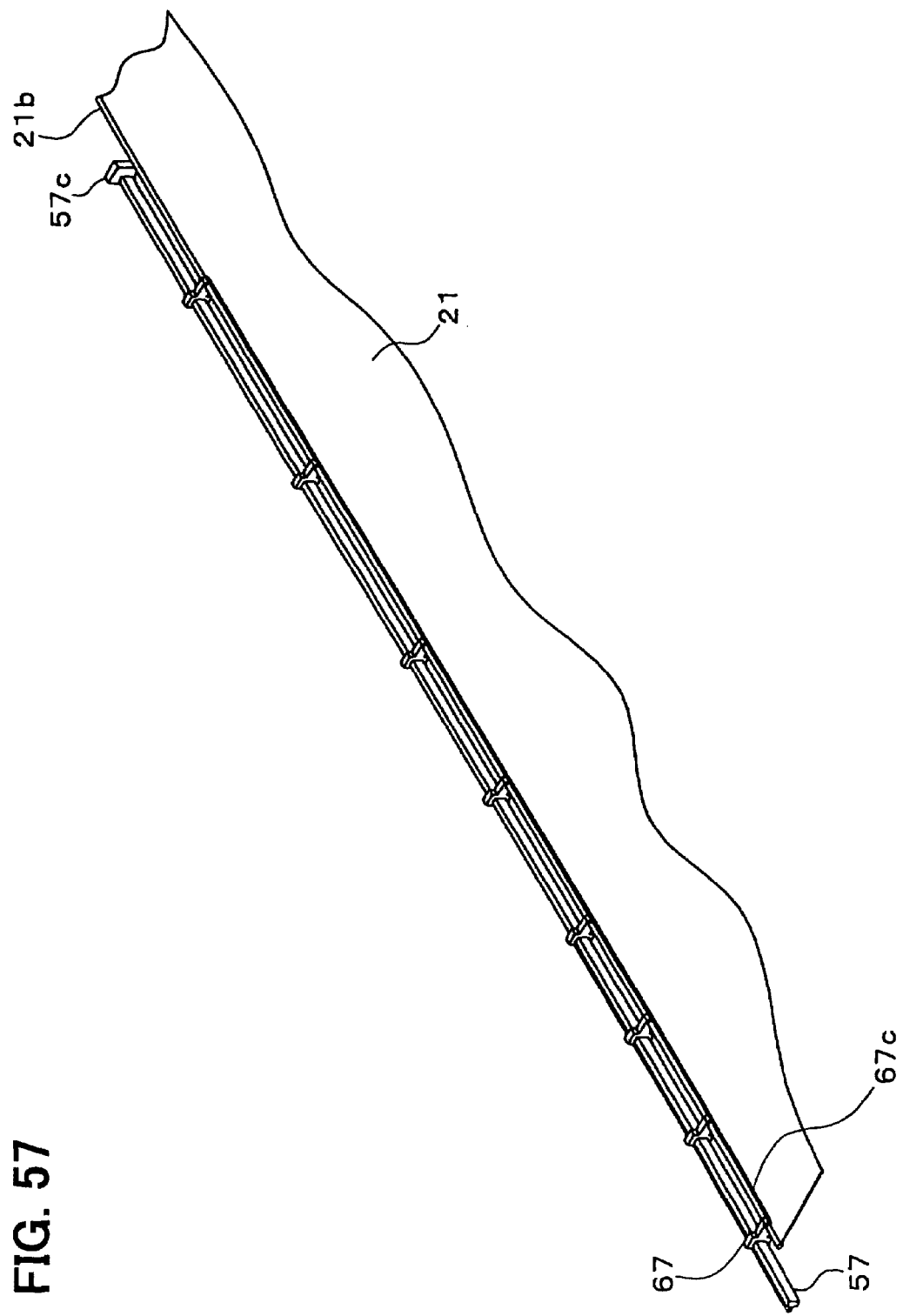
FIG. 57 is a descriptive view showing a fully extended state of the blind sheet of FIG. 56.

Next, another one of the modifications will be described with reference to FIGS. 56 and 57. In the modification described with reference to FIGS. 49 to 51, the protruding bodies 61 and the guide rails 51 are provided. Alternatively, in the present modification, as shown in FIGS. 56 and 57, connecting bodies (sheet-side engaging portions) 67 and guide rails 57 are provided. The connecting bodies 67 can slide along a corresponding one of the lateral sides of the blind sheet 21.

Similar to the guide rail 55 of FIG. 54, each guide rail 57 of the present modification includes a rail portion 57a and a rail support 57b. Furthermore, a stopper 57c is provided at the upper end of the guide rail 57 to prevent removal of the connecting bodies 67 from the guide rail 57.

Each connecting body 67 includes a rail-side sliding portion 67a and a sheet-side sliding portion 67b. The rail-side sliding portion 67a slides along the rail portion 57a, and the sheet-side sliding portion 67b supports the rail-side sliding portion 67a to the corresponding lateral side of the blind sheet 21. Each adjacent two rail-side sliding portions 67a are connected to one another through a corresponding connecting member 67c.

A flexible linear rail member 21b is connected to each lateral side of the blind sheet 21. The sheet-side sliding portion 67b of each corresponding connecting body 67 is slidably installed to the corresponding rail member 21b. However, the sheet-side sliding portion 67b of the lowest connecting body 67, which is closest to the free end of the blind sheet 21 is non-slidably secured to the rail member 21b. The rail member 21b has flexibility, so that the rail member 21b can be wound around the roll shade arrangement 22 together with the blind sheet 21.

Each connecting member 67c connects between the corresponding adjacent two connecting bodies 67 in a manner that allows separation and contact of the corresponding two connecting bodies 67 in the extending direction of the blind sheet 21. In the present modification, a wire is used as the connecting member 67c. Opposed ends of the connecting member 67c are connected to the sheet-side sliding portions 67b of the corresponding two connecting bodies 67, respectively. At the time of retracting the blind sheet 21, each connecting member 67c does not interfere with the approaching movement of the corresponding two connecting bodies 67 toward each other until the connecting bodies 67 engage with each other. However, at the time of extending the blind sheet 21, each connecting member 67c limits a space between the corresponding two connecting bodies 67 when the connecting member 67c is fully extended. In the present modification, the connecting members 67c have different lengths depending on the stretching amount of the blind sheet 21 in the width direction measured at the time of placing the blind sheet 21 in the shading position. More specifically, the length of the connecting member 67c, which connects between the connecting bodies 67 located at the free end side of the blind sheet 21, is shorter than the length of the connecting member 67c, which connects between the connecting bodies 67 located at the roll shade arrangement 22 side of the blind sheet 21.

In the present modification, when the blind sheet 21 is placed in the fully retracted position, the connecting bodies 67 are aligned at the upper end side of the guide rail 57 in close proximity to one another. When the drive arrangement 10 is operated to extend the blind sheet 21 from the fully retracted position toward the fully extended position, the lowest connecting body 67, which is secured to the rail member 21b and is closest to the free end of the blind sheet 21, is pulled by the blind sheet 21 and thus is slid downward along the guide rail 57. The other connecting bodies 67 are kept still for a while on the guide rail 57, and the sheet-side sliding portions 67b of the other connecting bodies 67 slid along the rail member 21b.

When the lowest connecting body 67 is slid downward a predetermined distance, the connecting member 67c, which is connected to the lowest connecting body 67, is fully extended. Thus, the second lowest connecting body 67, which is located next to the lowest connecting body 67 on the upper end side of the blind sheet 21, is also pulled downward by the connecting member 67c, which is connected to the lowest connecting body 67. In this way, the other connecting bodies 67 are sequentially pulled downward.

When the blind sheet 21 is extended in the above described manner, the connecting bodies 67 are spread to engage substantially the entire guide rail 57 in the shading position, as shown in FIG. 57. At the time of extending the blind sheet 21, the connecting bodies 67 installed to the lateral side of the blind sheet 21 are slid along the guide rail 57. Thus, due to the engagement between the connecting bodies 67 and the corresponding guide rail 57, the shrinkage of the blind sheet 21 in the width direction can be advantageously limited. Therefore, as shown in FIG. 57, the entire area of the window W can be generally covered with the blind sheet 21 in the shading position.

Furthermore, although not described in detail in this specification, the connecting bodies 67 and the guide rails 57 can be provided to the guide arrangement 130 of the door 101.

Figure 58:
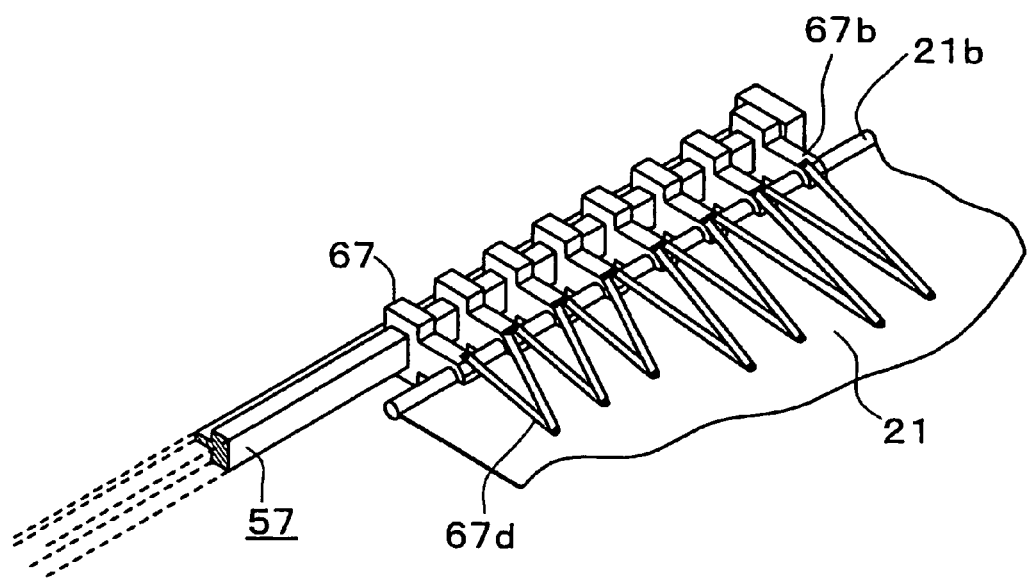
FIG. 58 is a descriptive view showing a structure around a lateral side of a blind sheet in another modification of the first embodiment or the second embodiment.
Figure 59:
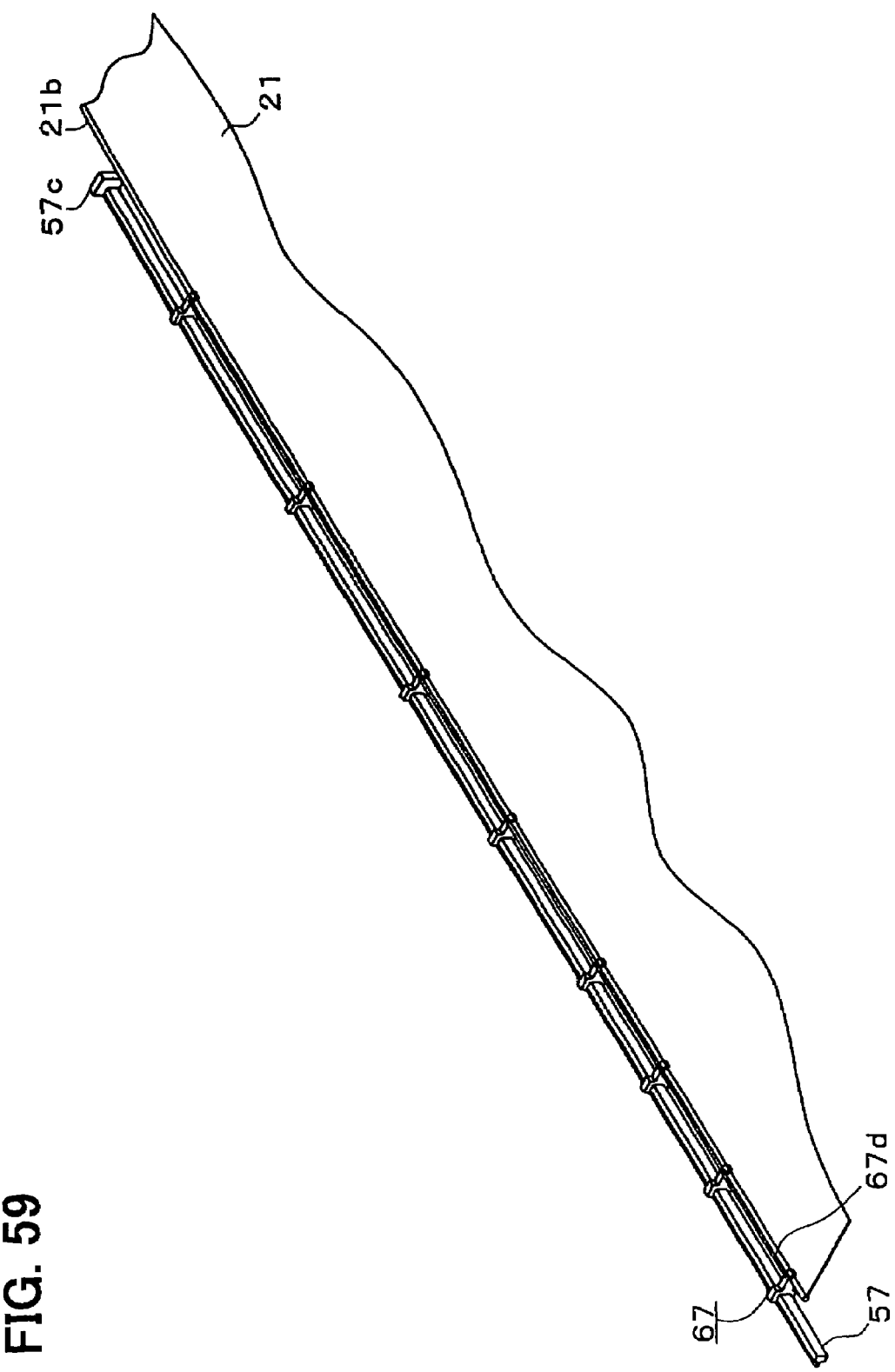
FIG. 59 is a descriptive view showing a fully extended state of the blind sheet of FIG. 58.

Furthermore, in the modification shown in FIGS. 56 and 57, the wire is used as the connecting member 67c. However, the present invention is not limited to this. For example, as shown in FIGS. 58 and 59, a link (linkage) may be used as a connecting member 67d. In the modification shown in FIGS. 58 and 59, each connecting member 67d is made of the link, and opposed ends of each connecting member 67d are rotatably connected to the sheet-side sliding portions 67b of the corresponding two connecting bodies 67.

In this modification, when the blind sheet 21 is extended from the fully retracted position to the shading position, the connecting members 67d, each of which is made of the link, are sequentially extended. When the blind sheet 21 is placed in the shading position, each connecting member 67d is fully extended.

Furthermore, in the modification shown in FIGS. 56 and 57, each connecting member may be made of a spring in place of the wire or the link.

Additional advantages and modifications will readily occur to those skilled in the art. The invention in its broader terms is therefore not limited to the specific details, representative apparatus, and illustrative examples shown and described.

What is claimed is:

1. A sunshade system for a vehicle, the sunshade system comprising:
 a blind sheet for covering a window of the vehicle; and
 a roll shade arrangement that is rotatable in both of a normal direction and a reverse direction to unwind and wind the blind sheet, wherein:

the roll shade arrangement is ranged along an edge of the window;

the roll shade arrangement includes:

a center shaft that is curved in conformity with a shape of the edge of the window; and a rotatable rod that receives the center shaft therethrough and is connected to a base end of the blind sheet, wherein the center shaft extends within the rotatable rod along the entire length of the rotatable rod;

the rotatable rod is curved in conformity with the curved shape of the center shaft and is rotatable around the center shaft;

the rotatable rod includes a plurality of cylindrical center rods and a plurality of joints;

each joint connects between corresponding two of the plurality of center rods;

each of opposed ends of each center rod has at least one engaging projection, which projects from the end of the center rod in a direction parallel to an axial direction of the center rod; and each of opposed ends of each joint has at least one engaging recess, each of which is engaged with a corresponding one of the at least one engaging projection that is provided in an adjacent one of the ends of a corresponding one of the plurality of center rods.

2. The sunshade system according to claim 1, wherein:

each of the at least one engaging projection of each center rod has a curved engaging surface; and each of the at least one engaging recess of each joint has a curved engaging surface, which is engaged with the curved engaging surface of the corresponding engaging projection.

3. The sunshade system according to claim 1, wherein the plurality of center rods includes:

at least one center rod of a first type, each of which has a first length; and at least one center rod of a second type, each of which has a second length that is longer than the first length.

4. The sunshade system according to claim 3, wherein:

at least one of the at least one center rod of the first type is arranged in a first longitudinal region of the roll shade arrangement, which has a first curvature; and at least one of the at least one center rod of the second type is arranged in a second longitudinal region of the roll shade arrangement, which has a second curvature that is smaller than the first curvature.

5. The sunshade system according to claim 1, further comprising:

a slider that is connected to a free end of the blind sheet;

a guide rail that slidably holds the slider, wherein the guide rail is arranged along a vertical frame that extends vertically from a main body of a door of the vehicle, to which the window is provided;

a transmitting member that is connected to the slider to slide the slider along the guide rail; and a drive arrangement that drives the transmitting member to slide the slider along the guide rail, wherein the drive arrangement is arranged between a door panel and a door trim of the door.

6. The sunshade system according to claim 5, wherein the transmitting member is one of:

a wire that is connected to a reel of the drive arrangement in a manner that permits winding of the wire around the reel;

a rack that is meshed with a pinion, which is connected to the drive arrangement; and a spiral cable that is meshed with an output gear of the drive arrangement.

7. The sunshade system according to claim 5, wherein the slider is detachably connected to the free end of the blind sheet.

8. The sunshade system according to claim 1, wherein a length of each joint is shorter than a length of any of the plurality of center rods.

9. The sunshade system according to claim 1, wherein the rotatable rod has a first end and a second end, and the first end is opposite to the second end, and the center shaft extends through the rotatable rod from the first end to the second end of the rotatable rod.

10. The sunshade system according to claim 1, wherein the curvature of the center shaft and the rotatable rod forms an arch.

* * * * *